US006611297B1

United States Patent
Akashi et al.

(10) Patent No.: US 6,611,297 B1
(45) Date of Patent: Aug. 26, 2003

(54) ILLUMINATION CONTROL METHOD AND ILLUMINATION DEVICE

(75) Inventors: Yukio Akashi, Osaka (JP); Tadashi Yano, Kyoto (JP); Makoto Inohara, Osaka (JP); Kenjiro Hashimoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/673,324

(22) PCT Filed: Apr. 13, 1999

(86) PCT No.: PCT/JP99/01943
§ 371 (c)(1),
(2), (4) Date: Dec. 22, 2000

(87) PCT Pub. No.: WO99/53728
PCT Pub. Date: Oct. 21, 1999

(30) Foreign Application Priority Data

Apr. 13, 1998 (JP) .............................................. 10-100772
Sep. 29, 1998 (JP) .......................................... 10-274922

(51) Int. Cl.$^7$ .............................. H04N 5/58; H04N 9/12
(52) U.S. Cl. ...................................... 348/739; 348/602
(58) Field of Search ................................ 348/602, 603, 348/655, 656, 657, 658, 587, 592, 649, 652, 645, 673, 687, 739, 722; 345/207, 102; H04N 5/66, 9/12, 5/57, 5/58

(56) References Cited

U.S. PATENT DOCUMENTS 5,737,031 A * 4/1998 Tzidon et al. .............. 348/587
6,327,708 B1 * 12/2001 Monsees ..................... 348/602

FOREIGN PATENT DOCUMENTS

| JP | 2-253503 | 10/1990 |
| JP | 6-267664 | 9/1994 |
| JP | 7-264620 | 10/1995 |
| JP | 8-12793 | 2/1996 |
| JP | 8-15004 | 2/1996 |

* cited by examiner

Primary Examiner—Sherrie Hsia
(74) Attorney, Agent, or Firm—Snell & Wilmer, LLP

(57) ABSTRACT

In an illumination control method of the present invention, illumination of an appreciation space is controlled in association with an image displayed on an image display device so that a realism of the image displayed on a screen of the image display device can be enhanced, where an appreciator appreciating the image is in the appreciation space. More specifically, one or more light sources provided in the appreciation space is controlled so that at least one parameter of a level, a light color, a luminous intensity distribution, and a direction of illumination to the appreciation space is made substantially coincident with a corresponding parameter of a virtual image space imaginarily created from the image displayed on the image display device.

63 Claims, 46 Drawing Sheets

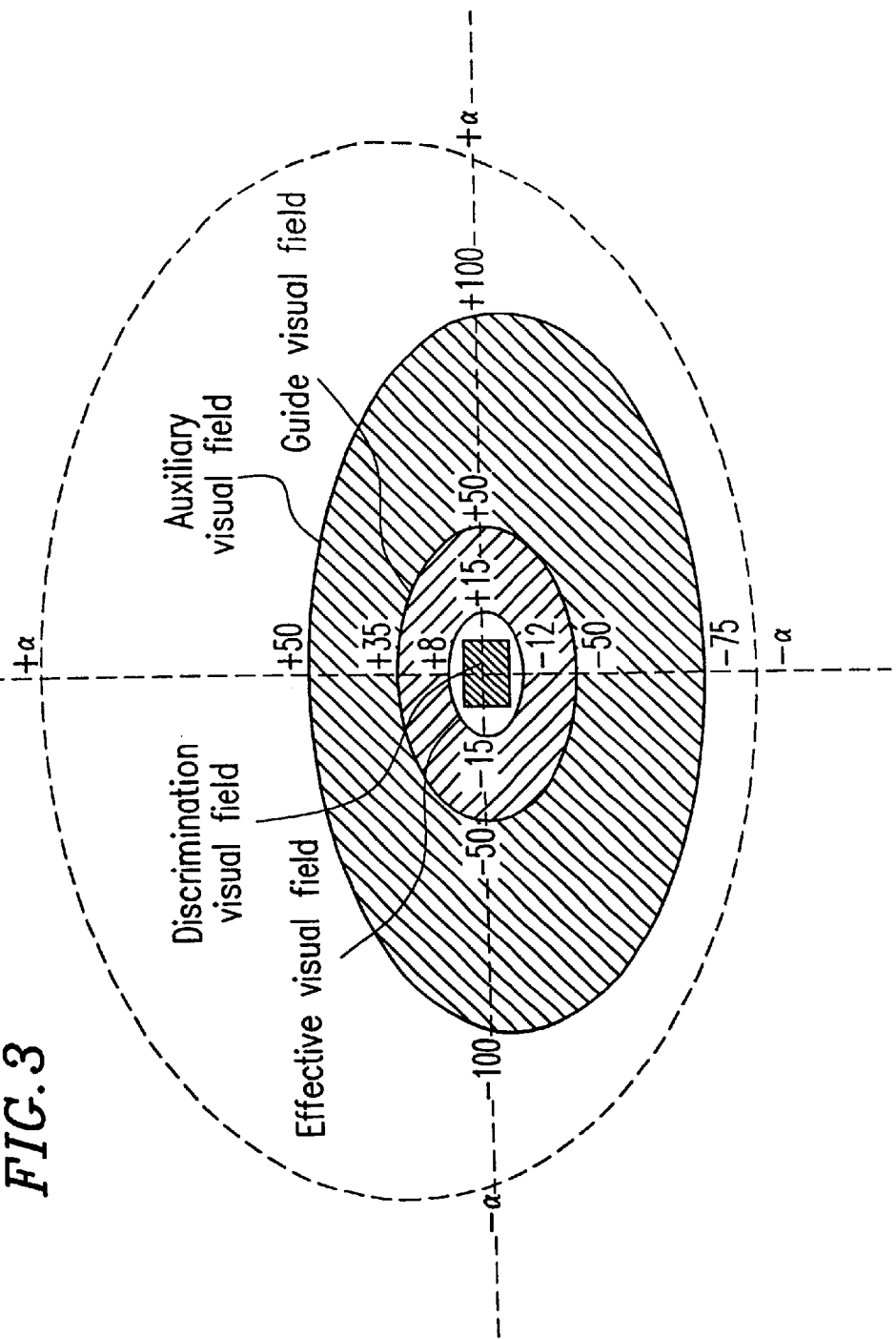

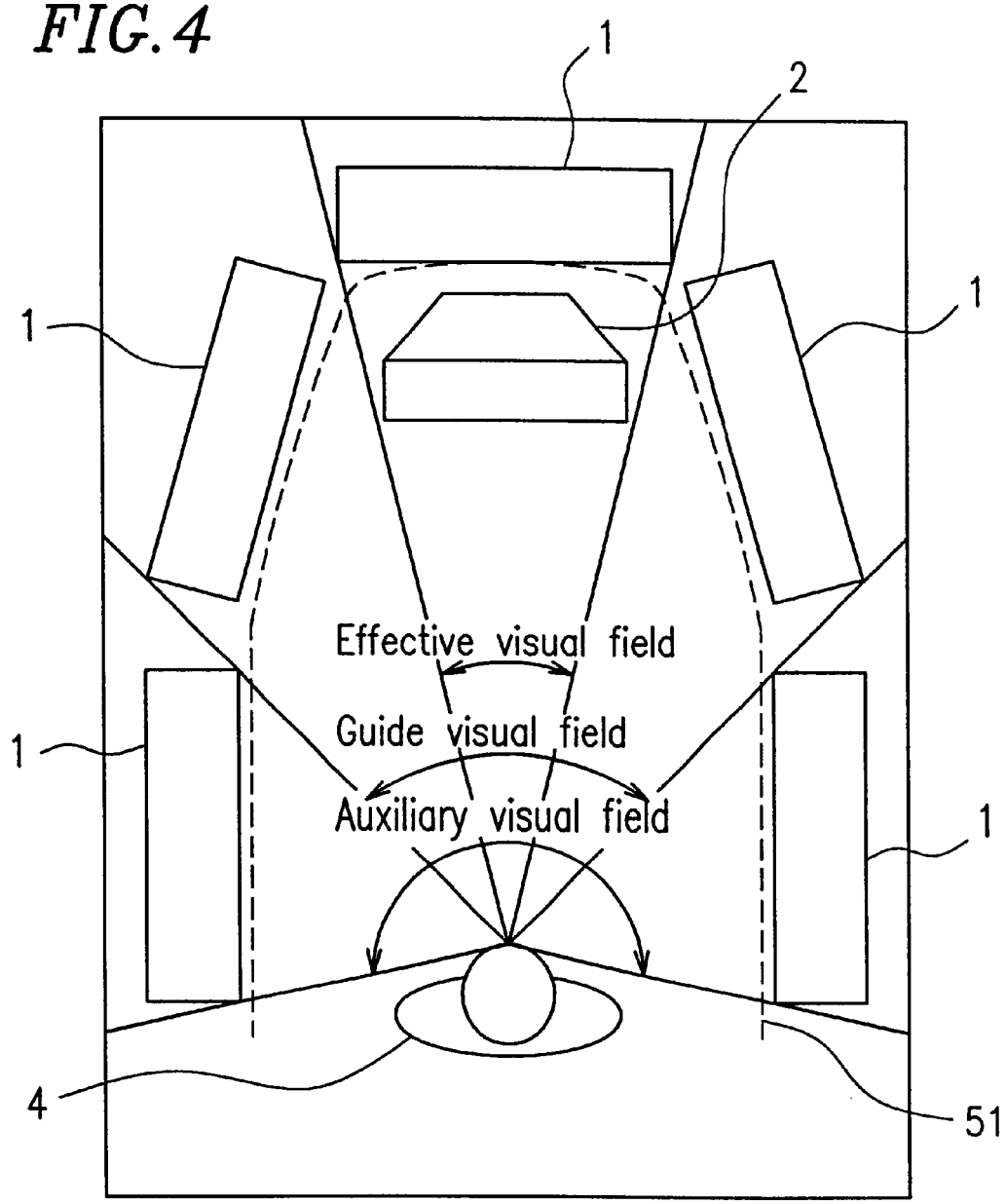

FIG. 6D
(a)
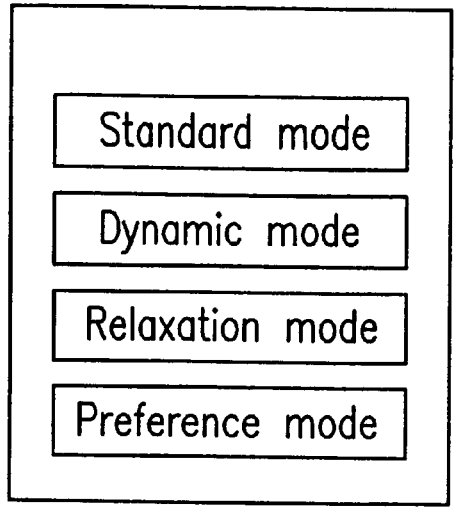
(b)
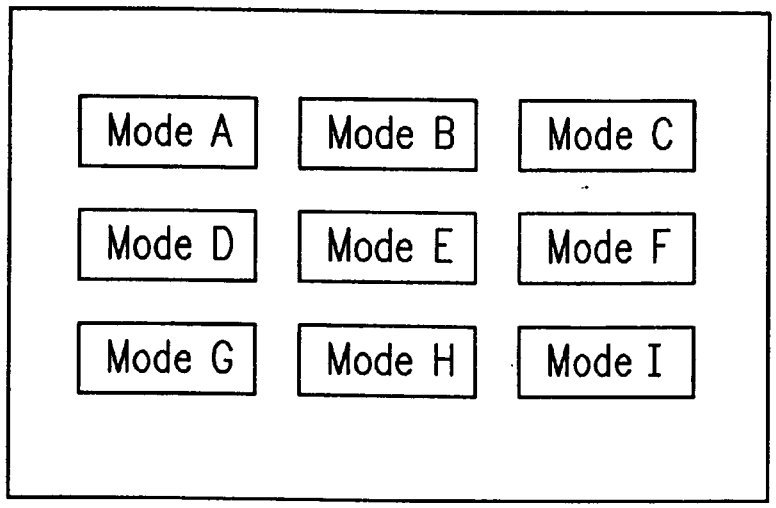

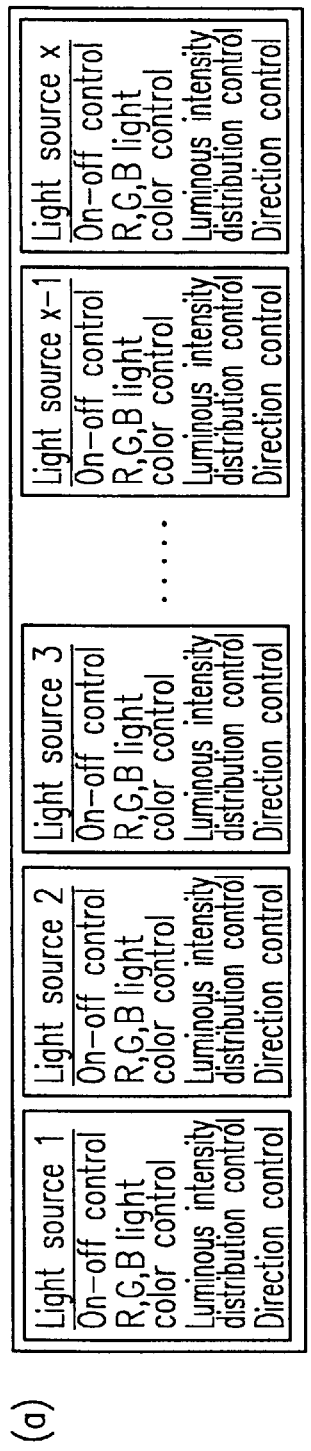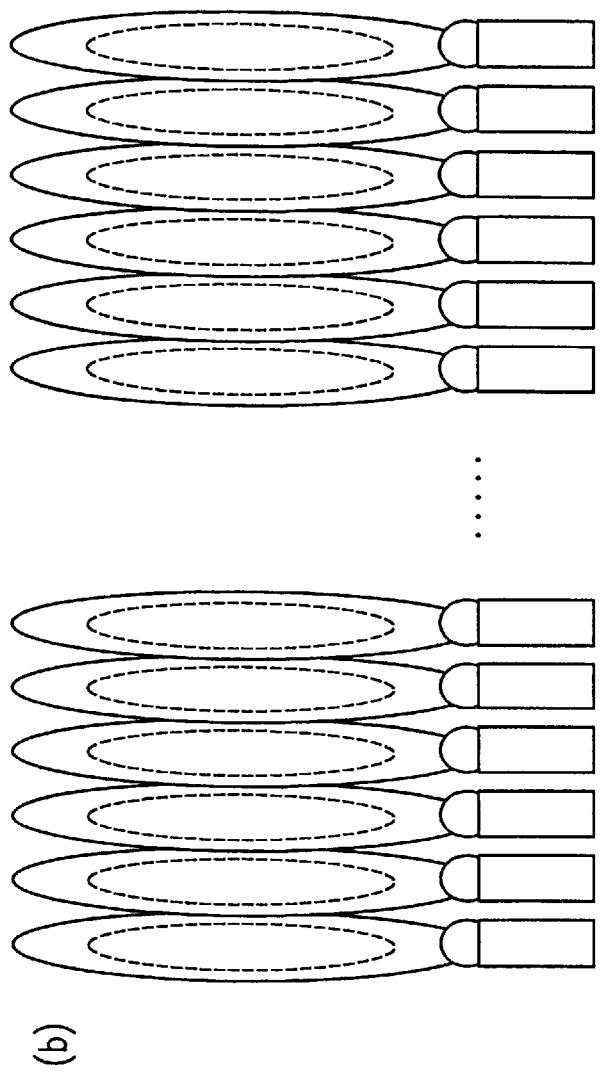
FIG. 6F

FIG. 7B
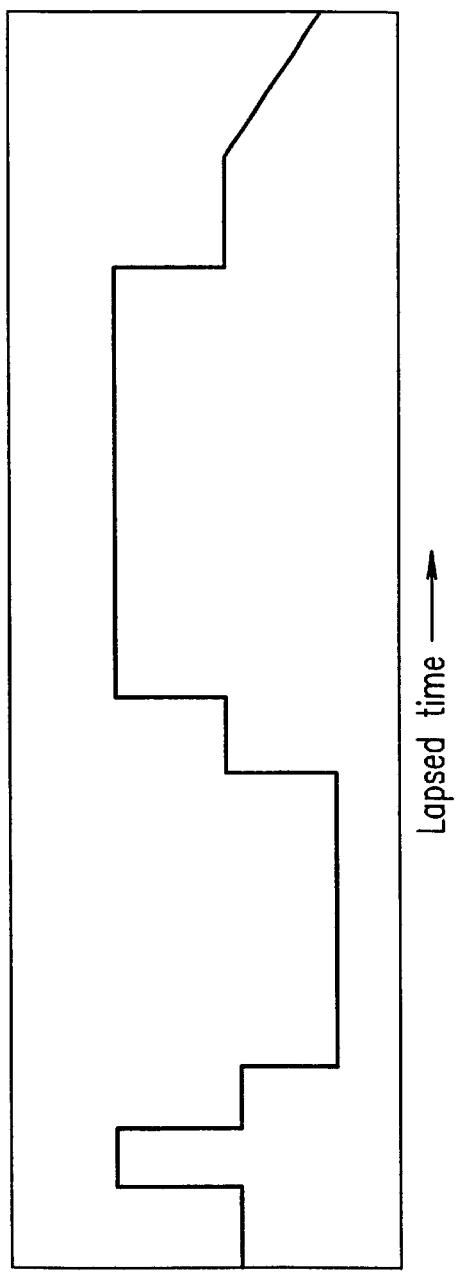
(a) Signal value of image / Lapsed time
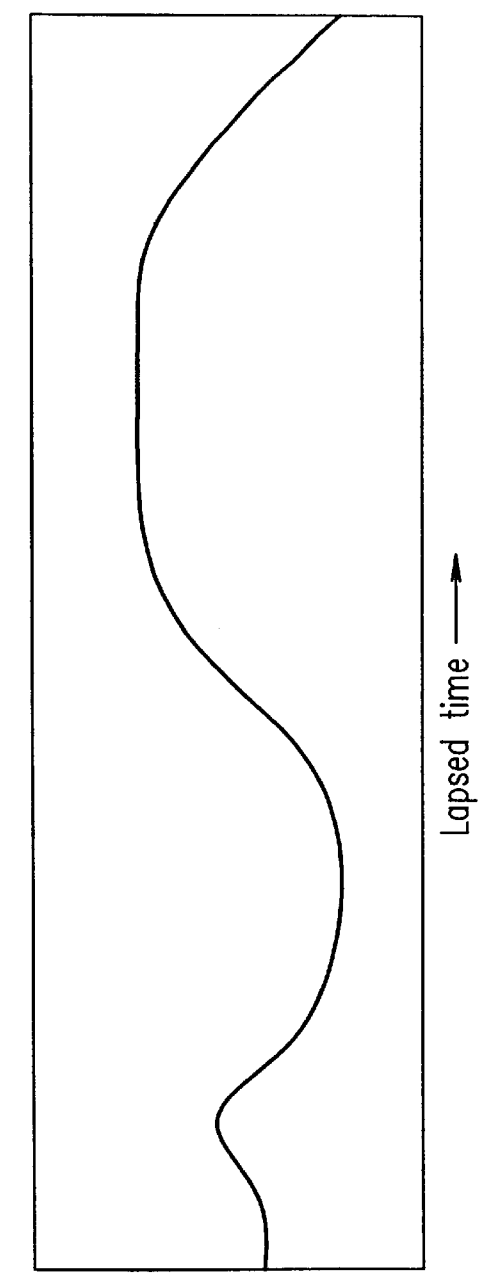
(b) Signal value of illumination / Lapsed time

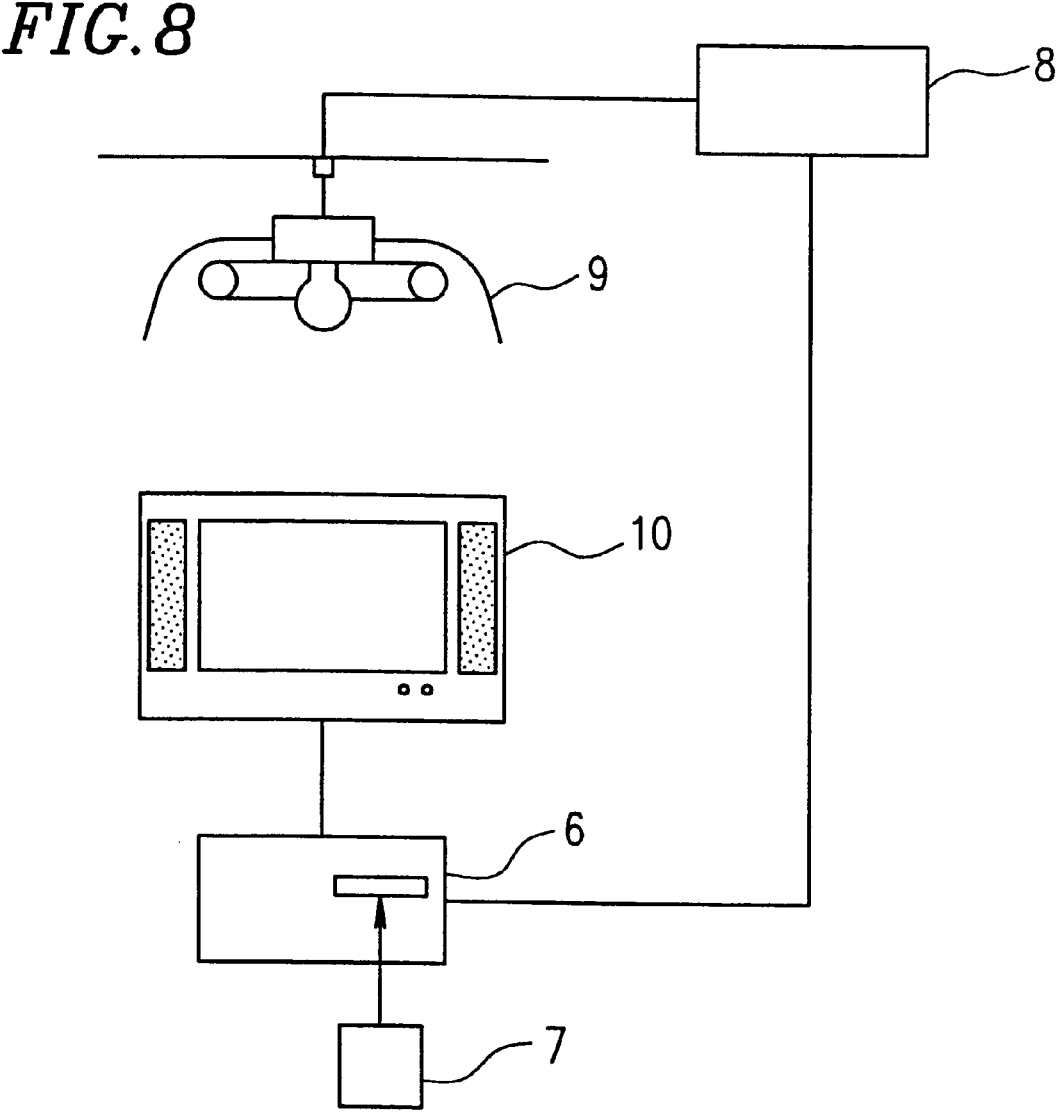

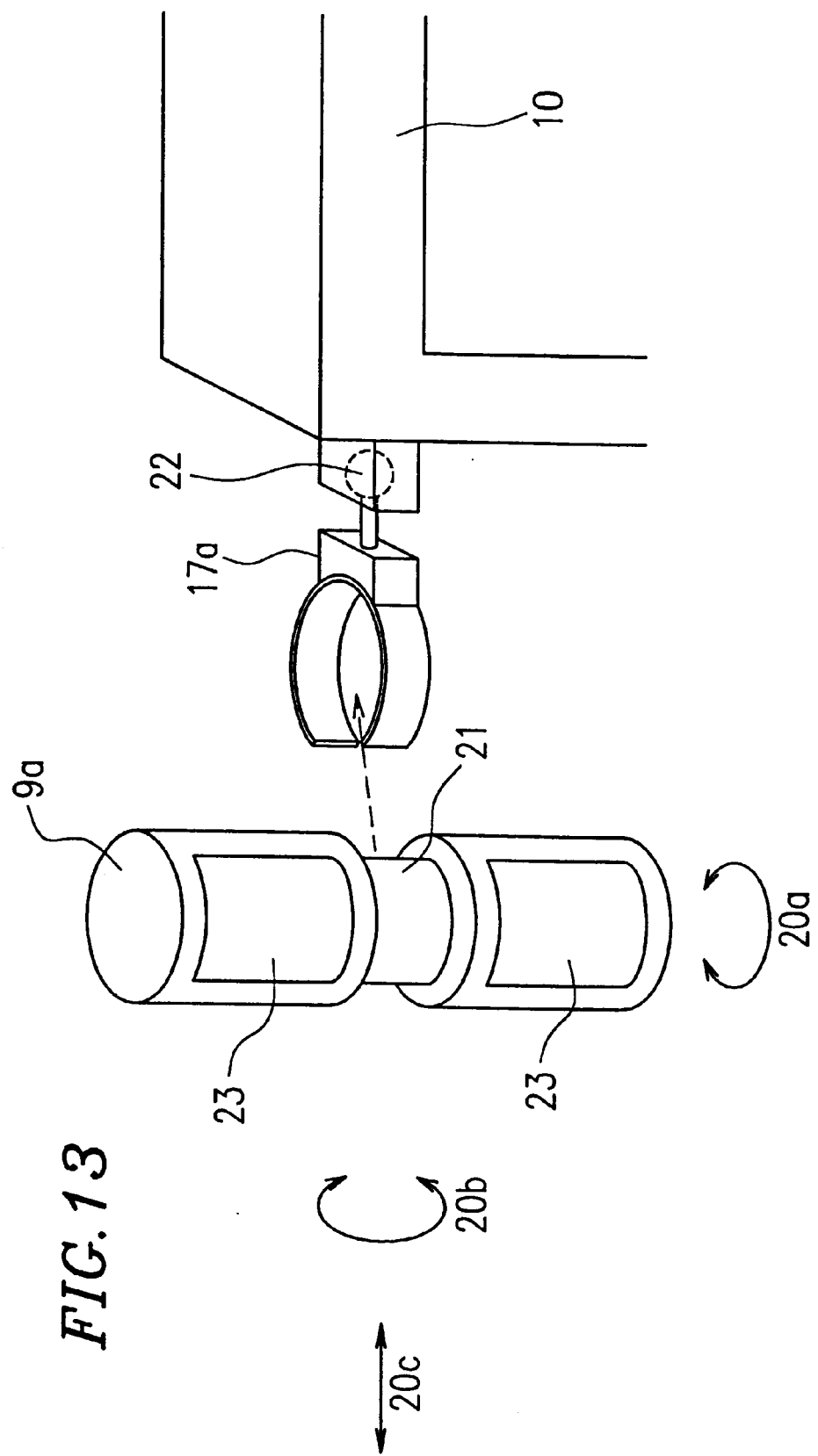

FIG. 17
(a)
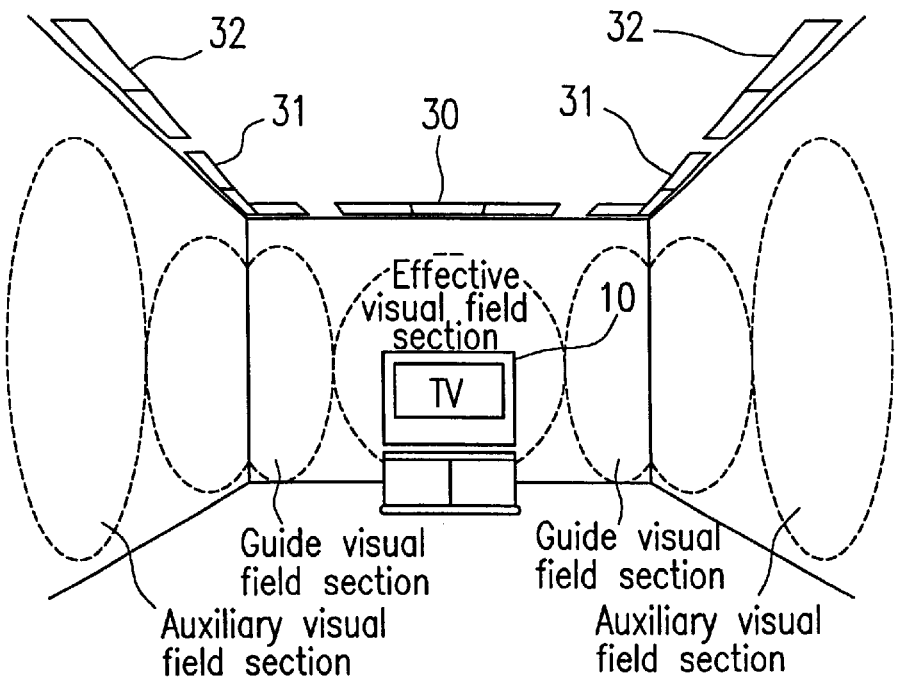
(b)
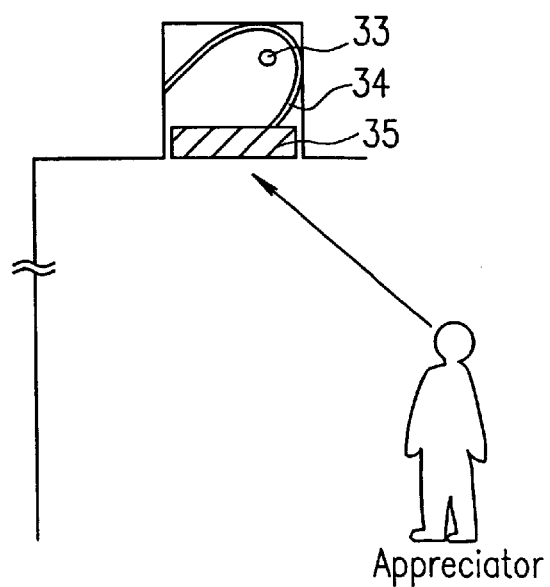

FIG.19
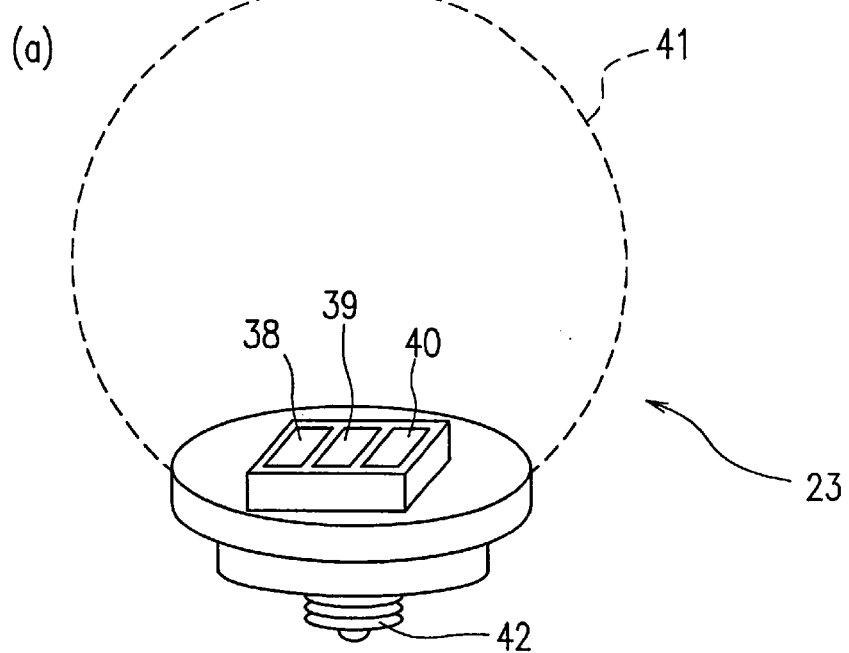
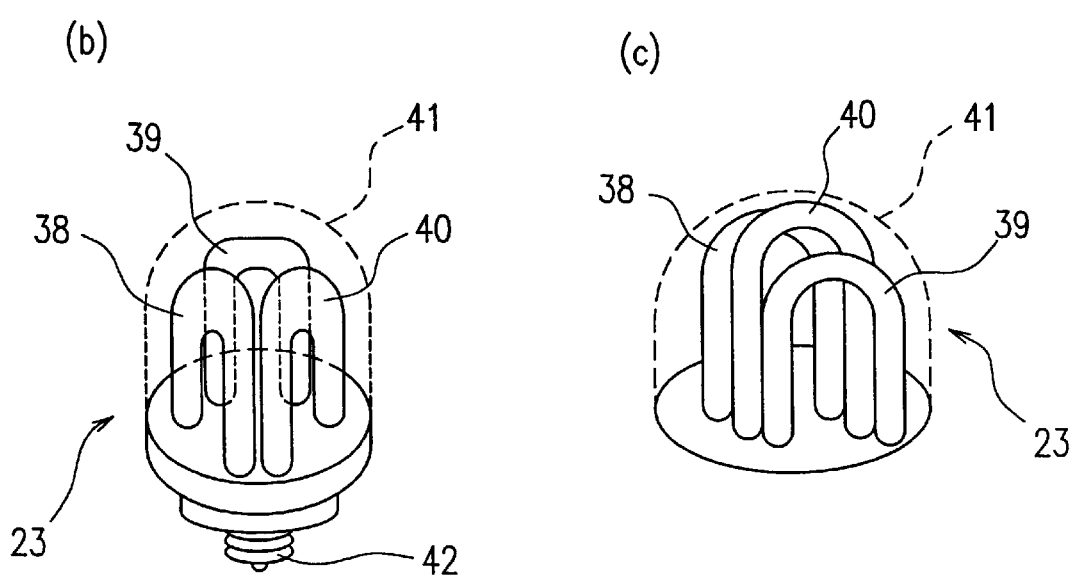

FIG.22
(a)
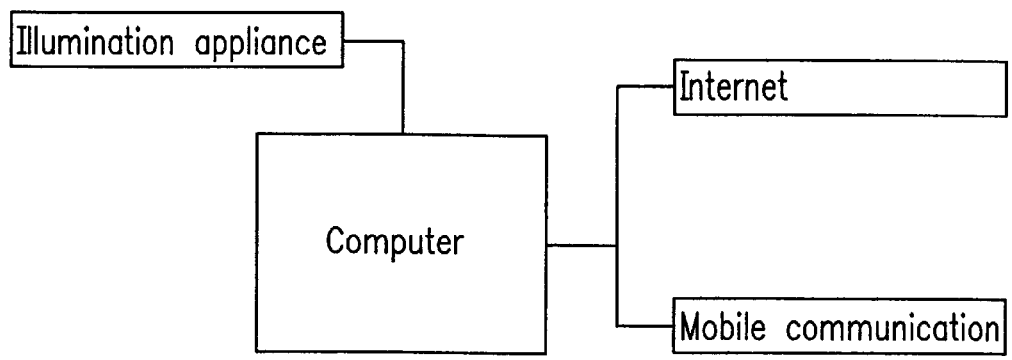
(b)
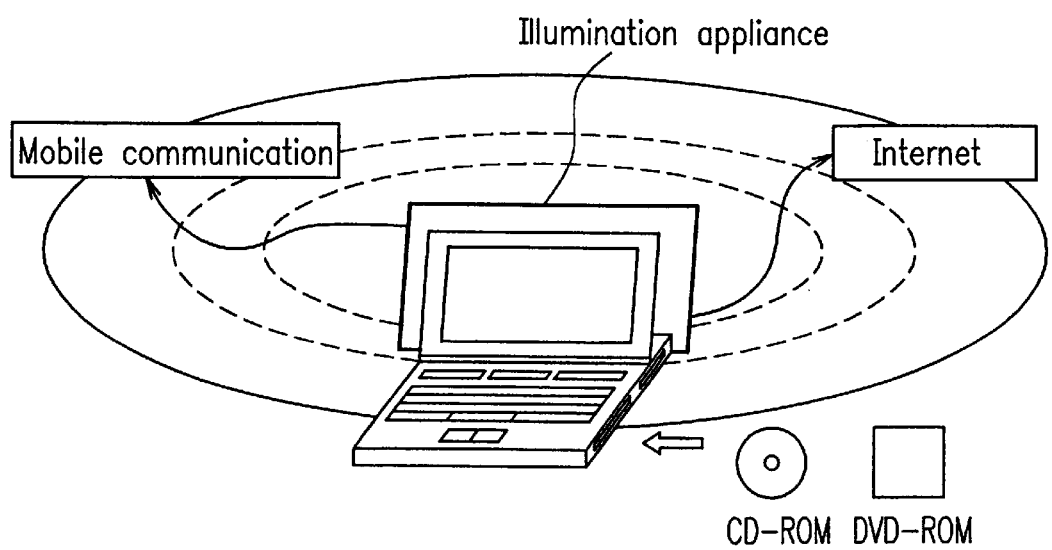

FIG.25
(a)
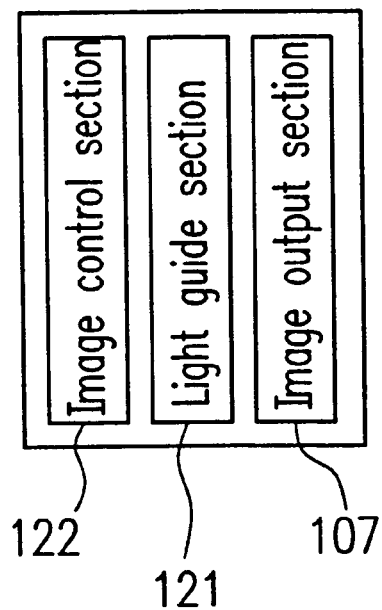
122  121  107
(b)
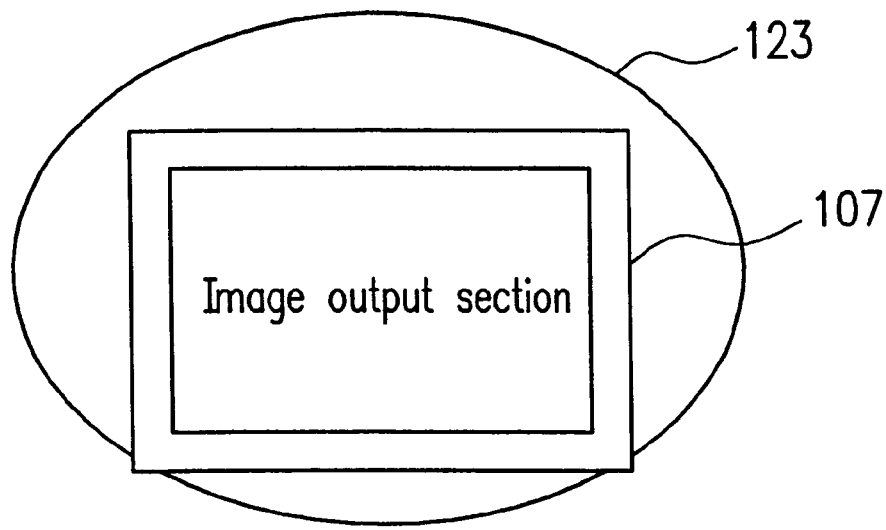
123
107
Image output section

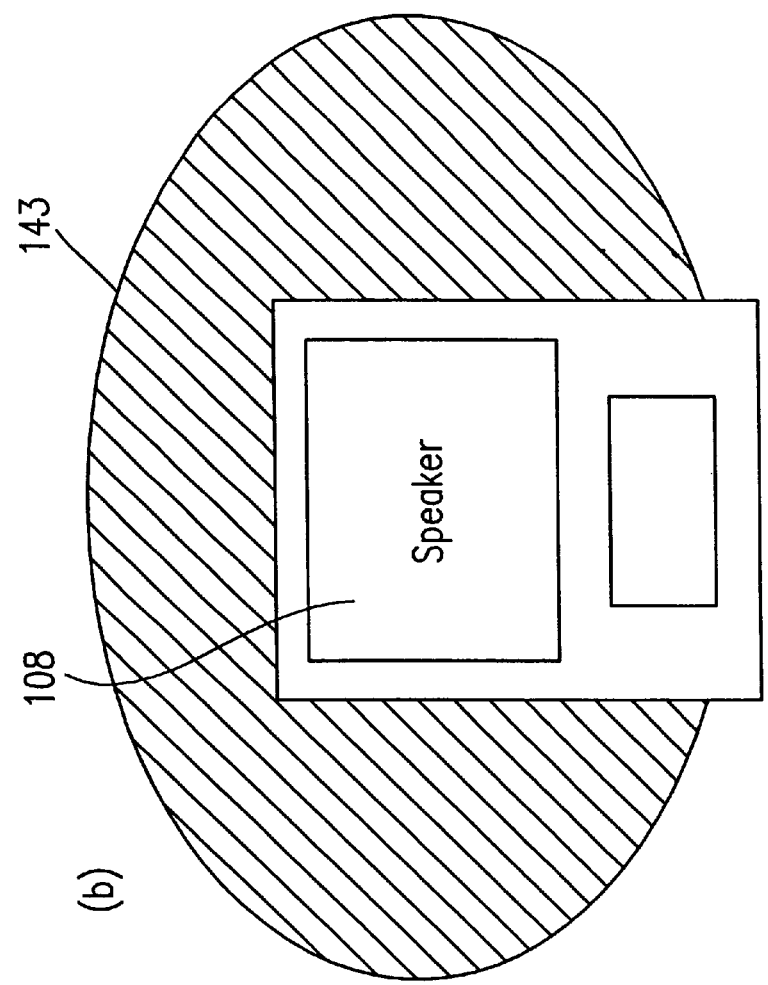
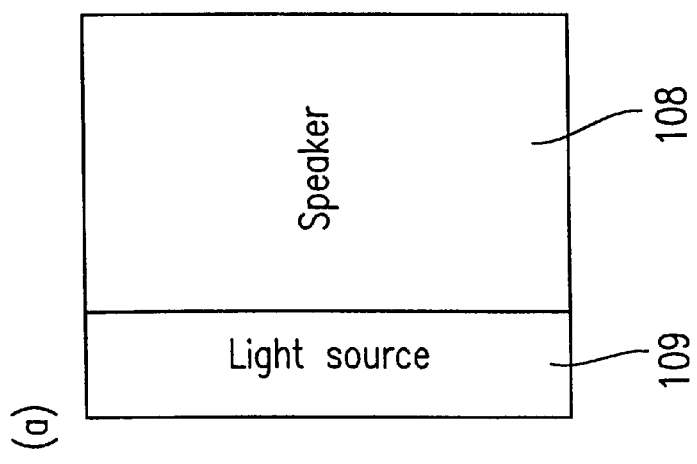
FIG. 27

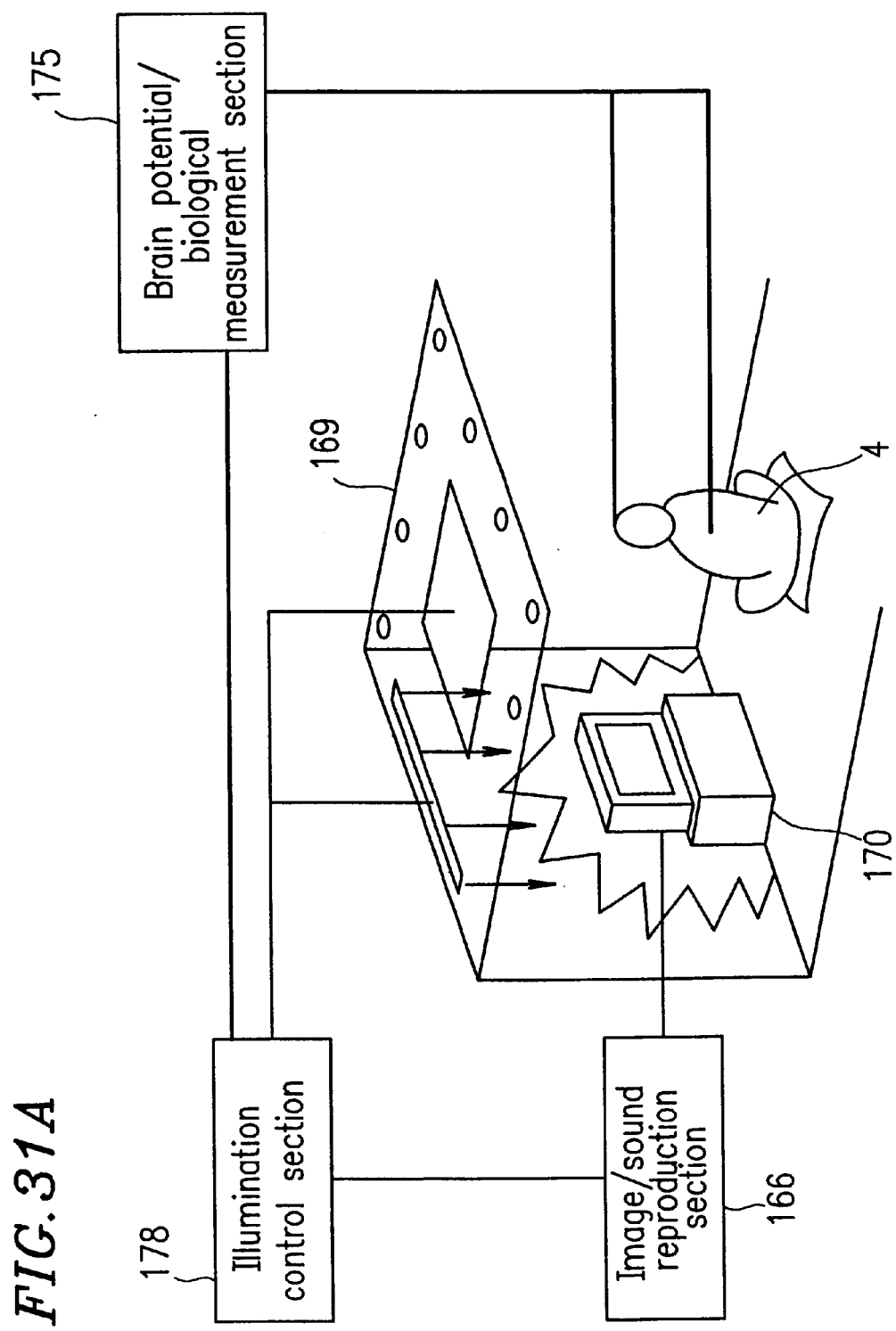

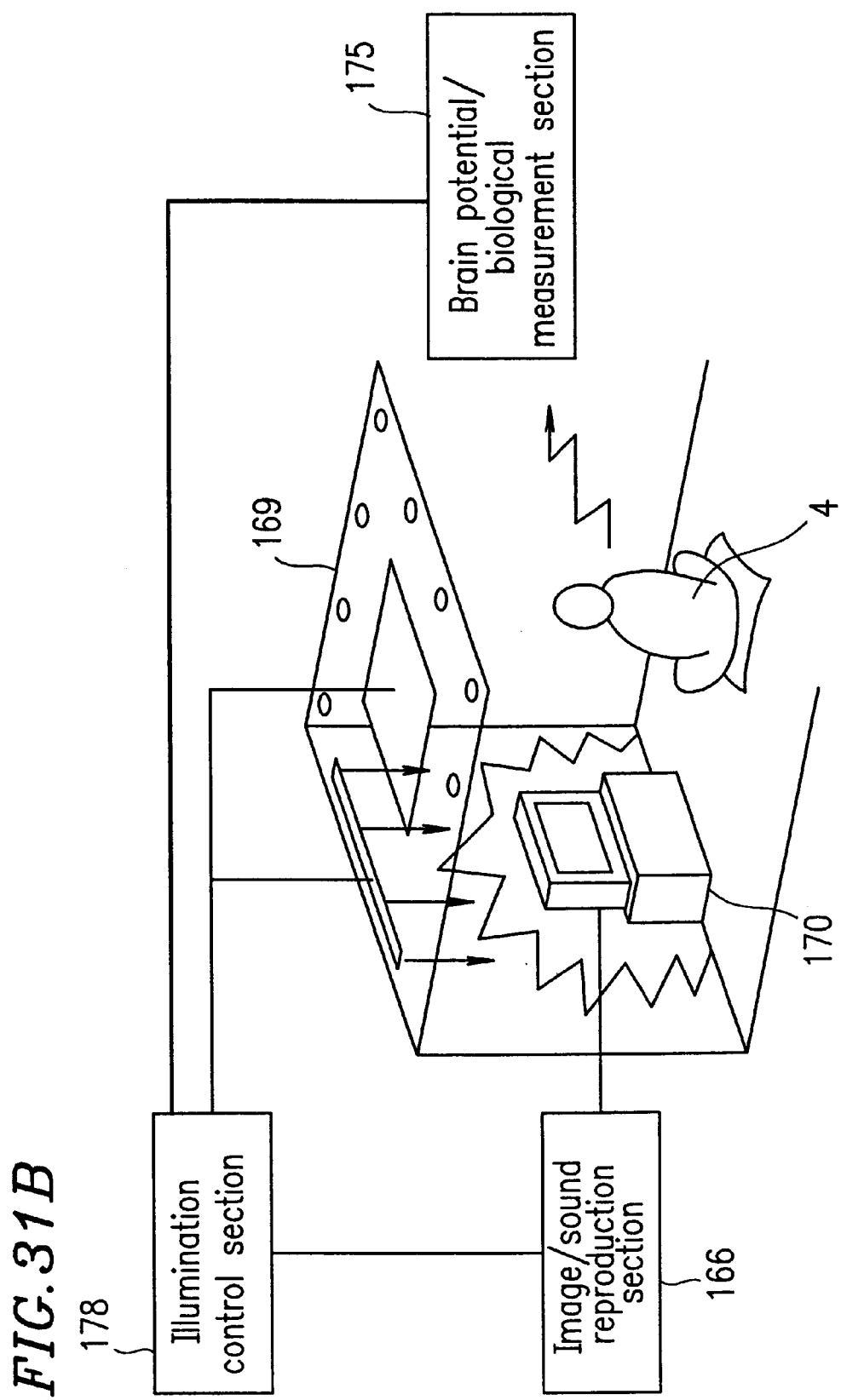

ILLUMINATION CONTROL METHOD AND ILLUMINATION DEVICE

TECHNICAL FIELD

The present invention relates to an illumination control method and an illumination device for changing various illumination conditions in association with images and sounds.

BACKGROUND ART

Technologies have vigorously been developed in the video and audio field since the advent of the multi-media age. Particularly, large-sized displays provide realistic and powerful images which people can enjoy even at home. In future, techniques for improving the realism of images displayed on image display devices are expected to be indispensable for the purpose of more effective utilization of multi-media.

At present, since large-sized screens are the most effective means for improving realism, large and thin displays having low cost have been vigorously researched and developed.

Sound provides a significant influence on the atmosphere of a room. Therefore, it is considered that sounds are useful for an improvement in realism when viewing and hearing an image display device. Conventionally, a stereo technique using a pair of speakers (recently, a surrounding sound technique using additional speakers at the rear of an appreciator, and the like) have been developed. It is natural that the increased number of speakers leads to an improvement in realism. At present, however, taking actual cost into account, techniques for improving realism have been researched using a smaller number of speakers.

In addition to sound, illumination is also a factor that has a significant influence on the atmosphere of a room. Effects of illumination are supported by the fact that illumination effects, such as stage illumination play, an important role in stage performance. Thus, if the illumination having a significant influence on the room atmosphere is controlled in association with the screen of an image display device, realism may be enhanced when viewing the image display device. For example, when the large-sized screen of a high-definition TV provides a scene in which the sun is setting in the Mediterranean sea, the color temperature of illumination in a room is gradually decreased and the illuminance is also decreased as the screen gradually becomes reddish and dark. In this situation, the appreciator obtains realism as if he/she were in the image scene.

The technique for improving the realism of the image display device using illumination may not require a large-sized image. Resources and costs required for production of a small-sized illumination device are very small as compared with a large-sized image display device. Therefore, the technique for improving realism using illumination may significantly contribute to cost reduction, saving of energy, and conservation of global environment.

To date, there have been no attempts to put such an idea into practical use. However, there are some conventional related techniques.

As a first conventional technique, Japanese Laid-open Publication No. 2-158094 (Japanese Publication for Opposition No. 8-12793) discloses a "variable light color illumination device". As a second conventional technique, Japanese Laid-open Publication No. 3-184203 (Japanese Publication for Opposition No. 8-15004) discloses a "variable light color illumination device". Both publications relate to an illumination device for improving realism in viewing an image display device by controlling illumination in association with images on the image display device.

The illumination device in the first conventional technique includes an RGB signal output section, a Y (brightness) signal output section, a light mixture ratio control section, and a color illumination output section. The illumination device is connected to an image display device. The illumination device receives an RGB signal and a luminance signal for each pixel on the screen of the image display device, and obtains an average chromaticity and an average brightness of the whole screen. Based on the average chromaticity and luminance, an appropriate chromaticity and luminance are calculated for interior illumination. The outputs of the respective monochromatic fluorescent lamps of RGB included in the illumination output section are controlled in such a manner as to attain the appropriate chromaticity and illuminance.

The second conventional technique has substantially the same features as that of the first conventional technique, except that: the second conventional technique does not simply calculate the average chromaticity and the average brightness of the whole screen of the image display device; instead, pixels in portions having flesh color are removed from a human face or the like in an image displayed on the screen of the image display device, and the remainder of the image is regarded as a background; and the RGB signal and the luminance signal of each pixel in the background is taken, and based on the signals the average chromaticity and the average brightness are calculated.

As for a specific illumination control technique, an illumination control method is disclosed in which illumination is controlled so that the chromaticity and brightness of a wall surface at the rear of the image display device are equal to the average chromaticity and brightness of the whole screen or the background excluding a human flesh color.

As a third conventional technique, Japanese Laid-open Publication No. 2-253503 discloses an "image performance illumination device". Similar to the above-described first and second conventional techniques, interior illumination is controlled in association with an image on the screen of the image display device. Note that the third conventional technique differs from the above-described first and second conventional techniques in that a plurality of light sources are used. As a specific illumination control technique, an illumination control technique is disclosed in which the screen of the image display device is divided into portions; an average hue is detected for each portion; and illumination is controlled so that the hue of an illumination light source corresponding to each portion is the same as that of each portion.

As a fourth conventional technique, Japanese Laid-open Publication No. 7-264620 discloses a "method and device for reproducing an image" Similar to the above-described first, second, and third conventional techniques, interior illumination is controlled in association with an image on the screen of the image-display device. Note that the fourth conventional technique differs from the above-described first, second, and third conventional techniques in that illumination conditions of a space, in which an image reproduction device, such as an image display device, exists are changed in such a manner as to conform to illumination conditions of a space in which a target object in an image displayed on the image display device exists and in which the target object is imaged.

As a fifth conventional technique, Japanese Laid-open Publication No. 6-267664 discloses an "illumination system for television". Similar to the above-described first, second, third, and fourth conventional techniques, interior illumination is controlled in association with an image on the screen of the image display device. Note that the fifth conventional technique differs from the above-described first, second, third, and fourth conventional techniques in that for each pixel in an image on the image display device the outputs of the R-G-B monochromatic fluorescent lamps included in an illumination output section are adjusted in accordance with the magnitudes of the R-G-B signals, respectively, thereby enhancing the purity of colors in the image.

For example, the above-described Publication describes that when a red rose is displayed on the image display device, the output of a fluorescent lamp of R (red) is enhanced, whereby the purity of red in the screen of the image display device is prevented from being decreased due to outside light.

The above-described conventional techniques, particularly the first through third conventional techniques, disclose the idea that interior illumination is controlled in association with the screen of the image display device, which is a valued idea. As for a structure of an illumination device for enhancing realism, the above-described conventional techniques are only describes as including a simple configuration in which the dimmer level of each lamp is arbitrarily changed by combining the RGB monochromatic fluorescent lamps. The above-described conventional techniques lack specificity.

In other words, although the idea that interior illumination is controlled in association with the screen of the image display device has previously been proposed for enhancing realism, no specific means for enhancing realism has been established. No specific structure of an illumination device for enhancing realism has been disclosed.

Disclosure of the Invention

The present invention is provided to solute the above-described problems. The objective of the present invention is to provide an illumination control method and an illumination device capable of enhancing the realism of an image displayed on the screen of an image display device by controlling illumination of an appreciation space in association with the image on the image display device.

An illumination control method of the present invention comprises the step of: controlling illumination of an appreciation space in association with an image displayed on an image display device in such a manner as to enhance a realism of the image displayed on a screen of the image display device, wherein an appreciator appreciating the image is in the appreciation space, thereby achieving the above-described objective.

In the illumination control step, at least one of a level, a light color, a luminous intensity distribution, and a direction of light output from one or more light sources provided in the appreciation space may be controlled so that an illumination impression to the appreciation space is made substantially coincident with an illumination impression of a virtual image space imaginarily created from the image displayed on the image display device.

Alternatively, in the illumination control step, one or more light sources provided in the appreciation space may be controlled so that at least one parameter of a level, a light color, a luminous intensity distribution; and a direction of illumination to the appreciation space is made substantially coincident with a corresponding parameter of a virtual image space imaginarily created from the image displayed on the image display device.

An illuminance of the appreciation space may be controlled so as to substantially be coincident with an illuminance of an illumination impression of the virtual image space so that a level of the illumination to the appreciation space is made substantially coincident with a level of illumination to the virtual image space.

Alternatively, the one or more light sources provided in the appreciation space may be controlled so that $0<L'<1.25 \cdot L$ is satisfied where L ($cd/m^2$) is the luminance of a pixel having the highest luminance of all pixels in the image displayed on the image display device, and L' ($cd/m^2$) is a luminance of a peripheral visual field of the image display device.

The one or more light sources provided in the appreciation space may be controlled so that $0<L'<1.25 \cdot L$ is satisfied where L ($cd/m^2$) is the luminance of a pixel having the highest luminance of all pixels in a background excluding a main target of the image displayed on the image display device, and L' ($cd/m^2$) is a luminance of a peripheral visual field of the image display device.

A chromaticity of illumination of the appreciation space may be controlled so as to substantially be coincident with a chromaticity of illumination of the virtual image space so that a light color of illumination to the appreciation space is made substantially coincident with a light color of illumination of the virtual image space.

A light color of illumination to the appreciation space may be controlled so as to have substantially the same category as that of a color of a part of the image displayed on the image display device, and therefore a light color of illumination to the appreciation space is substantially coincident with a light color of illumination to the virtual image space.

Chromaticities of the one or more light sources may be controlled in association with the image so that: a hue of a chromaticity of a peripheral visual field of the image display device is substantially the same on a chromaticity diagram as a hue of an average chromaticity of all pixels of the image displayed on the image display device; a color saturation of the chromaticity of the peripheral visual field of the image display device is less than or equal to, on a chromaticity diagram, a color saturation of an average chromaticity of all pixels of the image displayed on the image display device; and therefore a light color of illumination to the appreciation space is substantially coincident with a light color of illumination to the virtual image space.

Alternatively, chromaticities of the one or more light sources may be controlled in association with the image so that: a hue of a chromaticity of a peripheral visual field of the image display device is substantially the same on a chromaticity diagram as a hue of an average chromaticity of pixels of a background excluding a main target of the image displayed on the image display device; a color saturation of the chromaticity of the peripheral visual field of the image display device is less than or equal to, on a chromaticity diagram, a color saturation of an average chromaticity of the pixels of the background excluding the main target of the image displayed on the image display device; and therefore a light color of illumination to the appreciation space is substantially coincident with a light color of illumination to the virtual image space.

Chromaticities of the one or more light sources may be controlled in association with the image so that a hue of a chromaticity of a peripheral visual field of the image display device is substantially opposite on a chromaticity diagram to a hue of an average chromaticity of all pixels of the image displayed on the image display device, and therefore a light color of illumination to the appreciation space is substantially coincident with a light color of illumination to the virtual image space.

Alternatively, chromaticities of the one or more light sources may be controlled in association with the image so that a hue of a chromaticity of a peripheral visual field of the image display device is substantially opposite on a chromaticity diagram to a hue of an average chromaticity of pixels of a background excluding a main target of the image displayed on the image display device, and therefore a light color of illumination to the appreciation space is substantially coincident with a light color of illumination to the virtual image space.

Outputs and light colors of the one or more light sources provided in the appreciation space may be controlled in accordance with a luminance distribution state of the image displayed on the image display device so that a light color, a level distribution, and a direction of illumination to the appreciation space are made substantially coincident with a light color, a level distribution, and a direction of illumination to the virtual image space.

A light source of the virtual image space is detected, a distribution and a direction of light in the virtual image space may be predicted based on a luminance, a light color, and a position of the detected light source, outputs and light colors of the one or more light sources provided in the appreciation space may be controlled to realize a light color distribution and a luminance distribution obtained by extrapolating the predicted results into the appreciation space so that a direction and a distribution of illumination to the appreciation space are made substantially coincident with a direction and a distribution of illumination to the virtual image space.

For example, the one or more light sources are provided at a rear or periphery of the image display device.

When the peripheral visual field of the image display device is divided into a plurality of visual field categories based on a visual function of a human, the categories including an effective visual field section, a guide visual field section, and an auxiliary visual field section, and at least one of the one or more light sources may be assigned to each of the plurality of visual field categories.

A light source of the one or more light sources illuminating an effective visual field section may be a multi-function light source.

For example, a brightness of the multi-function light source illuminating the effective visual field section may be greater than a brightness of a light source illuminating other visual fields.

A light source of the one or more light sources for illuminating a guide visual field section may be provided at high density, and on-off operation of the light source is finely controlled.

The image displayed on the image display device may be substantially evenly divided into 3 portions including an upper portion, a middle portion, and a lower portion, information on each of the upper portion, the middle portion, and the lower portion may be reflected in at least one of the effective visual field section; a guide visual field section, and an auxiliary visual field section so that a level, a light color, a distribution, and a direction of illumination to the appreciation space are made substantially coincident with a level, a light color, a distribution, and a direction of illumination to the virtual image space.

A light color and a luminance level of a light source of the one or more light sources for illuminating a guide visual field section maybe individually adjusted; the light source may be attached to a periphery or vicinity of the image display device; the light color and the luminance level of the light source may be controlled to be coincident with a light color and a luminance level of a pixel in a peripheral edge portion of the image displayed on the image display device so that a level, a light color, a distribution, and a direction of illumination to the appreciation space are made substantially coincident with a level, a light color, a distribution, and a direction of illumination to the virtual image space.

A condition of the illumination may be changed substantially in synchronization with the image displayed on the image display device so that a delay in the change of the condition of the illumination is less than or equal to one second with respect to a change in the image.

Image data may be stored in a storage medium so that the illumination is synchronized with the displaying of the image on the image display device at an arbitrary timing and therefore the condition of the illumination is changed substantially in synchronization with the image.

A predetermined relaxation-type illumination control method may be applied to a dramatically changing image.

For example, in the predetermined relaxation-type illumination control method, a variation frequency of the illumination may be adjusted in such a manner so as not to fall in a frequency range causing a human to sense flicker.

Alternatively, in the predetermined relaxation type illumination control method of the present invention, the illumination may be changed when a change in the image exceeds a predetermined threshold.

Alternatively, in the predetermined relaxation type illumination control method of the present invention, when the image may be changed, the illumination is changed in accordance with an average value of a vicinity of the change over a predetermined period of time.

A predetermined adaptation adjusting means for preventing an appearance of a reduction in color saturation on the screen caused by the eyes of a human adapting a single light color dominating a significant portion of the image displayed on the image display device, may be employed.

The illumination may be controlled using a predetermined control method when a luminance level of the image displayed on the image display image is low and a chromaticity thereof is a low color saturation.

An illumination device of the present invention comprises means for controlling illumination of an appreciation space in association with an image displayed on an image display device in such a manner as to enhance a realism of the image displayed on a screen of the image display device, wherein an appreciator appreciating the image is in the appreciation space, thereby achieving the above-described objective.

In one embodiment, the above-described illumination device of the present invention comprises: a reproduction section for reproducing a predetermined signal; a data storage device; an illumination control section; an illumination output section; and an image/sound output section, wherein the image/sound output section functions as the image display device.

In another embodiment, the above-described illumination device of the present invention comprises: a reception section for receiving a predetermined signal; a reproduction section for reproducing the predetermined signal; an image/sound output section; an analysis section for analyzing the predetermined signal; an illumination control section; and an illumination output section, wherein the image/sound output section functions as the image display device.

In still another embodiment, the above-described illumination device of the present invention comprises: a sensor section for measuring a predetermined information signal; an analysis section for analyzing a predetermined signal; an illumination control section; and an illumination output section.

In still another embodiment, the above-described illumination device of the present invention comprises: a data reception line; a reproduction section for reproducing a predetermined signal; a data storage device; an illumination control section; an illumination output section; and an image/sound output section, wherein the image/sound output section functions as the image display device.

In still another embodiment, the above-described illumination device of the present invention comprises: a reception section for receiving a predetermined signal; a reproduction section for reproducing the predetermined signal; an image/sound/illumination storage section; an image/sound/illumination control section; and an image/sound/illumination output section, wherein the image/sound/illumination output section functions as the image display device.

The reception section, the reproduction section, the image/sound/illumination storage section, the image/sound/illumination control section and the image/sound/illumination output section may be integrated.

Part of a light for display of the image output from the image display device may be used as illumination light.

A light source may be provided in a goggle type image display section.

An illumination output section and a sound output section may be integrated.

In one embodiment, the above-described illumination device of the present invention comprises a light source. The light source includes: a light emitting section; and at least one of a variable light color control section for variably controlling a light color of light emitted from the light emitting section, a variable luminous intensity distribution control section for variably controlling a light luminous distribution thereof, and a variable direction control section for variably controlling a direction thereof.

In another embodiment, the above-described illumination device of the present invention comprises an illumination appliance. The illumination appliance includes a light source; and at least one of a reception section, a data analysis section, a data mapping section, a sensor section, a reproduction section, a storage section, and a transmission section. The light source includes: a light emitting section; and at least one of a variable light color control section for variably controlling a light color of light emitted from the light emitting section, a variable luminous intensity distribution control section for variably controlling a light luminous distribution thereof, and a variable direction control section for variably controlling a direction thereof.

The above-described illumination device of the present invention may comprise at least one light source accommodated in a side of a body of the image display device.

Alternatively, the above-described illumination device of the present invention may comprise at least one light source accommodated in a frame of the image display device, the frame being positioned at a periphery of the screen of the image display device.

The above-described illumination device of the present invention may comprise at least one light source accommodated in the image display device, the at least one light source being removable.

In the above-described illumination control method of the present invention, the illumination may be controlled in association with a feeling of the appreciator appreciating the image display device in addition to the image displayed on the image display device.

In the above-described illumination control method of the present invention, a feeling of the appreciator may be monitored by measuring a brain potential or various types of biorhythms of the appreciator.

In the above-described illumination control method of the present invention, the illumination may be changed in association with a telephone or an interphone when a call is received by the telephone or interphone.

In the above-described illumination control method of the present invention, one or more light sources provided at a peripheral visual field may be controlled to represent an object color displayed on the screen.

In the above-described illumination control method of the present invention, a control mode of the illumination control may be selected in accordance with a preference of the appreciator.

In the above-described illumination control method of the present invention, data may be transmitted in a form of chromaticity information.

Alternatively, in the above-described illumination control method of the present invention, data may be transmitted in a device-dependent form so as to increase a data transmission rate.

The above-described illumination control method of the present invention further may comprise the step of controlling the illumination in accordance with speech information.

The above-described illumination control method of the present invention may comprise the steps of: storing an illumination control signal at a predetermined location; and realizing predetermined illumination control by reproducing the stored illumination control signal when the appreciator is appreciating the screen.

In the above-described illumination control method of the present invention, the illumination may be controlled in association with a feeling of the appreciator appreciating the image display device in addition to the image displayed on the image display device.

Preferably, a light emitting section is provided at a position wherein the light emitting section is shielded from the appreciator appreciating the image displayed on the image display device.

The above-described illumination device of the present invention may further comprise means for measuring a brain potential or various types of biorhythms of the appreciator.

In the above-described illumination device of the present invention, the illumination is changed in association with a telephone or an interphone when a call is received by the telephone or interphone.

In the above-described illumination device of the present invention, one or more light sources provided at a peripheral visual field may be controlled to represent an object color displayed on the screen.

The above-described illumination device of the present invention further includes a switching function in which a control mode of illumination control may be selected in accordance with a preference of the appreciator.

Data may be transmitted in a form of chromaticity information.

Alternatively, data may be transmitted in a device-dependent form so as to increase a data transmission rate.

The above-described illumination device of the present invention may further comprise means for controlling the illumination in accordance with speech information.

The above-described illumination device of the present invention may further comprise means for storing an illumination control signal. Predetermined illumination control may be realized by reproducing the stored illumination control signal when the appreciator is appreciating the screen.

According to the above-described illumination control method and illumination device of the present invention, illumination of an appreciation room is controlled in association with an image on an image display device so that the realism of the image displayed on the screen of the image display device can be enhanced.

In the above-described illumination control method, at least one of a level, a light color, a luminous intensity distribution, and a direction of light output from one or more light sources provided in the appreciation space may be controlled so that an illumination impression to the appreciation space is made substantially coincident with an illumination impression of a virtual image space imaginarily created from the image displayed on the image display device.

Further, in the above-described illumination control method, at least one of a level, a light color, a luminous intensity distribution, and a direction of light output from one or more light sources provided in the appreciation space may be controlled so that at least one of a level and a light color, and distribution and direction thereof, of illumination of the appreciation space are made substantially coincident with that of a virtual image space imaginarily created from the image displayed on the image display device.

According to the present invention, a realism as if an appreciator exists in the scene of an image displayed on the screen of an image display device can be obtained using a simple means.

BRIEF DESCRIPTION OF THE DRAWINGS

FIG. 3 is a configuration diagram of visual fields.

FIG. 4 is a configuration diagram showing a layout of an experimental room used in connection with the present invention.

FIGS. 6D($a$) and ($b$) are diagrams schematically showing a switching function enabling selection of illumination control methods in accordance with an appreciator's preferences.

FIGS. 6F($a$) and ($b$) are diagrams used for explaining the configuration and function of a multi-function light source which may be used as a light source for illuminating a guide visual field.

FIG. 7B($a$) is a diagram showing, when an image is changed, a correlation between an average output signal value during a predetermined period of time during which the image is changed and the lapsed time, and FIG. 7B($b$) is a diagram showing a correlation between the value of output (signal value) of illumination in association with the change in the image of FIG. 7B($a$) and the lapsed time.

FIG. 8 is a diagram schematically showing a configuration of an illumination device according to Example 2 of the present invention.

FIG. 13 is a diagram showing details of an illumination fixing section of the illumination device according to Example 5 of the present invention.

FIGS. 17($a$) and ($b$) are diagrams schematically showing the illumination device according to Example 8 of the present invention.

FIGS. 19(*a*) through (*c*) are diagrams showing an specific example of a light emitting section of the illumination device (illumination appliance) of FIG. 18.

FIGS. 22(*a*) and (*b*) are diagrams schematically showing a configuration of an illumination device of the present invention constructed using a data line connected between wire circuits or wireless circuits.

FIGS. 25(*a*) and (*b*) are diagrams schematically showing a configuration of an illumination device of the present invention in which the output of an image output section can be used as an illumination light output.

FIGS. 27(*a*) and (*b*) are a side view and a front view schematically showing an illumination device of the present invention in which a sound output section (speaker) and an illumination output section (light source) are integrated.

FIG. 31A is a diagram used for explaining a configuration of the illumination device of FIG. 30 in which brain potential and biological information are measured.

FIG. 31B is a diagram used for explaining another configuration of the illumination device of FIG. 30 in which brain potential and biological information are measured.

BEST MODE FOR CARRYING OUT THE INVENTION

Before describing specific embodiments of the present invention, results of evaluation experiments which the inventors have conducted in order to examine the validity of the conventional illumination control techniques will be described.

Specifically:

(1) a technique for controlling illumination in such a manner that the chromaticity and luminance of a wall surface at the rear of an image display device are equal to the average chromaticity and luminance of the whole screen or the background excluding a human flesh color;

(2) a technique for controlling illumination in such a manner that the hues of illumination on the ceiling, illumination on the left side wall, illumination on the right side wall, and illumination on the floor are equal to the average hues of four corresponding portions into which the screen of an image display device is divided;

(3) a technique for controlling illumination conditions of a space, in which an image reproduction device such as an image display device exists, in such a manner as to conform to illumination conditions of a space in which a target object in an image displayed on the image display device exists and in which the target object is imaged; and (4) a technique for adjusting, for each pixel in the screen of the image display device, the outputs of the R-G-B monochromatic fluorescent lamps included in an illumination output section are adjusted in accordance with the magnitudes of the R-G-B signals, respectively, thereby enhancing the purity of colors in the image.

The above-described four illumination control techniques are evaluated.

Figure 1:
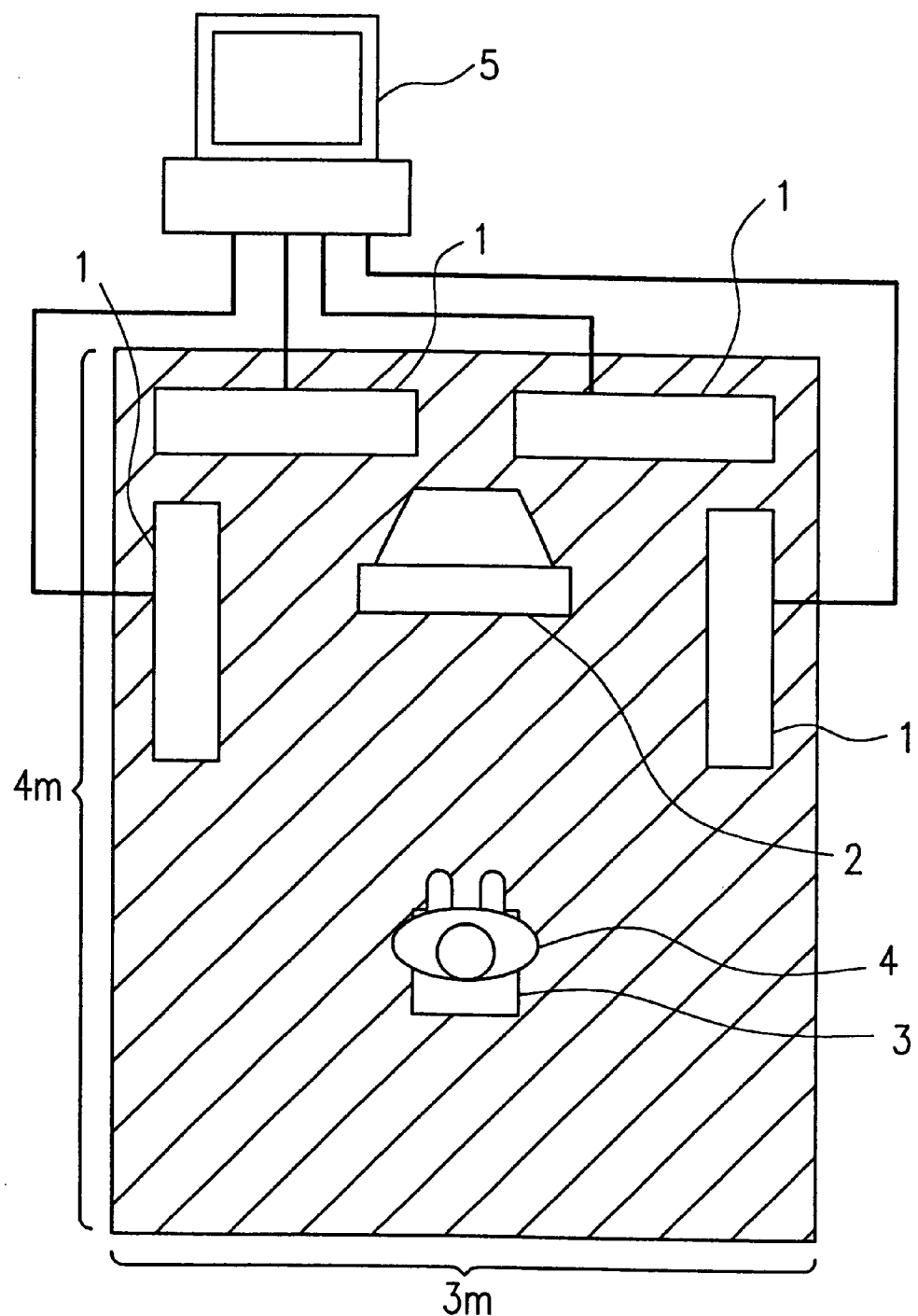
FIG. 1 is a configuration diagram showing a layout of an experimental room used in connection with the present invention.

The experiments were conducted in a 3m×4m experimental room as shown in FIG. 1. As for the interior of the experimental room, a ceiling, walls, and a floor each had an achromatic color, and had the respective reflectances of 90%, 50%, and 20%. An image display device (image/sound output section) 2 was provided, the rear side of which was opposed to one of the walls of the experimental room. A chair 3 on which an appreciator 4 is to be seated was provided at the middle of the floor. Seven illumination output sections (illumination devices) were provided near the wall behind the image display device 2, on the ceiling near the right and left walls, on the middle of the ceiling, and on the floor near the right and left walls (in FIG. 1, illumination output sections 1 on the middle of the ceiling and on the floor near the right and left walls are omitted). Each illumination output section 1 included an RGB monochromatic fluorescence lamp the output of which could be arbitrarily changed by a computer 5.

In order to evaluate the technique corresponding to (1), video images (specifically, a nature video movie (scenery of woods) and an entertainment video movie (motion picture "Die Hard 3")) were displayed on the image display device (image/sound output section) 2 in the above-described situation. The output of each lamp of the illumination output sections 1 was controlled in association with the video images in such a manner that the luminance and hue of the wall surface at the rear of the image display device 2 were equal to the average luminance and hue of the whole screen of the image display device 2. A control signal was stored in the computer 5 connected to the illumination output sections 1. The control signal was transmitted to each illumination output section 1 in association with the progression of the video images.

In the experiment, each appreciator (subject) 4 was seated on the chair 3 at the middle of the room. Each appreciator appreciated the video images which were displayed on the screen of the image display device 2 while performing the above-described illumination control. After the video image appreciation for 15 minutes, each subject 4 subjectively evaluated the realism of the screen on a 5-to-1 scale (i.e., "highly realistic", "realistic", "no change", "not realistic", and "poorly realistic"). The subjects 4 included six men and six women (25–50 years of age), i.e., a total of 12 people.

As a result of the above-described subjective evaluation experiment, ten of the twelve people answered "no change", and the remaining two people answered "not realistic".

Accordingly, it is considered that the technique for controlling illumination in such a manner that the chromaticity and luminance of a wall surface at the rear of an image display device 2 are equal to the average chromaticity and luminance of the whole screen of the image display device 2 has substantially no improvement in realism. If anything, a subject 4 suggested that the color of the screen of the image display device 2 appeared to fade.

Next, in order to evaluate the technique corresponding to (2), illumination was controlled in such a manner that the hues of illumination on the ceiling, illumination on the left side wall, illumination on the right side wall, and illumination on the floor were equal to the average hues of four corresponding portions into which the screen of an image display device is divided. The result was evaluated.

Specifically, the screen of the image display device 2 was divided into four portions, i.e., a top portion, a middle left portion, a middle right portion, and a bottom portion. The top portion corresponded to the illumination output section 1 on the middle of the ceiling. The middle left portion corresponded to the illumination output section 1 near the left wall. The middle right portion corresponded to the illumination output section 1 near the right wall. The bottom portion corresponded to the illumination output sections 1 on the floor near the right and left walls. Next, the average hue of each portion of the screen was calculated in accordance with the video images displayed on the image display device 2. The output of a lamp in each illumination output section 1 corresponding to each portion was controlled to be coincident with the corresponding calculated average hue. A control signal was stored in the computer 5 connected to the illumination output sections 1. The control signal was transmitted to each illumination output section 1 in association with the progression of the video images.

As a result of conducting a subjective evaluation experiment similar to that for the above-described technique, most subjects (appreciators) 4 answered "not realistic". After the experiment, the subjects gave their reasons, suggesting that the illumination on the middle of the ceiling caused the inside of the appreciation room to be too bright; a lack of continuity in illumination from the wall due to no illumination from the background exists; the degree of realism depended not only on hue but also luminance; and the like.

Thus, in the technique in which illumination is controlled in such a manner that the hues of an illumination lamp on the ceiling, an illumination lamp on the left side wall, an illumination lamp on the right side wall, and an illumination lamp on the floor are equal to the average hues of four corresponding portions into which the screen of an image display device is divided, there is a problem with the arrangement of the illumination lamps. It is determined that the luminance as well as the average hue must be controlled so as to obtain a sufficient effect, and the like, indicating that the technique is not practical.

Next, in order to evaluate the technique corresponding to (3), validity was evaluated for the technique for controlling illumination conditions of a space, in which an image reproduction device (image/sound output section) such as an image display device 2 exists, in such a manner as to conform to illumination conditions of a space in which a target object in an image displayed on the image display device 2 exists and in which the target object is imaged.

To this end, a video was taken of a scenery of a park near the inventors' working place. In the taking of the video, an illuminance level of daylight and a color temperature were measured and recorded. Thereafter, the taken video images were reproduced in the experimental room shown in FIG. 1 and were presented to the subjects 4. At the same time, an attempt was made to obtain the settings of illumination in the room such that the illuminance level and the color temperature recorded in taking of the video were reproduced.

The average color temperature of the measured values of daylight was about 6000 K. The average illuminance level was about 10000lX. A color temperature of 6000 K could easily be reproduced, but it was impossible to reproduce an illuminance level of 10000lX. Even when two additional illuminance output sections 1 were provided in the configuration shown in FIG. 1; about 3000lX could at most be obtained.

Under such conditions, an attempt was made to conduct an evaluation experiment. However, the luminance of the screen of the image display device 2 was so low that the color of images clearly appeared to fade in the room having an illuminace of about 3000lX. Therefore, the experiment was discontinued. It was concluded that the technique was invalid. According to this attempt, it has been found that the technique is not practical since daylight must be measured in taking the video.

Finally, in order to evaluate the technique corresponding to (4), the technique for enhancing the purity of colors of an image on the screen of the image display device 2 by illumination was evaluated.

In the evaluation, a still picture of a red flower (a rose) was used. The output of each fluorescent lamp of the illumination output sections 1 was adjusted in such a manner that the hue of the output is substantially equal to that of the rose. The inside of the room was illuminated in such a manner that illumination light was applied to the screen of the image display device 2. As a result, it was found that the technique did not improve realism, short of conducting a large scale evaluation in which many subjects 4 took part in. This is because light from the illumination output sections 1 illuminates the whole screen instead of only the rose image displayed on the screen of the image display device 2. Therefore, the background (a white wall behind the rose in this experiment) of the rose became reddish. An increase in red of the background was greater than an increase in the purity of red of the rose. Contrast between the background wall and the red color of the rose therefore decreased, so that the red of the rose appeared to fade.

Thus, the above-described evaluation experiments found that none of the above-described conventional techniques improve realism.

Before conducting the further study based on the above-described experimental results, the meaning of realism was studied (i.e., "what is realism?").

In an image technology field, several research findings have been reported on realism. Among other things, a report by Toshihiko HIROAKI et al. (Japanese Information Processing Society Research Report, Vol. 94, No. 29, pp. 9–14, 1994) describes realism systematically. Hereinafter, based on the research by HIROAKI et al., the inventors discuss their definition of realism and their approach to techniques for improving realism using illumination.

Figure 2:
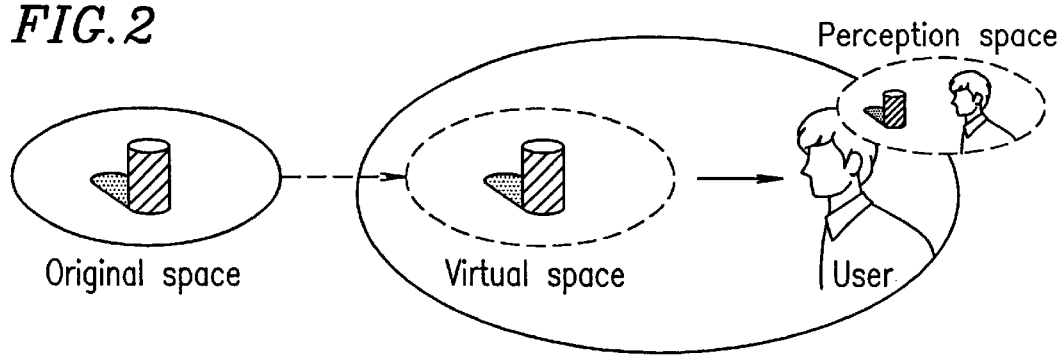
FIG. 2 is a diagram showing the concept of an virtual space.

In HIROAKI et al., a space represented by an image displayed on the image display device is called "virtual space" as shown in FIG. 2. HIROAKI et al. describes "when a space (original space) which does not exist physically in front of a viewer is represented by a means acceptable to the viewer (a stimulus, a physical phenomenon, or the like), if the representation has a practical effect on the viewer, the representation is defined as a virtual space", and also describes "when the viewer has a feeling as if the space represented on the virtual space existed in front of the viewer, the sense that the-viewer feels is realism." Further, "the viewer perceives and recognizes the virtual space, and constructs a perceptual space in his/her mind. Accordingly, the objective of the realism technology is to create a perceptual space having a higher level of presence based on the virtual space. In other words, the objective is 'how to deceive the brain'. The presence or absence of realism is subjectively determined with reference to the perceptual space. Therefore, any means may be effective as long as it can enhance the sense of the presence in the perceptual space. In addition to the fidelity, a technique for utilizing space recognition properties may be categorized as a realism technique."

The realism technique using illumination is one "technique utilizing the space recognition properties" described in HIROAKI et al.

Based on the above discussion, in the present invention, realism is defined as a "sense which the appreciator feels as if a virtual image space existed in front of the appreciator where the virtual image space is a space predicted from an image displayed on an image display device". A technique for improving realism by means of illumination is defined as a "technique for making the appreciator feel as if the virtual image space existed in front of the appreciator by utilizing effects of illumination on the space recognition".

As for the effects of illumination on the space recognition properties, recently, Mitsuo IKEDA and others (professor at Ritumeikan University and the emeritus professor of Tokyo Institute of Technology) has proposed a concept called "illumination recognition visual space". The illumination recognition visual space proposed by IKEDA and others is a space recognized in a human mind, which is created by illumination when a human enters a room and the human instantly judges how the room is illuminated using clues such as a light source of the room, a view of an object, and shade. On the other hand, in the psychology field, an illumination property determined based on the recognition "how this space is illuminated" also described by IKEDA and others is traditionally called an "illumination impression". Hereinafter, the above-described concept called the illumination recognition visual space by IKEDA and others is called the illumination impression in accordance with the above-described psychology definition.

Further, IKEDA et al. conducted an experiment in which the continuity of two spaces was evaluated based on the illumination recognition visual space concept (herein illumination impression). The two spaces were separated by a window or a wall. Illumination in the two spaces had a variety of different conditions. As a result, it has been found that continuity between the two spaces varied significantly, depending on illumination conditions, and that there was a particular illumination condition where the continuity of the two spaces appeared to be increased.

When the experimental result is applied to the present invention, whether the illumination impression of the virtual image space can be perceived and recognized from an image displayed on an image display device such as TV is a problem. It is considered that if the illumination impression can be perceived and recognized, there are particular illumination conditions under which the illumination impression of the appreciation room and the illumination impression of the virtual image space are caused to be continuous or to be coincident with each other by adjusting the illumination conditions of the appreciation room.

Initially, the inventors observed and evaluated various types of images in order to determine whether the illumination impression of the visual image space of the image displayed on the image display device could be obtained. The result found that it is possible to obtain the illumination impression of the virtual space from the image, and that the illumination impression of the virtual image space and the appreciation room can be caused to be coincident with each other or to be continuous by adjusting the illumination conditions of the appreciation room.

Next, the illumination factors crucial to the illumination impression are studied.

The dissertation of AKASHI who is one of the inventors ("Establishment of both a Sense of Brightness and Energy-Saving for Illumination in Office", September 1997, Musashi Institute of Technology) reports that key factors for the illumination impression are: the luminance of a portion of a visual field having the highest reflectance; the luminance of a high luminance portion such as gloss or highlight; the average luminance of the visual field if such portions do not exist; and a spatial and positional relationship between an illuminated plane and the position of a light source and the direction of illumination. In addition, IN et al. describes that illuminance and light color are key factors (Keirin IN, Taiichiro ISHIDA, and Mitsuo IKEDA, "Tolerable Range of Illuminance and Color of illumination light adding a sense of continuity to 2 room spaces", Illuminating Engineering Institute of Japan, Vol. 82, No. 8A, pp. 523–529, 1998).

Among the above-described factors, luminance is excluded because the luminance is determined using the reflection property of an object and a property of illumination. If only illumination is taken into account, it is concluded that three factors, i.e., illuminance, light color, and the position and illumination direction of alight source are crucial to illumination impression.

Next, the inventors studied what visual fields should be illuminated by a light source when an image displayed on an image display device such as TV is centered on the whole visual field of an appreciator, in order to control illumination for an appreciation space.

In HATADA (Tokyo Kogei University), as shown in FIG. 3, the visual field of a human is roughly divided into a discrimination visual field, an effective visual field, a guide visual field, and an auxiliary visual field in accordance with visual functions (Toyohiko HATADA, "Objective Measurement of Realism Using Broad Visual Field Moving Image", Technical Report of Institute of Television Engineering of Japan, VVI47-3, pp. 55–60, 1981). The discrimination visual field is a range in which a visual function such as visual acuity is excellent. The effective visual field is a range in which information can be accepted instantly by gazing using only ocular movement. The guide visual field is a range in which the guide visual field has an ability to discriminate not more than the presence of presented information, but the guide visual field has an influence on determination of a space coordinate system (a range sensitive to movement). The auxiliary visual field is a range in which a light perception threshold is observed in darkness (i.e., the presence of light can be perceived), but a shape is not recognized. Accordingly, if at least one light source is provided for each visual field and the light sources are separately controlled, the visual property of each visual field may be appropriately utilized to improve realism effectively. Further, by controlling a plurality of light sources separately, the impressions of light source positions or the direction of illumination, which are a factor of illumination impression, can be represented.

Next, an evaluation experiment relating to realism was conducted to clarify any requirement which each factor for illumination impression needs to satisfy in order to enhance realism of an image displayed on an image display device.

In the experiment, an experimental device shown in FIG. 4 was used. Specifically, as shown in FIG. 4, a total of 5 illumination output sections (illumination devices) 1 are provided at the rear, right, and left sides of the image display device (image/sound output section) 2, and at the right and left sides of the appreciator (subject) 4. A range illuminated by each illumination output section 1 corresponds to the effective, guide, or auxiliary visual field. Each illumination output section 1 may be controlled independently by a computer. Further, each illumination output section 1 includes RGB monochromatic fluorescent lamps the levels of which may be adjusted independently.

The images used in the evaluation experiment were the following: about 60 scene images selected from DVD data such as "Batman & Robin—The Revenge of Dr. Freeze" or "Virtual Trip -Bali-"; images of about 50 scenes selected from VHS video movie such as "Die Hard 3" or "Robin Hood"; and about 50 scene images selected from game software such as "Final Fantasy 7", "Denshade GO", or "Driving Simulation". Among these images, 16 representative images were carefully selected after a preliminary experiment, and were used in the actual evaluation experiment.

In the experiment, a total of 15 subjects 4 were seated at an observation position on a one-by-one basis, and viewed the screen of the image display device 1. Each subject 4 was asked to adjust each light source of the appreciation room, so as to try to obtain the highest realism of images displayed on the screen. Note that the subject 4 did not directly operate a computer in a specific adjustment procedure, rather the subject 4 orally instructed an experimenter (equipment operator), saying "please raise the luminance of the back slightly, and make the light color of the front slightly more red", for example. In response to the instruction, the experimenter operated the computer to control illumination. After the experiment, each subject 4 answered what idea he/she used as a reference to adjust the illumination.

The results of the experiment are as follows.

(1) Illumination impression also exists in a virtual image space.

This is supported since all the subjects self-examined and answered "illumination impression of a virtual image space could be perceived and recognized from images".

(2) The colors, levels, positions, and directions of illumination are key factors involved in the improvement in realism. Appropriate control of those conditions allows the realism of images to be improved.

(3) As for the levels of illumination, realism can be enhanced by adjusting the levels of illumination in the appreciation space in such a manner as to become substantially equal to the illumination levels of the virtual image space.

To attain the highest realism, the illumination levels of the virtual image space are preferably equal to the illumination levels of the appreciation space on a chromaticity diagram. The above-described IN et al. reports that in order to enhance the continuity between adjacent rooms (a target space and an observation space), a relationship between the illuminance Ek of the observation space and the illuminance Et of the target space should satisfy $0.67 \cdot Et < Ek < 1.25 \cdot Et$. Such values may be used as a guideline for the control of illumination.

The level of illumination generally indicates an illuminance level. The reflectance property of the interior of the appreciation space is not necessarily equal to that of the virtual image space. It is believed that when luminance is used as a reference, more accurate control can be obtained. As a result of the experiment, it was found that a preferable setting is $0<L'<1.25 \cdot L$ where L (cd/m$^2$) is the luminance of a pixel having the highest luminance in an image and L' (cd/m$^2$) is the luminance of a peripheral visual field. The control may be performed in such a manner as to satisfy the above-described relationship.

(4) As for the color of illumination, realism can be enhanced by adjusting the color of illumination in the appreciation space in such a manner as to become substantially equal to the light color of the virtual image space.

To attain the highest realism, the light color of the virtual image space is preferably equal to the light color of the appreciation space on a chromaticity diagram. The above-described IN et al. reports that in order to enhance the continuity between adjacent two rooms, a difference between the light colors of both rooms should fall in the range of ±0.04 on the X coordinate. Such data may be used as a guideline for the control of illumination. Note that as a result of the experiment it is found that when the categories of the colors of illumination in both rooms are coincident with each other, realism can be enhanced to some extent. For example, if illumination in a virtual image space uses a red light, illumination in an appreciation space may satisfy illuminance in a range in which light can be regarded as being substantially red. Using this method, the control can be easily performed.

(5) Realism closely relates to a sense of continuity, a sense of expansion, a sense of powerfulness, and the like. The sense of continuity is a sense that the appreciator feels that a virtual image space is continuously linked to an appreciation space. The sense of expansion is a sense that the appreciator feels that a space further continues in addition to the feeling of the continuous linkage. The sense of powerfulness is a sense that the appreciator feels that a space is looming toward the appreciator in addition to the feeling of the continuous linkage. The senses of continuity, expansion, and powerfulness are narrower concepts included within realism.

(6) The property of a light source, the flow of light, the direction of illumination, and the state of base illumination in a virtual image space can be expressed by the level, color, and position of a light source positioned in a peripheral visual field of an image display device.

(7) If the weight (level) of illumination for each of the effective, guide, and auxiliary visual fields is adjusted, various states of illumination can be created producing the senses of expansion and powerfulness.

For example, if the illuminance of illumination for the auxiliary visual field is higher than those for the other visual fields, a state in which light is emitted from the front of the appreciator toward the screen can be represented. Alternatively, if the illuminance of illumination for the effective visual field is higher than those for the other visual fields, a state in which strong light is emitted from the screen can be represented.

(8) If a light source is not seen by the appreciator, realism can be enhanced.

As shown in FIG. 4, a light shielding plate 51 is provided between the appreciator 4 and a light source (illumination output sections 1) so that the light source 1 is not seen by the appreciator 4. Such a situation is compared with the case where the light shielding plate 51 is not provided so that the light source 1 is seen by the appreciator 4. As a result, it is found that an improvement in realism is reduced by half when the light source 1 is seen. The result can appropriately be explained based on the above-described concepts of the illumination impression and the illumination recognition visual space. According to those concepts, it is believed that realism is improved when the illumination impression of an appreciation space is coincident with that of a virtual image space. If the light source of the appreciation space is seen by the appreciator, it appears that each space is illuminated by a separate light source. In other words, there is no continuity between illumination of the appreciation space and illumination of the virtual image space, so that realism is not improved. Therefore, a light source or light emission section (illumination output section) is preferably not seen by the appreciator by blocking light using a light shielding plate or the like.

EXAMPLE 1

Based on the above-described study results obtained by the inventors, a specific embodiment of an illumination control method will be described below as a first example of the present invention.

Figure 5A:
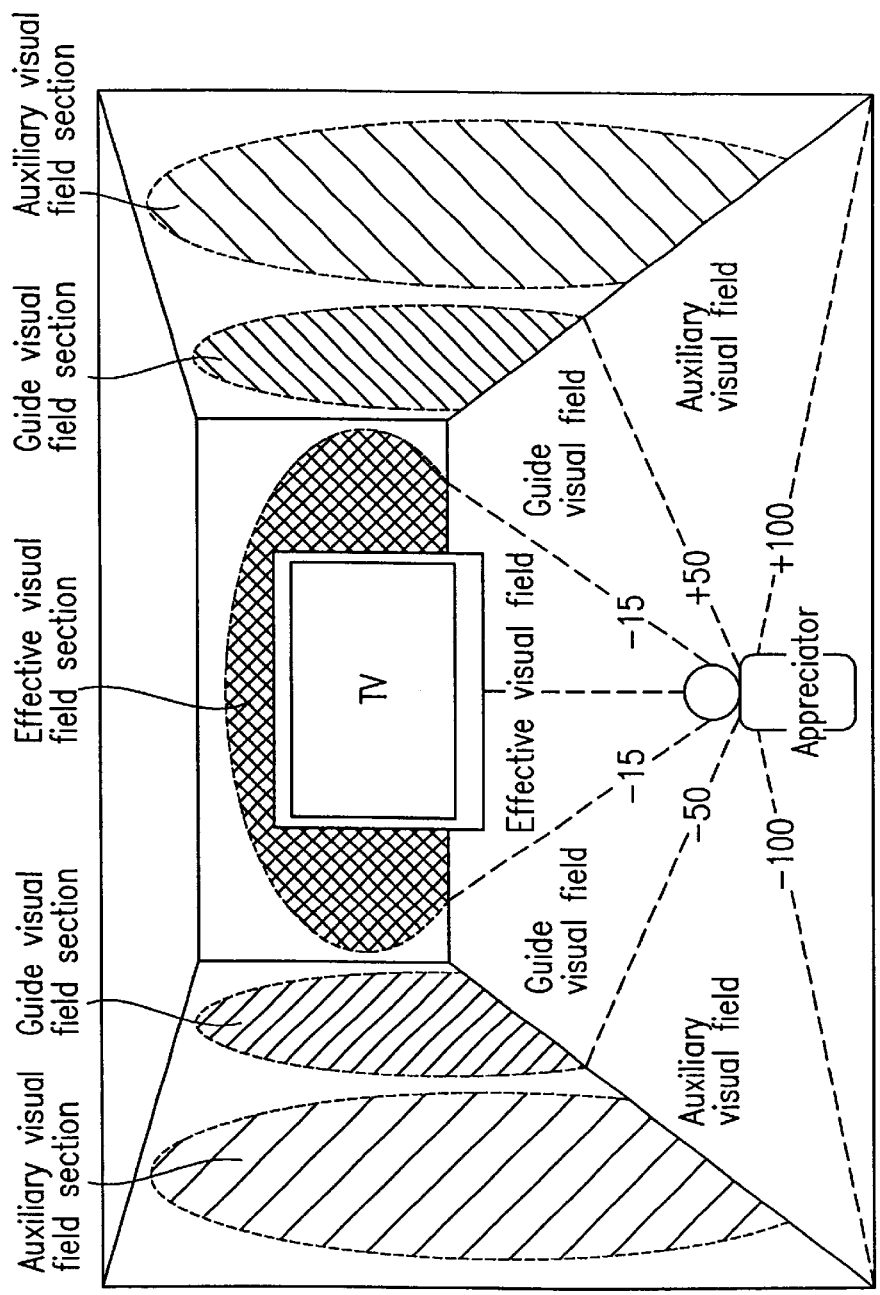
FIG. 5A is a diagram schematically showing a TV appreciation room to which an illumination control method of the present invention may be applied.

FIG. 5A is a diagram schematically showing a TV appreciation room to which the illumination control method of the present invention is applied. In the room, a relatively large-sized (e.g., 36 inch) TV is provided, the rear side of which is opposed to a wall side. The appreciator is seated a distance of 7H from the screen of the TV where H is the length of the screen of the TV. The appreciator watches the TV. With respect to a line from the appreciator through the TV screen, a range of ±15 degrees or less corresponds to the effective visual field, a range of ±50 or less degrees corresponds to the guide visual field, and a range of ±100 or less degrees corresponds to the auxiliary visual field. An effective visual field section, a guide visual field section, and an auxiliary visual field section are provided corresponding to the respective visual fields.

Figure 6A:
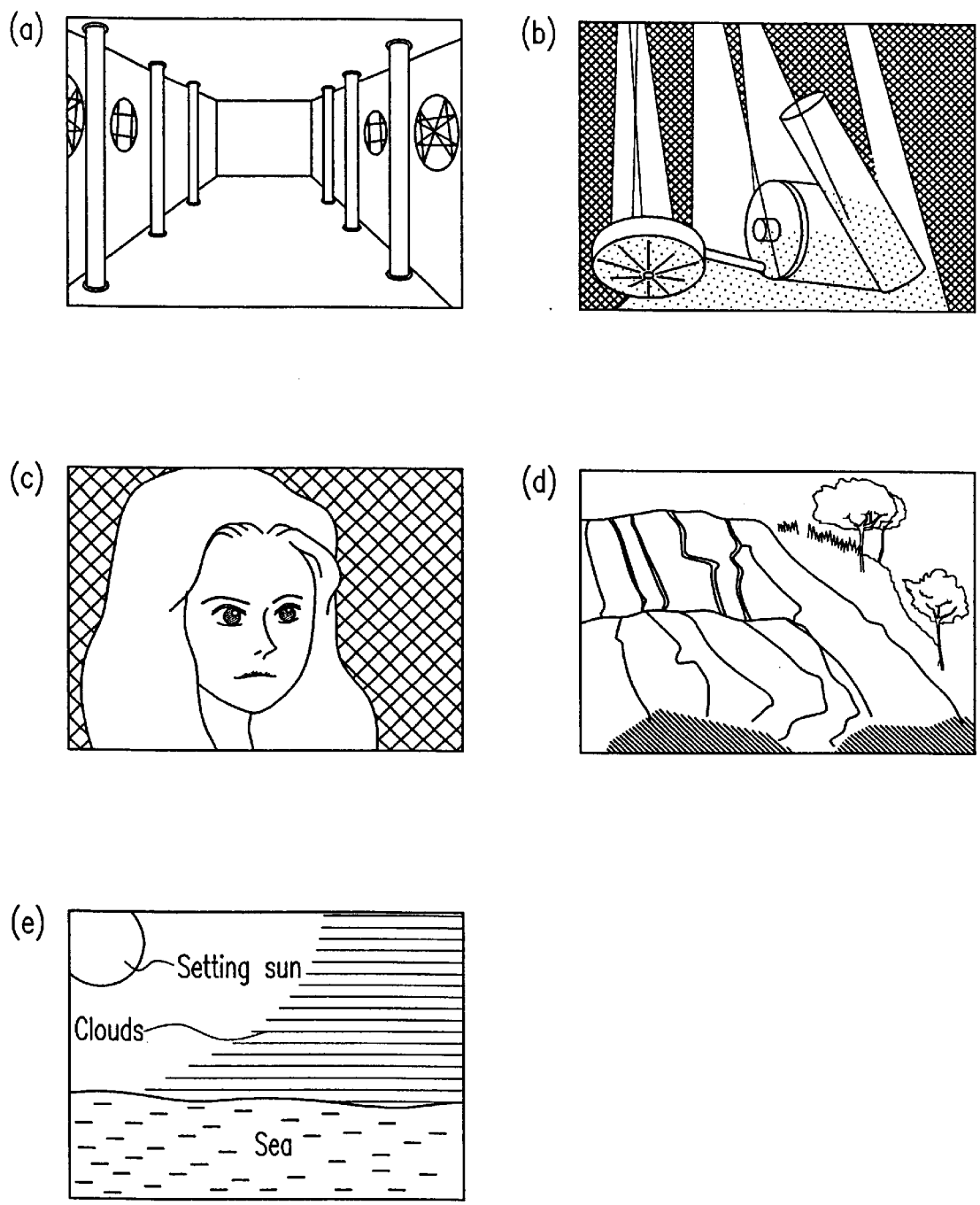
FIGS. 6A($a$) through ($e$) are diagrams showing image examples used for explaining an illumination control method for improving realism according to the present invention.

Initially, it is assumed that an image shown in FIG. 6A(a) is displayed on the TV screen. The image of FIG. 6A(a) shows a space in a large museum in which there are rows of pillars. The entire space is illuminated with blue light. Red light enters the inside the museum from windows.

In this case, the illumination of the appreciation space is adjusted in such a manner that illumination in the auxiliary visual field section and the guide visual field section has substantially the same light color as the blue of the light in the image. This leads to an impression that the illumination of the virtual image space is continuously linked to the illumination of the appreciation room. Thus, the continuity in illumination between both spaces is enhanced, thereby improving realism. Further, the illumination of the effective visual field section is red so as to represent a state in which red light is introduced through the windows in the image toward the appreciator. Thereby, the spatial continuity is enhanced, resulting in an improvement in realism.

Figure 6B:
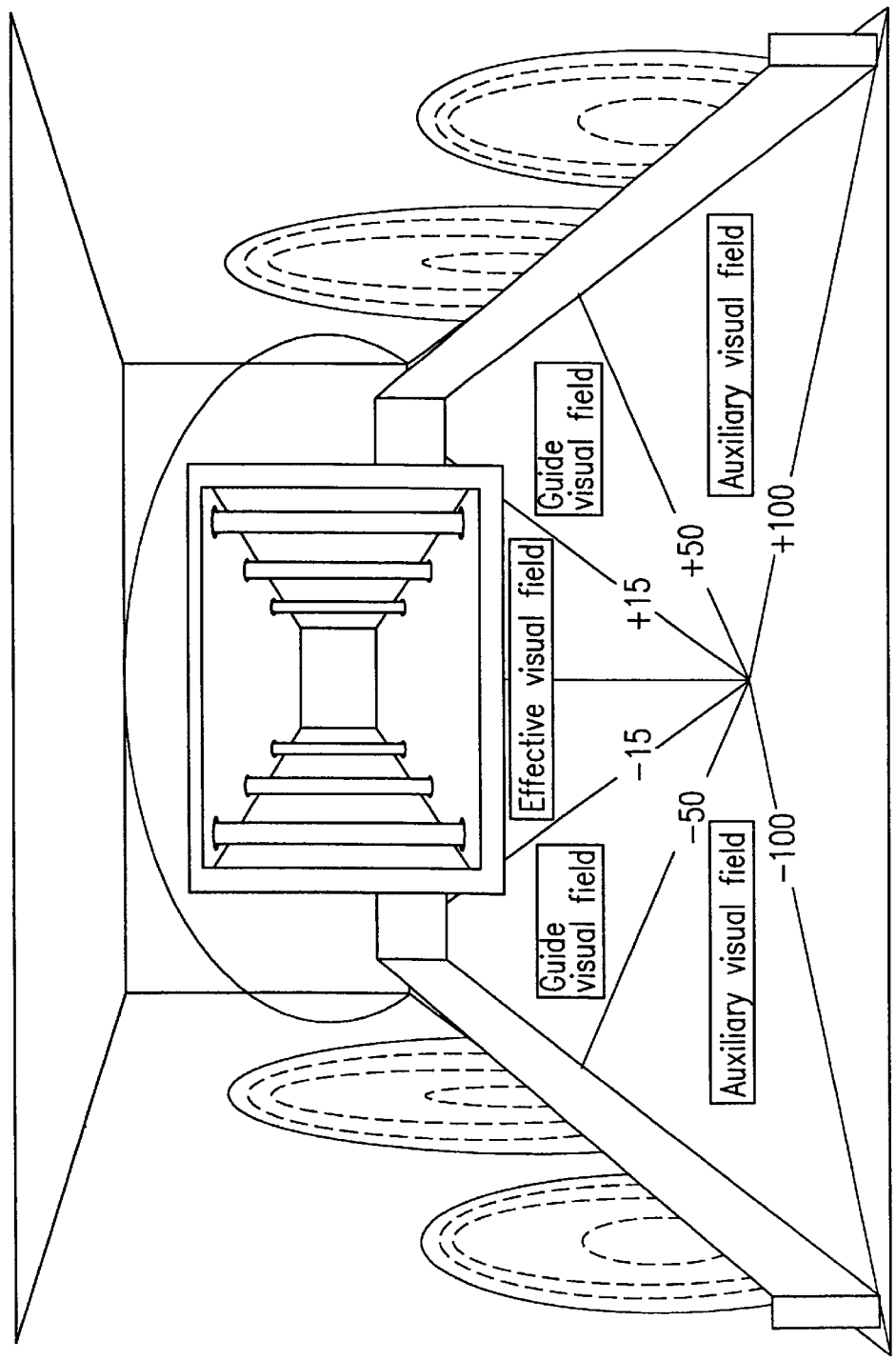
FIG. 6B is a diagram used for explaining an example of an illumination control method in the appreciation room of FIG. 5A.

Alternatively, when there is no light having a uniform luminance distribution and a strong directivity as shown in FIG. 6A(a), rather than causing the brightness of the light source of each visual field to be uniform, the brightness of the light source of the effective visual field is increased to be higher than the brightness of the light sources provided in the guide and auxiliary visual fields as indicated by the sizes of hatched ranges shown in FIG. 6B. Thereby, comfortable appreciation can be achieved. Thus, the above-described control method improves realism, and in addition, provides comfortable appreciation.

Next, it is assumed that an image shown in FIG. 6A(b) is displayed on the TV screen. The image of FIG. 6A(b) shows a scene in which a red spotlight having a strong directivity is shone on a big astronomical telescope from above. The light color of base illumination is blue.

In this case, as for the illumination of the appreciation space, illumination of the guide visual field section is set to blue light which is used in the base illumination. The illumination of the effective visual field section and the illumination of the auxiliary visual field section use red light in order to represent a situation that the red light having a strong directivity of the virtual image space reaches the appreciator.

Thus, a sense of powerfulness is enhanced in the effective visual field section. The appreciator feels as if he/she exists in the virtual image space. Alternatively, as for this image, red light may be provided in the guide visual field section and blue light may be provided in the auxiliary visual field section. Thereby, a situation in which the red spotlight reaches up to the feet of the appreciator can be represented. In this way, each visual field section can be appropriately and separately used, resulting in various representations of the expansion of light.

Figure 6C:
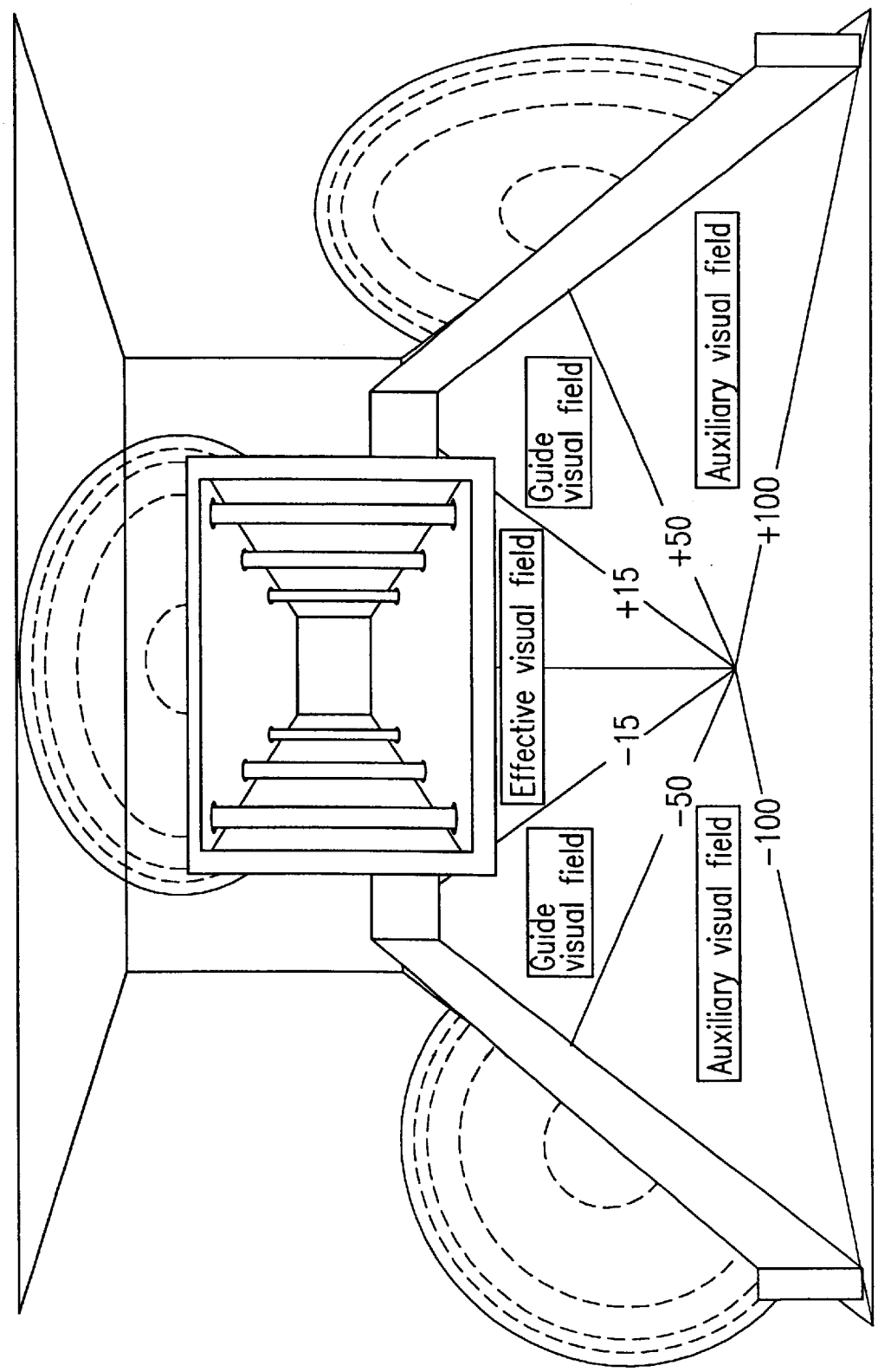
FIG. 6C is a diagram used for explaining another example of an illumination control method in the appreciation room of FIG. 5A.

Alternatively, as schematically indicated by the sizes of the hatched ranges in FIG. 6C, the brightness of the auxiliary visual field section is increased to be higher than the brightness of the effective visual field section, whereby the appreciator feels as if the red spotlight reaches the vicinity of the appreciator's feet.

Figure 5B:
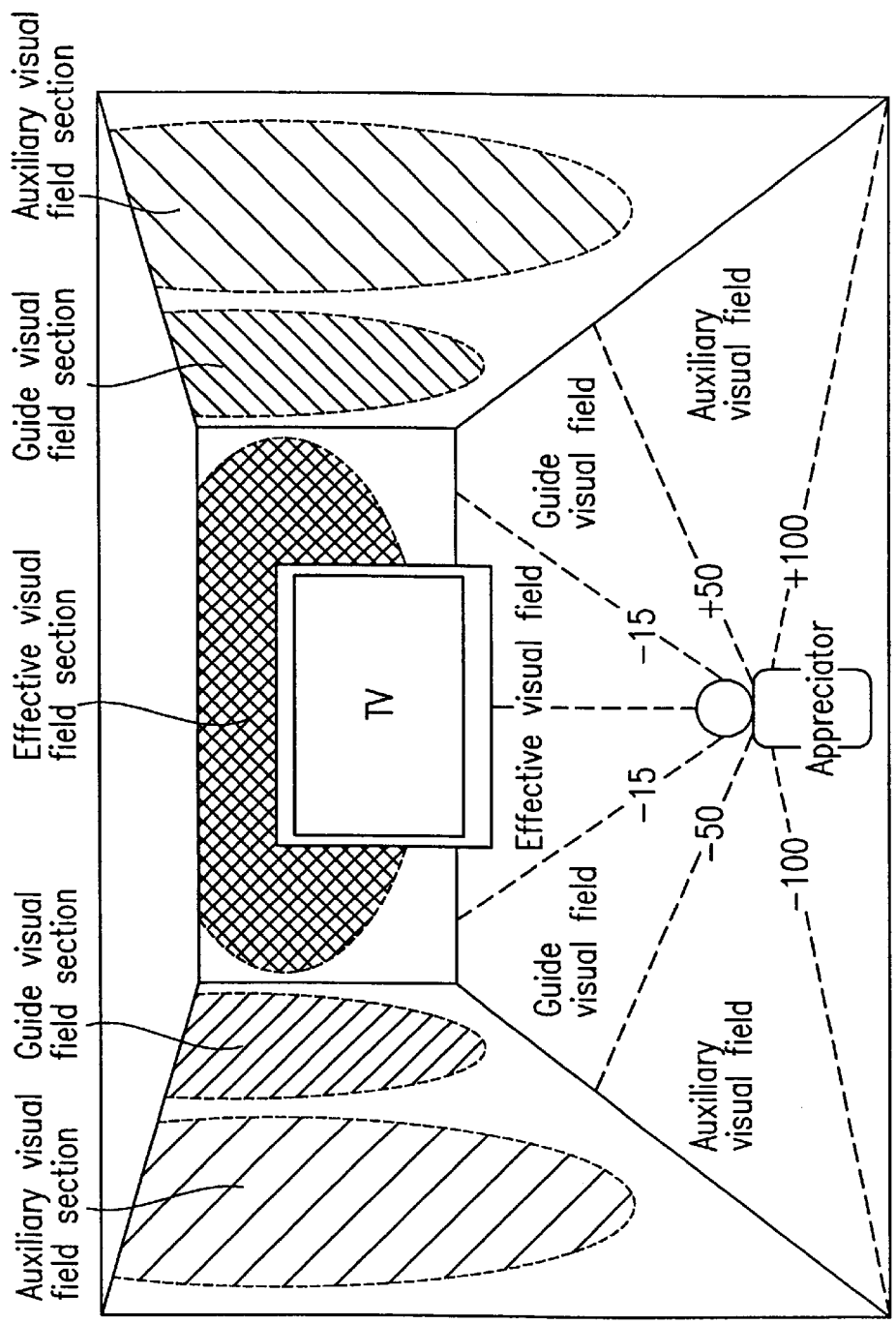
FIG. 5B is a diagram schematically illustrating a configuration example of a modified appreciation room of FIG. 5A.

Note that in the state shown in FIG. 6A(b), the red spotlight is emitted from above downwardly. Even when the illumination for each visual field illuminates directed from below to above as shown in FIG. 5A, if illumination is performed as described above, realism is improved. Similarly, as shown in FIG. 5B, even when the illumination for each visual field illuminates directing from above to below, no problems are caused. Note that as shown in FIG. 5A, the appreciator feels a phenomenal atmosphere more easily when the illumination for each visual field illuminates from below to above.

Figure 5C:
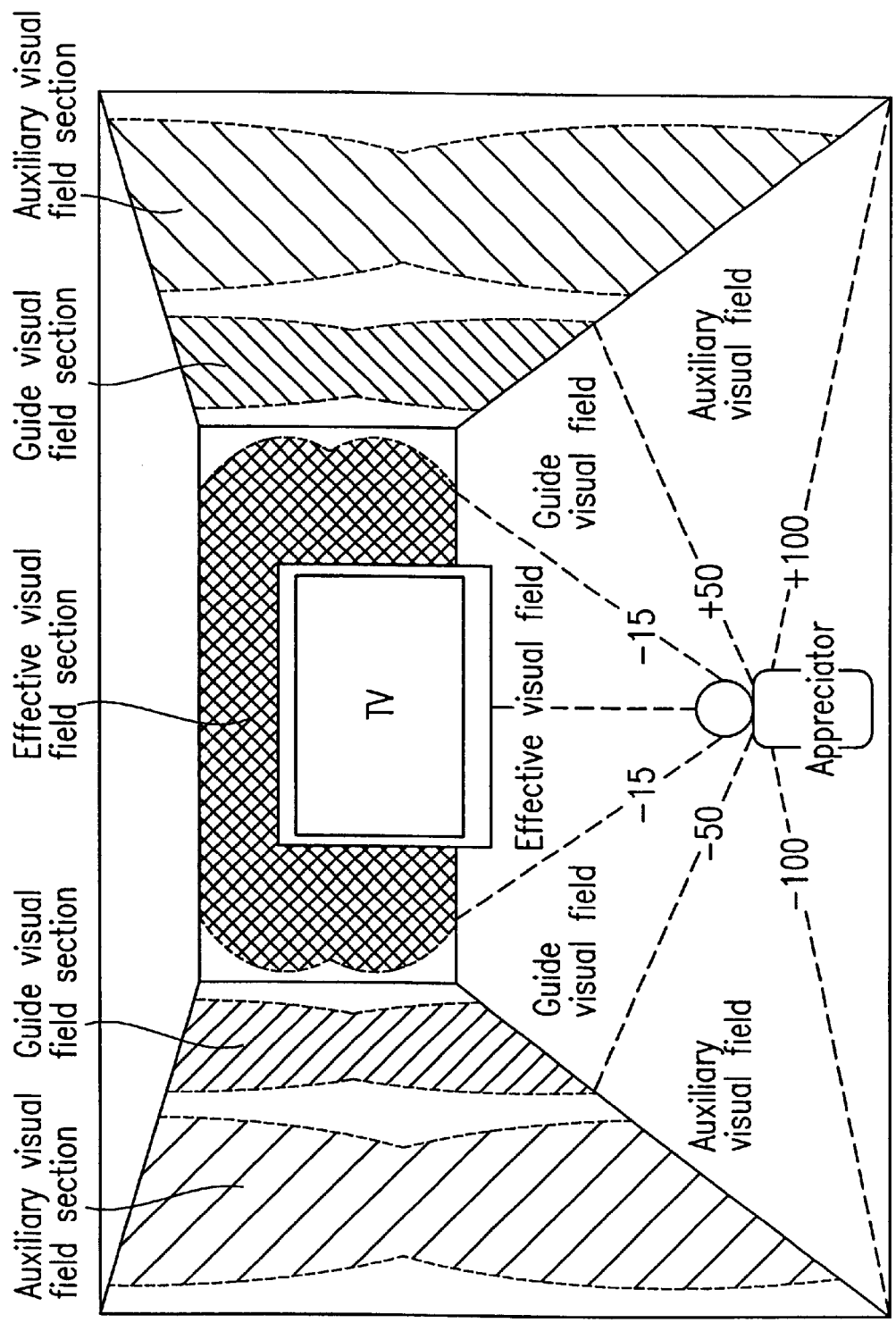
FIG. 5C is a diagram schematically illustrating another configuration example of a modified appreciation room of FIG. 5A.

Further, as shown in FIG. 5C, when illumination illuminating from below to above and illumination illuminating from above to below are combined, realism can further be improved. For example, the illumination illuminating from above to below is used for the effective visual field section while the illumination illuminating from below to above is used for the auxiliary visual field section. In this case, the appreciator more easily feels as if the red spotlight is being emitted.

Thus, an improvement in realism can be achieved by controlling the output and color of each light source in accordance with the luminance distribution state of the screen.

Next, it is assumed that an image shown in FIG. 6A(c) is displayed on the screen. FIG. 6A(c) is a close-up image of a girl's face illuminated with a light bulb. The background of the girl's face is dark.

In this case, the illumination of the virtual image space is positioned in front of the girl. In other words, when it is assumed that the virtual image space is continuously linked to the appreciation space, it is natural to consider that the illumination of the virtual image space is positioned between the girl and the appreciator. Therefore, for this image, the illumination of the guide visual field section is set to a light bulb color. Thereby, the above-described state of illumination can be represented, and continuity between the virtual image space and the appreciation space is naturally and effectively enhanced, resulting in an improvement in realism.

Next, it is assumed that an image shown in FIG. 6A(d) is displayed on the screen. FIG. 6A(d) is an image of a terraced rice paddy field in a tropical rain forest region. In the image, the weather is fine, and the terraced rice paddy field is illuminated by blue sky light and direct sunlight, so that the field looks bright and brilliantly green. There is shade in the front of the image. The direct sunlight is incident from the appreciator side toward the rear of the image.

For such an image, when the illumination of the auxiliary and effective visual field sections is set to a color close to the sunlight, the direction of light from the front of the appreciator toward the depth direction can be represented. Further, in this case, if the illumination of the auxiliary visual field section is green, expansion of the visual field can be represented. This is because a peripheral portion of the visual field of a human such as the auxiliary visual field section has low visual function and cannot discriminate the shape or color of an object and therefore the green light gives the appreciator an illusion that the green of the terraced rice paddy field stretches. Instead of the color of illumination (color of a light source), the color of an object (object color) can be represented by appropriately utilizing the difference between the visual function of each visual field. Realism is improved by any one of the above-described methods.

Next, it is assumed that an image shown in FIG. 6A(e) is displayed on the screen. FIG. 6A(e) is an image of a beautiful sunset. In the image, the sun is red, and the sky around the sun is colored red. The sky corresponding to the right bottom half is covered with thin cloud, glowing a deep green. The sea is dark blue.

For such an image, the illumination of the effective visual field section is set to the red color of the sun; the illumination of the guide visual field section is set to the dark green color of the cloud: and the illumination of the auxiliary visual field section is set to the dark blue of the sea. In this way, the illumination of each visual field is separately used in accordance with the position of light on the screen, thereby enhancing the sense of continuity between the virtual image space and the appreciation space. In other words, the light existing at the upper portion of the image is represented using the effective visual field; the light existing at the lower portion thereof is represented using the auxiliary visual field; and the light of the middle portion thereof is represented using the guide visual field. This method is effective. The inventors call this an "upper-middle-lower principle".

The above-described meticulous illumination control leads to an achievement of startling effects. Note that in order to conduct such illumination control automatically and in real time, the position or color of a light source needs to be estimated from image data. Most of means for such estimation are the above-described techniques including the representative "upper-middle-lower principle". Some additional means are provided below.

The inventors have studied many images. As a result, it has been found that a light source often has the highest luminance in an image. No problems are caused when a portion having the highest luminance is regarded as a light source after analyzing the luminance of every pixel in an image. Light emitted or reflected from the portion having the highest luminance is dominant as light in the virtual image space even if it is not from the light source. Therefore, if an image processing filter which detects a portion of an image having the highest luminance is prepared in advance, processing time is reduced.

As described above, the techniques for improving realism using illumination utilize perception and recognition effects. Therefore, realism may be enhanced most effectively using a method in which illumination conditions are determined by a sensitive and experienced person appreciating the meanings of images. It is needless to say that the most effective method is a method in which illumination data is previously stored in a storage medium such as a DVD or video tape and is reproduced along with the images. The second most effective method may be a method in which many representative images and the appropriate illumination conditions thereof are stored in files as a database, and in reproducing an image, an optimum illumination condition is extracted by causing image data to be displayed coincident with the image data file previously stored. In the future, time required for such coincidence with the database is likely to be further reduced as computer technology such as memory makes progress.

FIGS. 6D(a) and (b) are diagrams schematically showing a switching function which enables selection of illumination control methods in accordance with the appreciator's preferences.

When viewing an image on a TV, it is important to improve realism so that the appreciator feels as if he/she exists in the image scene. It is also important to appreciate in a relaxed state. To this end, in a configuration of FIG. 6D(a), for example, an illumination control method for improving realism and improving a sense of relaxation is provided as a "standard mode". Further, an illumination control method for an optimum realism improvement is provided as a "dynamic mode". An illumination control method for an optimum sense of relaxation is provided as a "relaxation mode". A mode capable of freely selecting illumination control methods in accordance with the appreciator's preferences is provided as a "preference mode". In a configuration shown in FIG. 6D(b), the switching function capable of selecting from more modes is schematically shown. Examples of the modes include the above-described "standard mode" and "dynamic mode". Arbitrary modes may also be provided.

Note that realism and the sense of relaxation are particularly mentioned in the above-described example. No problems are caused if other psychological effects are added. Such cases are within the scope of the present invention. The names of the modes or the arrangement order and configuration of the switches are not limited to the particular ones including the examples shown in the drawings. Other names of the modes, or arrangement orders and configurations of the switches are included in the present invention.

Figure 6E:
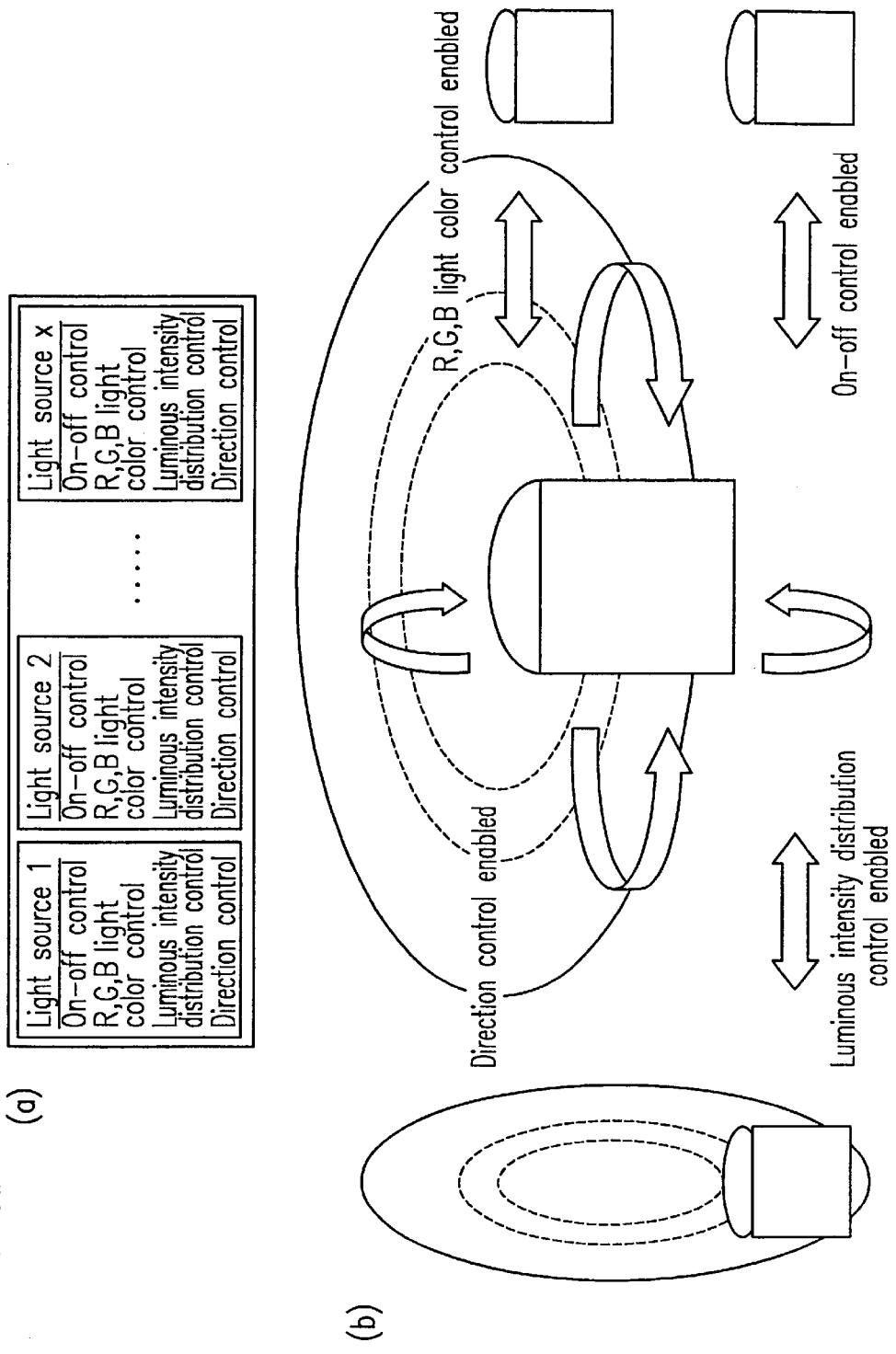
FIG. 6E($a$) and ($b$) are diagrams used for explaining the configuration and function of a multi-function light source which may be used as a light source for illuminating an effective visual field.

FIGS. 6E(a) and (b) are diagrams used for explaining the configuration and functions of a multi-function light source which may be used as a light source for illumination of the effective visual field. The multi-function light source which may be used for the above-described objective includes a plurality of light sources (light source 1 through light source x: x is an arbitrary natural number which is 2 or more) as shown in FIG. 6E(a). Each light source is capable of on-off control, variable R-G-B light color control, variable light distribution control, and variable light direction control. FIG. 6E(b) schematically shows each of the above-described controls. The on-off control allows a capability of turning on or off the output of light instantly. The variable R-G-B light color control allows control in which the color of a light output can be freely changed. The variable light distribution control allows a capability of controlling distribution of light output (indicated by an ellipse in FIG. 6E(b)), i.e., the angle of spreading light. The variable light direction control allows a capability of changing the orientation of a light source to any direction by rotation or the like.

FIGS. 6F(a) and (b) are diagrams used for explaining the configuration and functions of a multi-function light source which may be used as a light source for illumination of the guide visual field. The multi-function light source which may be used for the above-described objective includes a plurality of light sources (light source 1 through light source x: x is an arbitrary natural number which is 2 or more) as shown in FIG. 6F(a). Each light source is capable of on-off control, variable R-G-B light color control, variable light distribution control, and variable light direction control. These functions are the same as described above. In particular, as shown in FIG. 6F(b); light sources are provided at high density so that fine on-off control can be performed, which is a feature of the light source of the present invention. FIG. 6F(b) schematically shows how each light source emits light. A plurality of light sources are provided at high density in this way, thereby making it possible to realize illumination in which the properties of a human guide visual field are fully utilized.

The above-described illumination control methods may be realized by any illumination appliances or light sources. The greater the number of light sources and circuits controlling the light sources, the finer the control. Realism is further improved by using the light sources and the circuits appropriately.

The foregoing is derived from the results of experiments where there are a plurality of light sources. For the purpose of practical use, control should be as simple as possible. Therefore, an experiment in which realism is enhanced by controlling a light source having a single circuit was conducted.

The experiment was conducted in the above-described experimental room shown in FIG. 1. Each illumination output section 1 shown in FIG. 1 could be separately controlled by simple operations using a computer to adjust the illuminance and light color thereof. For evaluation, typical scenes were extracted from various nature videos or movie videos. Each scene for evaluation was 3 minutes long. Each scene displayed was selected based on low variation in illumination.

In the experiment, each subject (appreciator) 4 was seated on the chair 3 at the middle of the experimental room on a one-by-one basis. The subject 4 held a notebook computer for controlling illumination. The subject 4 was instructed to "adjust the illumination conditions of the room in order to enhance realism on the screen of the image display device 2". The subject 4 had 3 minutes to adjust the illumination conditions of the room for each evaluation scene. The subjects 4 included six men and six women (25–50 years of age), i.e., a total of 12 people, similar to the above-described experiment.

The resulting experimental data on the illuminance, luminance distribution, and hue of the room were averaged for all the subjects. As a result, it was found that there is a relationship as shown in FIG. 7A between the chromaticity of the room illumination and the chromaticity of the images.

Figure 7A:
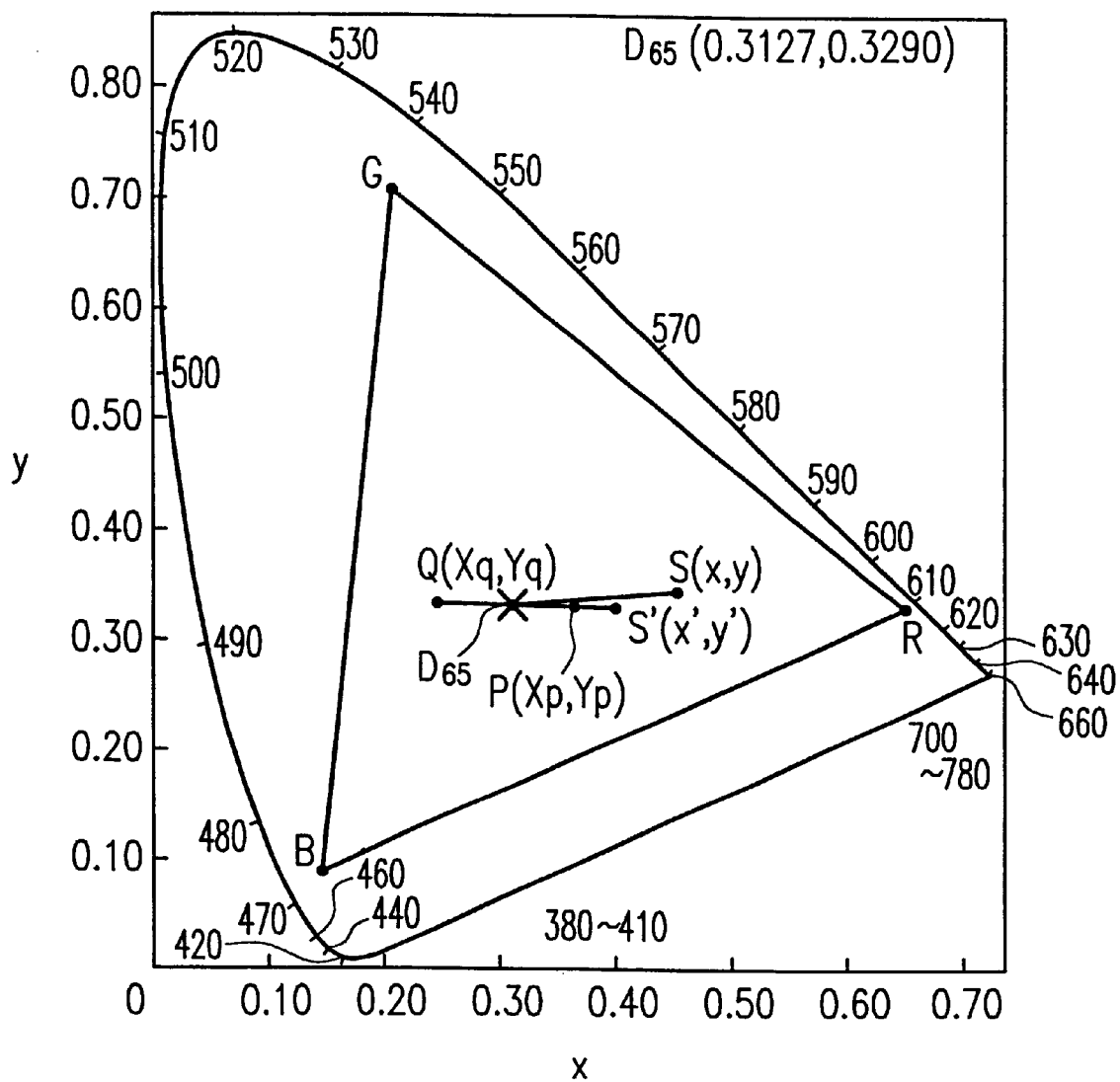
FIG. 7A is a diagram showing a result of an experiment in an x-y chromaticity diagram (xyz color coordinate).

FIG. 7A is a chromaticity diagram based on the XYZ color coordinates. The chromaticity diagram shows standard light $D_{65}$ ((0.3127, 0.3290), the average white point of the image display device 2 used in this experiment is set to $D_{65}$), the average chromaticity S(x, y) of the whole screen of the image display device 2, and the average chromaticity S'(x', y') of the background excluding main target objects from the whole screen of the image display device 2. Further, the average chromaticity of the room illumination obtained in the experiment is indicated by a point P(Xp, Yp).

FIG. 7A shows that the average chromaticity p of the room illumination obtained in the experiment is substantially positioned on a line between the average chromaticity S(x, y) of the whole image of the image display device and the standard light $D_{65}$ (0.3127, 0.3290).

The illuminance level obtained in the experiment was about 50lx. Under such an illuminance condition, the luminance of a wall at the rear of the image display device 2 was about 80% of the average luminance of the whole screen of the image display device 2. The average chromaticity p of the room illumination obtained in the experiment is compared with the average chromaticity S'(x', y') of the background excluding main target objects from the whole screen of the image display device 2. It is found that the average chromaticity p of the room illumination obtained in the experiment is substantially positioned on a line between the average chromaticity S(x, y) of the whole image of the image display device and the standard light $D_{65}$ (0.3127, 0.3290) and that the coordinate of S' is nearer the coordinate of P than the coordinate of S, similar to the case of the point S.

Thus, it is found that in order to obtain realism in images on the image display device, the room illumination needs to be controlled under a condition that the wall at the rear of the image display device has substantially the same hue, and slightly lower color saturation and luminance as compared with the average chromaticity of the background excluding main target objects such as a human in the image scene. It is found that instead of the average chromaticity of the background excluding the main target objects, the average chromaticity of the whole image can be used for the same control as described above to obtain substantially the same effects.

Further, the above-described experiment demonstrates that the appearance of vivid colors of the main target objects on the screen are key factors for enhancement of realism. Seven of the 12 subjects answered that there were two room illumination conditions under which realism was enhanced on the screen of the image display device.

The average of the other answer is a point Q(Xq, Yq) in FIG. 7A. The point Q is on a side opposite to the point S(x, y) or the point S'(x', y') with respect to the white color point $D_{65}$. Note that since both conditions for the points P and Q cannot simultaneously be satisfied, a method should be selected from a plurality of options in a manner such as "mode selection".

Further, a detailed analysis was conducted based on the comments of the subjects. As a result, it was found that the subjects did not adjust the room illumination to the average chromaticity of the background in the screen. Rather, they adjusted the room illumination in such a manner that there was continuity between the illumination in a scene displayed on the screen of the image display device and the room illumination. As for the continuity in illumination, Mitsuo IKEDA et al. conducted an evaluation experiment for continuity between the illumination of a room separated by a glass window from outside and the illumination of the outside.

IKEDA et al. found that a person in a room can specify the conditions of room illumination based on the illumination conditions (illuminance and color temperature) of the outside in such a manner that he/she feels "there is continuity between the illumination of the inside and outside of the room"; that in that case the illuminance condition of a room is not the same high illuminance as that of the outside, but is a one hundredth of that of the outside which is commensurate with the illuminance condition of the room illumination; and that there is not a large difference among individuals with respect to the illuminance condition of the room illumination where the appreciator feels that there is continuity in illumination between the outside and the room. The results of the experiment conducted in the present invention are supported by the theory of the continuity in illumination proposed by IKEDA et al. It can be considered that the appreciator felt an improvement in realism in an image on the image display device by designating the illumination in the appreciation room in such a manner that the appreciator felt that there is continuity between a scene on the image display device and the illumination in the appreciation room.

It is believed that illumination impression (i.e., room illumination is performed by what type of light source and at what illuminance level) is determined using clues such as the appearance of a white surface like a paper or the appearance of a glossy surface like a metal doorknob. To examine such a determination, the experimental data was analyzed by comparing with the images on the image display device. As a result, it was confirmed that the appreciator adjusted illumination conditions in such a manner as to be substantially coincident with the chromaticity of the whitest of the objects displayed on the screen. As for room illuminance, a correspondence relationship between the resulting illuminance value and the highest luminance portion of the background excluding the main target objects was analyzed. As a result, there is a positive correlation between the resulting illuminance value and the illuminance portion of the image, having a relationship given by:

$$Y=1.04 \cdot L+20 \tag{1}$$

where Y is the illuminance (lx) of the room; and L is the average luminance (cd/m$^2$) of the screen.

When expression (1) is used, the illuminance value needs to be corrected in accordance with the luminance characteristics of a display. A procedure of the correction is not complicated. The illuminance value obtained by expression (1) may be multiplied with the ratio of the maximum luminance 120 cd/m$^2$ of a television actually used and the maximum luminance of the display. Note that the correlation coefficient of the regression expression was 0.59 which is not very high.

Therefore, each scene used in the experiment was presented to the subjects who were in turn asked to state the illuminance value corresponding to their illumination impression of the screen. The stated value was compared with the illuminance data previously obtained by adjustment using a keyboard. As a result, there was a specific correspondence between the stated value and the illuminance data. The illuminance value of the experimental room with respect to the illuminance of the illumination impression of the screen can be formed by:

$$Y=0.098 \cdot E+10.2 \tag{2}$$

where Y is the above-described illuminance (lx) of the room; and E is the stated illuminance (lx) of the illumination impression of the screen.

The correlation coefficient of the regression expression for expression (2) is 0.78 which is high. An illuminance of the room at which the appreciator feels that there is continuity between the screen and the room is about one hundredth of the illuminance stated as the illumination impression of the screen. Therefore, in order to calculate, at high precision, an illuminance of the room at which the appreciator feels that there is continuity between the screen and the room, it may be better to evaluate the illumination impression of the screen using the illuminance value and calculate one hundredth of the illuminance value than to calculate and predict the room illuminance based on physical data such as the screen luminance. Note that in the method, illumination control conditions need to be designated so as to be appropriate for images on the image display device in advance. Accordingly, the method has disadvantages that a real-time analysis is impossible and the operator's task is heavy. Therefore, from the practical view point it is considered that it is preferable to adopt an illumination control method in which hue is substantially the same, and the color saturation and luminance are slightly lower as compared with the above-described average chromaticity of the screen.

Up to this point, a method for determining illumination conditions appropriate for a still image has been described.

A general image is often a moving image rather than a still image. It was studied whether there is a problem when illumination is associated with a moving image. As a result, the following problems were found:

(1) when an image is a moving image varying vigorously, if illumination is controlled in synchronization with an image signal for each frame, a flicker or a sense of discomfort occurs;

(2) when illumination is changed in real time in accordance with a result of image processing, the image processing consumes time, so that control of the illumination is delayed with respect to an image, resulting in a sense of unnaturalness or discomfort; and (3) when the luminance of an image is low, illumination control may appear to malfunction.

As to problem (1), when a result of image analysis indicates that the frequency of variation of illumination to be controlled is likely to be about 60 Hz or less, a frequency causing a human to sense a flicker, it is possible to avoid falling into the frequency range in which a human senses a flicker by the following method: limiting the level of variation in illumination; processing the average of images during a certain period of time; omitting a frame; controlling (changing) illumination only when a change in an image exceeds a certain threshold; or the like. The "certain threshold" is about one fourth of the maximum brightness.

FIGS. 7B(a) and (b) respectively show a correlation diagram between the average output signal value (see FIG. 7B(a)) of a certain portion of an image and the time course and a correlation diagram between the output value (signal value) (see FIG. 7B(b))of illumination in association with the average output signal value and the time course, when illumination is changed in accordance with the average value of an image during a certain period of time during which the image continues to change in order to prevent a flicker or a sense of discomfort which the appreciator feels when illumination varies in synchronization with an image varying dramatically. As shown in FIG. 7B(a), the signal value of an image often changes instantly when changing between each image. When the signal value of illumination is similarly changed instantly, a flicker or a sense of discomfort often occurs. Therefore, in FIG. 7B(b), a signal value of illumination to be in synchronization with the image signal value is set to a value obtained by averaging five image data before and five image data after a displayed image. A period of time during which the average is calculated is preferably equal to a period of time appropriate for a characteristic of the visual field. As for the control method for relaxing a light source corresponding to each visual field, not only the case where the they are the same but the case where they are different are included in the present invention. Further, the case where the average data is obtained only from image data displayed earlier than the image data to be synchronized, the case where the average data is obtained only from image data displayed later than image data to be synchronized, or the case where discrete data is selected and used are included in the present invention. Further, the number of image data to be averaged may be 2 or more.

As to problem (2), a human eye can recognize a slight time difference. Therefore, a time difference between an image and illumination must be prohibited. It is believed that a tolerable value is about one second. Some methods may be required for preventing the time difference from exceeding the tolerable value. For example, after image data has been stored in a memory and the image data has been analyzed to find illumination conditions, the image data is output concurrently along with illumination. Alternatively, a signal is transmitted in a device-dependent data form in order to speed up the data transmission. Alternatively, one in every several image frames is analyzed in order to save time instead of analyzing all image frames.

The above-described problem (3) means that illumination may provide an unexpected color of light when an image displayed on the image display device has low luminance and low color saturation. The cause for this is that any color having low luminance and low color saturation appears to be black irrespective of hue. However, if the chromaticity is analyzed, a hue can be found. When illumination is controlled in such a manner as to be coincident with the chromaticity using a high level realism illumination control method, a vivid color of light appears since the color is a color of a light source.

To avoid such a problem, illumination may be turned off or changed into a white color having low luminance when the luminance and color saturation are below certain levels.

The illumination control method described in Example 1 is referred to as a high level realism illumination control method or a high level realism illumination control algorithm.

Image compression techniques which are being vigorously researched and developed in the multimedia field can be applied in order to separate a main target object such as a human from the background.

For example, in the MPEG2 format which is a standardized image compression format, an object which often moves is extracted as a main target object and an object which seldom moves is judged as a background, in order to eliminate redundancy of moving images. Only information on the main target object which often moves is transferred while information on the background which seldom moves is transferred at low frequency. Therefore, in a sense, the background and the main target object have already been separated from each other, both are retrieved separately before being synthesized by a decoder in a DVD video player or the like. In such a case, only the background is subjected to image processing, so that the average chromaticity and average luminance of the background is easily obtained.

In the MPEG4 format which is nearing practical use, a main target object and a background are separately photographed and information on both images is separately transmitted as both are separated. In this case, it is even more easier to obtain image information on the background, and a transmitted signal having the background image information may be used as it is.

Further, if information such as the position of a light source or the characteristics of a light source (the type, spectral distribution, light distribution, color, and the like of the light source) are included in image compression data, it becomes easier to extract the light source.

Figure 7C:
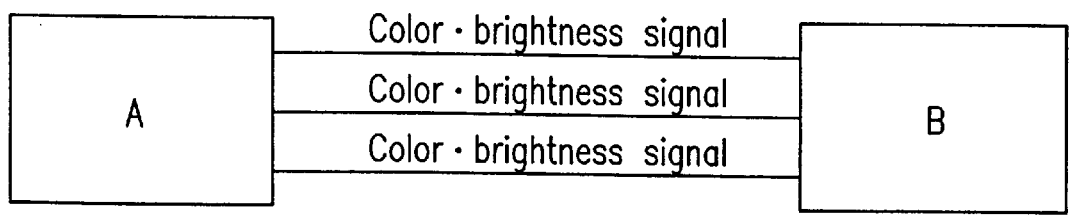
FIG. 7C is a diagram schematically showing a configuration in which data is transmitted in the form of a color and brightness signal in order to obtain easier data transformation in accordance with an appreciator's preferences.

FIG. 7C is a diagram schematically showing a configuration in which data is transmitted in the form of a color and brightness signal in order to obtain easier data transformation in accordance with the appreciator's preferences. An example of the color and brightness signal is a device-independent signal, such as (Y, x, y), which is most effective since the signal is independent of devices and it is easy to find what color the signal is converted into.

Figure 7D:
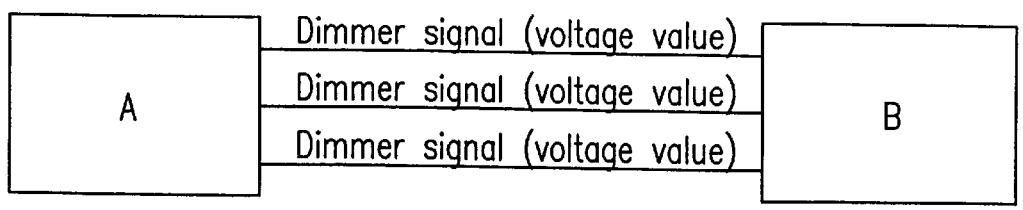
FIG. 7D is a diagram schematically showing a configuration in which transmitted data such as a dimmer signal is in a device-dependent form of a lamp output voltage value or the like in order to enhance the data transmission rate.

FIG. 7D is a diagram schematically showing a configuration in which transmitted data such as a dimmer signal is in the device-dependent form of a lamp output voltage value or the like in order to enhance the data transmission rate. The lamp output voltage value or the like is transmitted as it is, and therefore it only takes a short time to output illumination after the signal is received. However, it becomes very difficult to convert data into target color and brightness. Therefore, data transmission in the device-dependent form of a lamp output voltage value or the like is preferable when a high-speed rate is required but accurate conversion into target color and brightness is not required.

EXAMPLE 2

Figure 9:
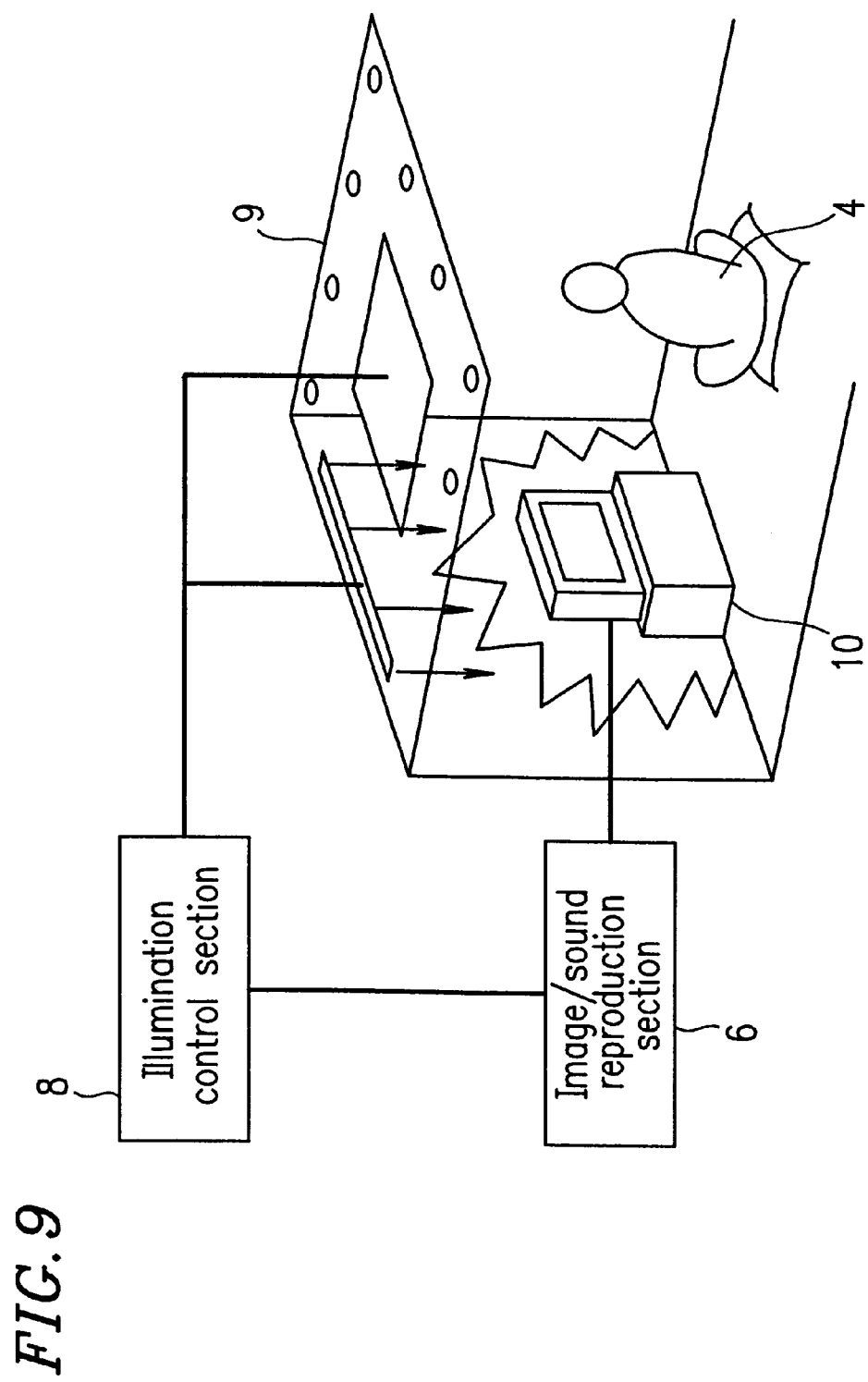
FIG. 9 is a diagram schematically showing how the illumination device of FIG. 8 is used.

FIGS. 8 and 9 show a configuration of an illumination device according to Example 2 of the present invention. The illumination device of FIGS. 8 and 9 includes an image/sound reproduction section 6, a data recording device 7, an illumination control section 8, an illumination output section 9, and an image/sound output section 10.

The data recording device 7 may be novel, but may be either a present wide-spread recording device such as a videotape, a CD, or a DVD, or a recording device dedicated to the present invention. The data recording device 7 stores images or sounds, or both, as well as corresponding illumination control data irrespective of data recording methods or formats (including analog/digital).

The image/sound reproduction section 6 has a function to reproduce images or sounds, or both, and illumination control data previously stored in the data recording device 7 and a function to transmit a control signal to the image/sound output section (image display device) 10 such as TV, the illumination control section 8, or the like. In this case, the illumination control data is data relating to the dimming level of each lamp included in the illumination output section 9.

The illumination control section 8 has a function to perform illumination control based on the illumination control data transmitted from the image/sound reproduction section 6. The illumination control section 8 transmits data on the dimming level of each lamp included in the illumination output section 9 to the illumination output section 9. The data is in a signal form in accordance with the on-off format of the illumination output section 9.

The illumination output section 9 includes one or a plurality of lamps and an on-off circuit. The illumination output section .9 has a function to freely change luminous intensity, light distribution, and color temperature. For example, the illumination output section 9 includes RGB monochromatic fluorescent lamps. The dimmer ratio among the lamps may be changed so that the color temperature is in the range from white light to monochromatic light. Alternatively, the illumination output section 9 may include commercially-available lamps of about 3000 K to about 6700 K, in which the color temperature is changed by changing the dimmer ratio among the lamps. Further, a high-directivity lamp such as a halogen lamp may be combined with the fluorescent lamps. Light distribution may be changed by switching between the fluorescent lamps and the halogen lamp. Further, light colors and light distribution may be changed by combining the lamps with liquid crystal or a display device such as an LED, a CRT, a PDP, or an EL.

Among data stored in the data recording device 7, data relating to images and sounds is transmitted to the image/sound output section 10. The images are displayed on a display included in the image/sound output section 10 while the sounds are provided by a speaker included therein. At the same time, the illumination control data stored in the data recording device 7 is transmitted to the illumination control section 8. The illumination control section 8 converts the received data into a dimmer signal for each lamp included in the illumination output section 9, and transmits the signal to the illumination output section 9. In the illumination output section 9, each lamp included therein is turned on, outputting light having a level in accordance with the dimmer signal. Therefore, a room environment allowing realism can be realized.

What is most important is an illumination control method for enhancing realism to be sensed by the appreciator 4 viewing images and hearing sounds. There are several illumination control methods.

The most effective of these is an illumination control method in which an illumination is performed by an illumination designer of substantial sensibility in accordance with images and sounds. The above-described experiment has demonstrated that a room illuminance condition set by an experienced person, under which there is continuity in illumination impression in the screen, is most effective in enhancing realism in the screen. Illumination designers, such as stage illumination directors, have high sensibility fostered through experience of illumination direction for plays or the like, and are therefore capable of appropriately determining such illumination conditions. The more eminent the illumination designer who directs illumination, the more valuable the image-sound-illumination software traded in the form of the data recording device 7. When cost reduction is desired, illumination control data for images and sounds may be mechanically created using the above-described illumination control technique for enhancing realism.

Further, in order to obtain an effective illumination control method in association with sounds, for example, the illuminance level may be enhanced when sound is high while the illuminance level may be lowered when sound is low.

The illumination control section 8 may control a plurality of the illumination output sections 9 using a plurality of circuits instead of a single circuit as shown in FIGS. 8 and 9. Further, more preferably, the illumination output section 9 may be hidden from the appreciator 4.

EXAMPLE 3

Figure 10:
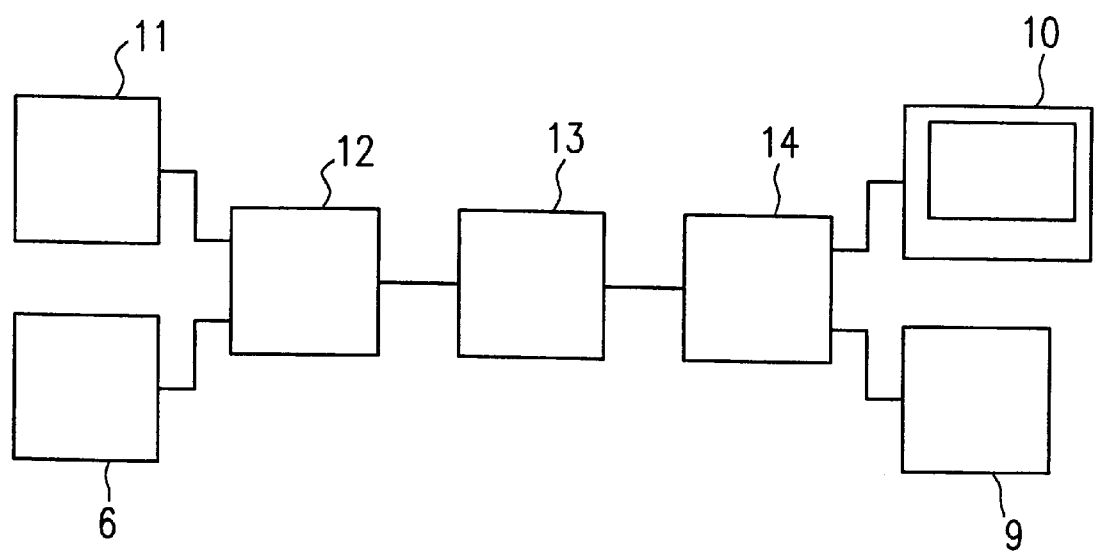
FIG. 10 is a diagram schematically showing a configuration of an illumination device according to Example 3 of the present invention.

FIG. 10 shows a configuration of an illumination device according to Example 3 of the present invention. The illumination device shown in FIG. 10 includes an image/sound reception section 11, an image/sound reproduction section 6, an image/sound storage section 12, an image analysis section 13, an image/sound/illumination control section 14, an image/sound output section (image display device) 10, and an illumination output section (illumination appliance) 9.

The illumination analysis section 13 receives an image signal, analyzes the signal, and processes the results of the analysis to generate and output a variety of signals. The image/sound/illumination control section 14 receives an image signal, a sound signal, and an illumination signal, and outputs the sound signal and the illumination signal in synchronization with the timing of display of the image signal. The illumination output section 9 includes at least one lamp and an on-off circuit, and is capable of receiving an illumination signal and freely changing the luminous intensity, light distribution, and color temperature of illumination in accordance with the received signal. The image signal includes at least the color signal and the luminance signal of each pixel of each image. Any signal format and any signal sequence may be used.

The image signal and the sound signal supplied from the image/sound reception section 11 or the image/sound reproduction section 6 are first stored in the image/sound storage section 12. The image signal stored in the image/sound storage section 12 is analyzed by the image analysis section 13. An illumination condition under which the realism of the image would be enhanced is evaluated and an illumination signal required for the control of an illumination appliance is generated.

The image signal, the sound signal, and the illumination signal are input to the image/sound/illumination control section 14 from which the image signal and the sound signal are transmitted to the image/sound output section 10 in synchronization with the timing of display of the image. The illumination signal is transmitted to the illumination output section 9. Thus, the appreciator can appreciate the image displayed on the image/sound output section 10, feeling a high level of realism due to the synchronized image, sound, and illumination output from the image/sound output section (e.g., TV) 10 and the illumination output section (illumination appliance) 9.

Note that in the illumination device of the present invention, if the image signal is input to the image/sound storage section 12, an image and illumination capable of enhancing the realism of the image can be generated. Both the image/sound reception section 11 and the image/sound reproduction section 6 are not necessarily required. Needless to say, at least one of both may be used.

Needless to say, when no sound is required, each of the image/sound reception section 11, the image/sound reproduction section 6, the image/sound storage section 12, the image/sound/illumination control section 14, and the image/sound output section 10 in the configuration of FIG. 10 do not need to have a function to process sound.

The image/sound reception section 11, the image/sound reproduction section 6, the image/sound storage section 12, the image analysis section 13, the image/sound/illumination control section 14, the image/sound output section 10, and the illumination output section 9 in the illumination device shown in FIG. 10 may be separate devices. Alternatively, for example, the image/sound reception section 11 and the image/sound reproduction section 6 may be combined into a single image/sound reception and reproduction section, i.e., the two or more sections are integrated as a single section.

The illumination control section 8 (FIGS. 8 and 9) may include a plurality of circuits instead of a single circuit and may control a plurality of the illumination output sections 9. Further, more preferably, the illumination output section 9 is hidden from the appreciator 4.

EXAMPLE 4

Figure 11:
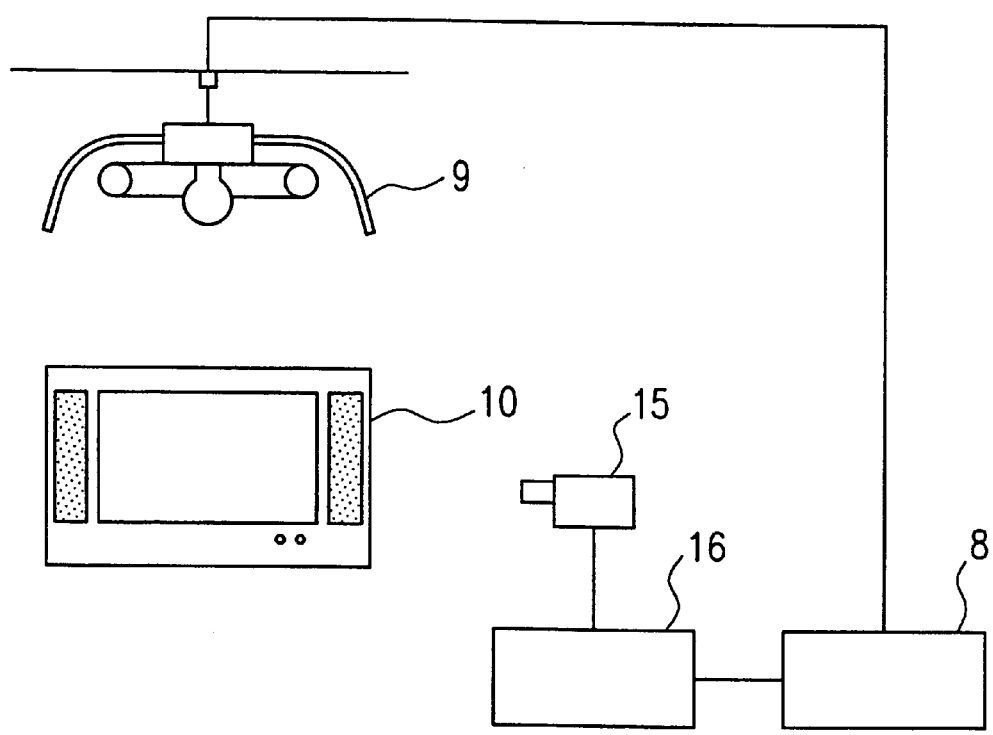
FIG. 11 is a diagram schematically showing a configuration of an illumination device according to Example 4 of the present invention.

FIG. 11 shows a configuration of an illumination device according to Example 4 of the present invention. The illumination device of FIG. 11 includes a sensor section 15, a data analysis section 16, an illumination control section 8, and an illumination output section (illumination appliance) 9.

The sensor section 15 measures the luminance and color temperature of images displayed on the image/sound output section (image display device) 10 and transmits the resultant data to the data analysis section 16. The data analysis section 16 determines illumination conditions under which the realism on the screen is enhanced, based on information on the luminance and color temperature of images measured by the sensor section 15, and transmits signals indicating the output level of each lamp in the illumination output section 9 to the illumination control section 8. The functions of the illumination control section 8 and the illumination output section 9 are the same as those in Example 3.

Although the image/sound output section (image display device) 10 is separated from the illumination device in the configuration of FIG. 11, the image/sound output section 10 may be integrated with the illumination device.

Note that in the foregoing, means for enhancing the realism of images are mostly described. If it is possible to find illumination conditions under which the realism of sound, such as musical scale and musical quality, illumination control in accordance with sound can contribute to the total realism. Combination of images, sounds, and illumination can achieve the most effective enhancement of realism.

EXAMPLE 5

Figure 12A:
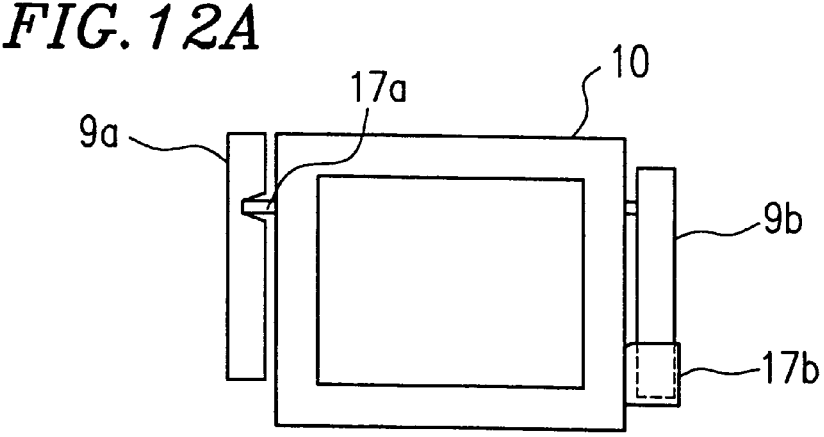
FIGS. 12A and 12B are diagrams schematically showing a configuration of an illumination device according to Example 5 of the present invention.
Figure 12B:
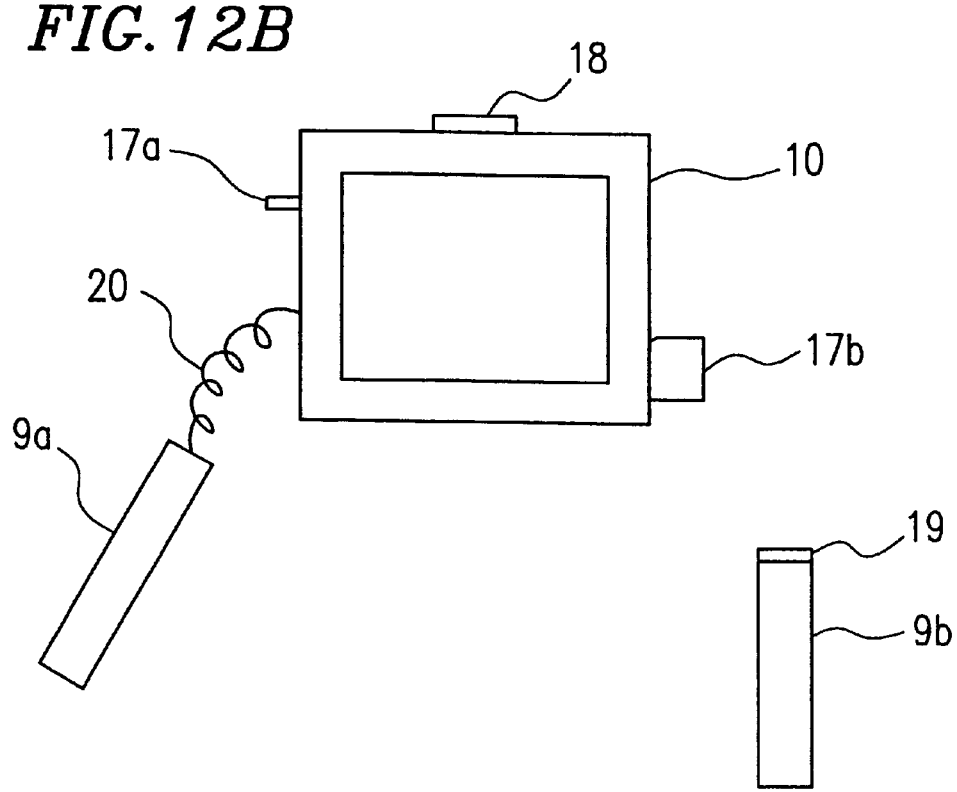

FIGS. 12A and 12B show a configuration example of an illumination device, particularly an illumination output section, according to Example 5 of the present invention.

FIG. 12A shows an image/sound output section 10, illumination output sections 9a and 9b, and illumination fixing sections 17a and 17b for fixing the illumination output section 9 to the image/sound output section 10, respectively. The illumination fixing sections 17a and 17b are used for respectively accommodating the illumination output sections 9a and 9b in the image/sound output section 10 in the case where the illumination output sections 9a and 9b are not required when a TV or video images are appreciated without illumination effects of the illumination output sections 9a and 9b or when the images are not being appreciated. Therefore, an illumination fixing section may be the illumination fixing section 17a on which the illumination output section 9a is hung. Alternatively, an illumination fixing section may be the illumination fixing section 17b which accommodates the illumination output section 9b. Further, an illumination fixing section may be accommodated inside the image/sound output section 10 (not shown).

FIG. 12B shows the illumination output sections 9a and 9b which are removed from the image/sound output section 10. A cord 20 connecting the image/sound output section 10 with the illumination output section 9 functions at least as a transmission line for transmitting an illumination signal to the illumination output section 9a. In such a configuration, the position of the illumination output section 9a can be freely set. Needless to say, the cord 20 may be used as a transmission line for supplying electric energy to the illumination output section 9a in addition to the illumination signal.

Alternatively, the cord 20 can be omitted by using an illumination signal output section 18 provided on the image/sound output section 10 and an illumination signal input section 19 provided on the illumination output section 9b, for example. Specifically, the illumination signal output section 18 outputs an illumination signal and the illumination signal input section 19 receives the output illumination signal. In such a configuration, the illumination output section 9b is cordless, so that the position of the illumination output section 9b can be more freely set. An electric energy source may be provided in the illumination output section 9b to supply electric energy required for the operation of the illumination output section 9b. A power source (not shown) may be provided in another place to supply electric energy to the illumination output section 9b.

Note that the illumination fixing sections 17a and 17b, and the illumination output sections 9a and 9b provided on the respective right and left sides may be different from or the same as each other. Alternatively, the illumination fixing sections 17a and 17b, and the illumination output sections 9a and 9b may be provided in a single place. In the example shown in FIGS. 12A and 12B, the illumination output section 9a having the cord 20 is fixed on the illumination fixing section 17a of a hanging type, while the illumination output section 9b of a cordless type is fixed on the illumination fixing section 17b of the accommodation type. Configurations of the illumination fixing section(s) and the illumination output section(s) are not limited to the foregoing.

FIG. 13 shows a configuration example of the illumination fixing section 9a of the hanging type. FIG. 13 shows part of the image/sound output section 10, the illumination output section 9a, and the illumination fixing section 17a. A concave portion 21 which is to be fixed by the illumination fixing section 17 is provided around the middle of the illumination output section 9a. Light emitting sections 23 are provided on opposite sides of the concave portion 21. The illumination fixing section 17 is attached via an articulation section 22 to the image/sound output section 10.

The concave portion 21 of the illumination output section 9a is mounted into a ring portion (open ring) of the illumination fixing section 17a. In this state, the illumination output section 9a can be rotated in directions indicated by arrows 20a while the illumination output section 9a is attached to the image/sound output section 10. With the articulation section 22, the illumination output section 9a can rotate in the direction indicated by double headed arrow 20b and move in the directions indicated by double headed arrow 20c. In such a configuration, the direction of light emitted from the illumination output section 9a can be changed while keeping the illumination output section 9a attached to the image/sound output section 10.

Needless to say, the concave portion 21 and the articulation section 22 may be any other mechanisms as long as the mechanisms can rotate and move in directions indicated by double headed arrows 20a, 20b, or 20c in FIG. 13 irrespective of the shape shown therein.

The illumination output sections 9a and 9b may be controlled either by the respective separate control circuits or by a single control circuit. Further, the illumination output sections 9a or 9b are preferably positioned so that the illumination output sections 9a or 9b are hidden from the appreciator. Further, a light shielding plate may be provided for hiding the light emitting sections 23.

EXAMPLE 6

An illumination device according to Example 6 of the present invention will be described with reference to FIGS. 14 and 15.

Figure 14:
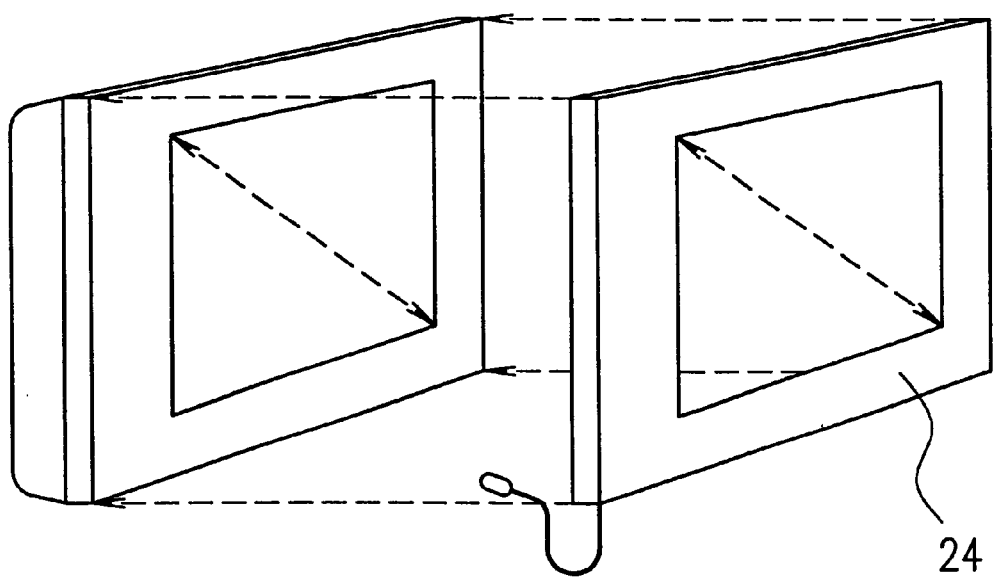
FIG. 14 is a diagram schematically showing an illumination device according to Example 6 of the present invention.

The illumination device of FIG. 14 is an illumination appliance 24 for a television frame. The illumination appliance 24 is an illumination appliance which is attached to a frame on the periphery of the screen of the television. The illumination appliance 24 includes a light source such as an RGB LED or cold cathode fluorescent lamp, and a light transmitting plate. Any type of light source which is on the market at the present time or which will come into practical use in the future may be used. For example, a light emitting plane member such as an EL panel (including an organic EL) may be provided as a light source on the front of the illumination output section. A display such as a liquid crystal panel, the light color of which can be arbitrarily changed can be used as a light source. Further, light leaked from a CRT of the image display device may be used.

In either case, the illumination appliance 24 is controlled in accordance with the illumination control method of the present invention for improving realism so that the light color or luminance of a light emitting surface thereof is changed in association with images on the image display device.

Further, in this case, when an illumination appliance 24 of a light emitting color mode is attached to the periphery of the screen of an image display device of a pseudo-light emitting color mode, an image displayed on the screen of the image display device of the pseudo-lighting emitting color mode is confined by the frame of the light emitting color mode, so that the image is in an object color mode. Therefore, a color, such as brown, which exists only in an object color mode appears to be closer to natural brown than when displayed on conventional image display devices.

Figure 15:
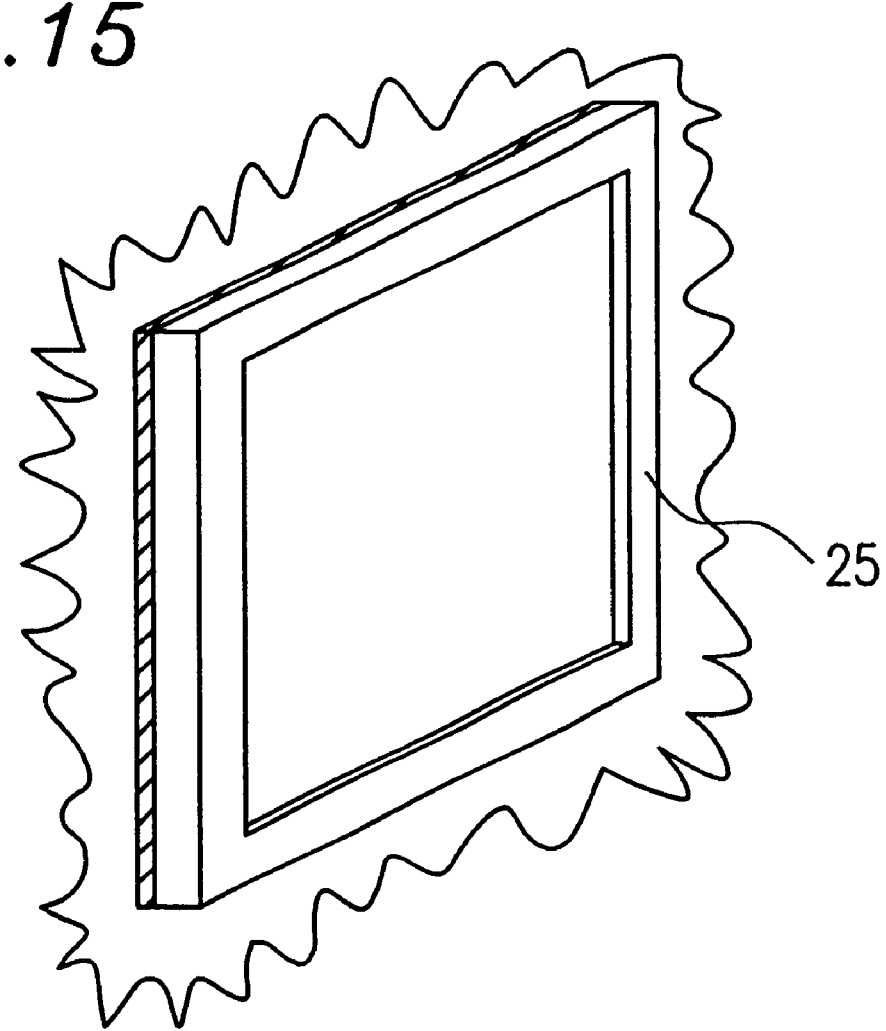
FIG. 15 is a diagram schematically showing another illumination device according to Example 6 of the present invention.

An illumination device shown in FIG. 15 is an illumination output section 25 for the sides of a television, in which a light source such as an RGB LED or cold cathode fluorescent lamp is attached to a side of the television body. The illumination appliance 25 is controlled by the illumination control method of the present invention for improving realism, illuminating a peripheral visual field of the image display device.

Note that any of the illumination appliance 24 for a television frame (FIG. 14) and the illumination appliance 25 for the sides of a television (FIG. 15) may be embedded and incorporated into the image display device body, or alternatively, may be attached to the image display device body as a separate device.

EXAMPLE 7

Figure 16:
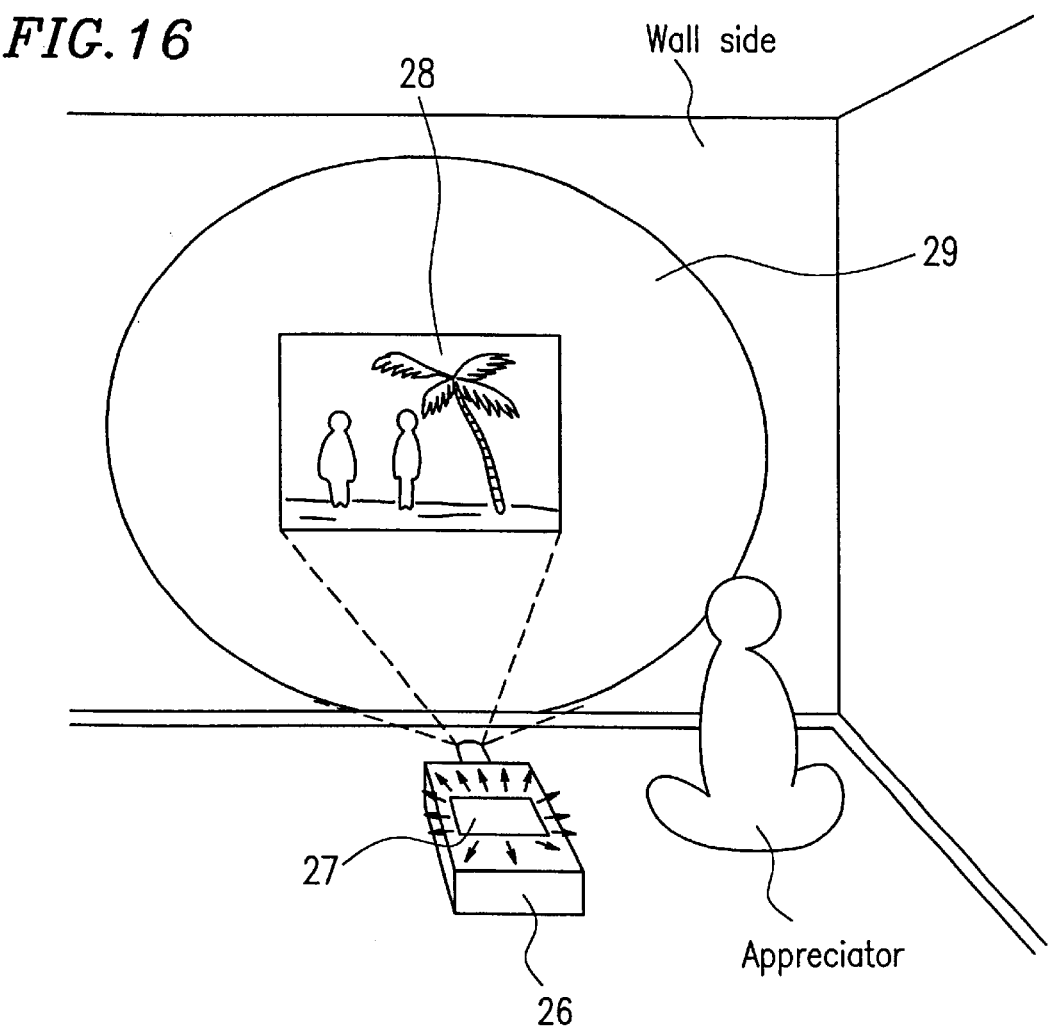
FIG. 16 is a diagram schematically showing an illumination device according to Example 7 of the present invention.

FIG. 16 shows an illumination device according to Example 7 of the present invention. The illumination device is in the form of a projector, i.e., a projector type illumination output section 26.

A conventional projector collects light, which has been transmitted through a liquid crystal panel using a lens, and projects the collected light onto a screen plane. In such a conventional projector, it is difficult to design the optical system of lenses so that the utilization efficiency of light is increased and light is prevented from leaking to the surrounding area of an image 28. Actually, the lens cannot collect all of the light, so that light unnecessarily leaks inside the projector, or significant amounts of light are wasted.

To address this, the projector type illumination output section (projector type illumination device) 26 of Example 7 does not waste such light and transmits the light onto the screen plane. The light serves as an illumination image 29 for improving realism. Further, the light is also released via a window of the projector type illumination output section 26 into a room. An opal glass, such as a light emitting plane 27 for room illumination, is attached to the window. The light to be transmitted is controlled in accordance with the illumination control algorithm for enhancing realism according to the present invention.

EXAMPLE 8

A configuration of an illumination output section of an illumination device according to Example 8 of the present invention will be described with reference to FIGS. 17(a) and 17(b).

Illumination output sections 30 through 32 of FIG. 17(a) are provided for illuminating the respective visual field sections shown in FIG. 5A. Specifically, an illumination output section 30 for an effective visual field section illuminates the effective visual field section. Illumination output sections 31 for a guide visual field section illuminate the guide visual field section. Illumination output sections 32 for an auxiliary visual field section illuminate the auxiliary visual field section.

These illumination output sections 30 through 32 differ from conventional illumination appliances for wall sides on the following point. The conventional illumination appliances for wall sides illuminate wall sides, distributing light uniformly and efficiently as much as possible. In contrast, the illumination output sections 30 through 32 illuminate a wall side at the rear of the image/sound output section 10, such as a TV provided at the center of the effective visual field of an appreciator, so that illuminance is greatest at the height of a line of sight of the appreciator (i.e., in the vicinity of the center of the TV screen). Therefore, the illumination output sections 30 through 32 of Example 8 includes a collecting reflection plate 34 substantially in the shape of parabola as indicated by a cross-sectional view shown in FIG. 17(b).

Taking into account the above-described theory on the illumination impression, it is considered that in order to obtain better effects, the light sources and light emitting sections of an appreciation space should be hidden from an appreciator so that the appreciator does not know the locations of the light sources and light emitting sections are. Therefore, a light shielding louver 35 is provided. A light source section 33 emits light which in turn reaches the light shielding louver 35 directly or which is in turn reflected and collected by the collecting reflection plate 34 to the light shielding louver 35. The light shielding louver 35 controls the direction of the light which in turn illuminates each visual field. Since the appreciator cannot see the light emitting section 33 of any one of the illumination output sections 30 through 32, the appreciator does not know whether the illumination output sections 30 through 32 emit light even if the appreciator can confirm the presence of the illumination output sections 30 through 32.

A signal is transmitted via a wire provided in a ceiling into each of the illumination output sections 30 through 32. Even when the position of a TV is changed (i.e., the relational relationship among each visual field is changed), the wire does not need to be changed physically, but the addresses are changed in the control device (i.e., it is easy to change the specifications). To this end, the illumination output sections 30 through 32 are preferably evenly spaced on the ceiling near the walls in advance. The transmission of the control signals can be easily adapted in accordance with changes in the provision or arrangement of the illumination output sections 30 through 32, if the transmission is performed in a wireless manner using infrared light or radio wave.

A conventional illumination appliance for a wall side may be used as each illumination output section. Note that a conventional illumination appliance for a wall side which satisfies the following conditions is preferably selected: illumination can be controlled; and luminous intensity distribution is provided such that light is substantially shielded so that an appreciator cannot see a light emitting section.

Although details are omitted from FIGS. 17(*a*) and (*b*), a human effective visual field has a high vision capability. In particular, when illumination for the effective visual field is appropriately provided, the effect is further improved. Specifically, a number of display elements such as LEDs may be provided on the periphery of the image/sound output section 10 so that an image appears to extend up to a wall outside the image/sound output section 10.

In order to realize a state in which light having a high directivity is emitted toward an appreciator, a spotlight illumination appliance may be provided in the vicinity of the illumination appliance 30 for the effective visual field section and the spot light illumination appliance is turned on and off in accordance with the state of an image. Therefore, the powerfulness of the image is enhanced. When the light color of the spotlight is variable, the effect is further enhanced.

EXAMPLE 9

An illumination appliance (illumination device) according to Example 9 of the present invention will be described with reference to FIGS. 18 and 19(*a*) through (*c*).

Figure 18:
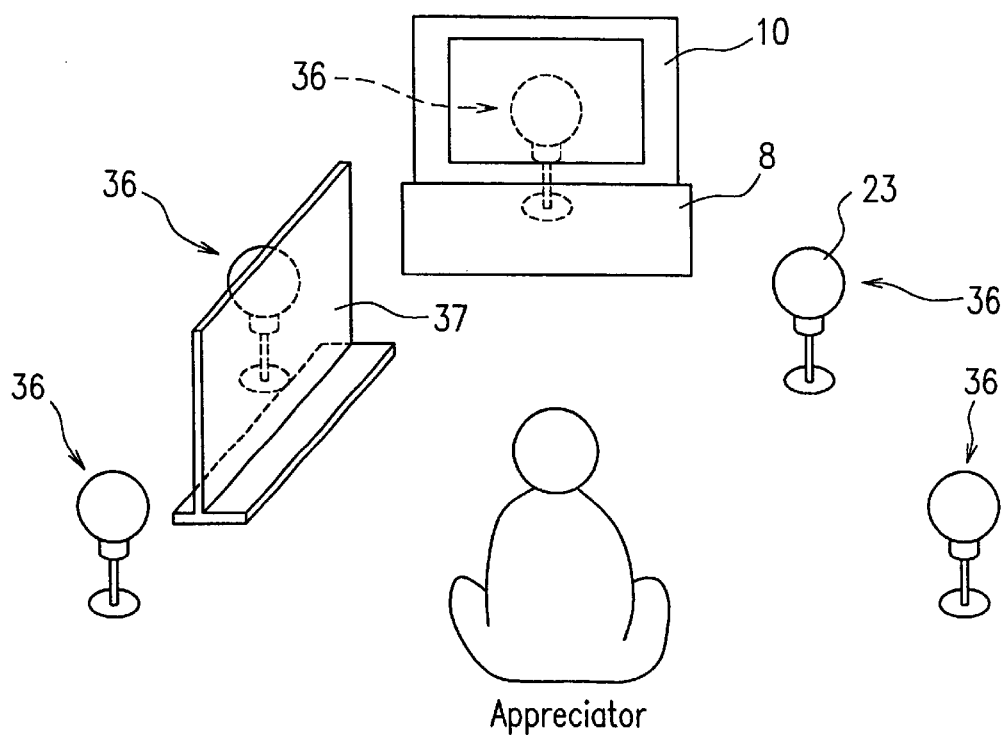
FIG. 18 is a diagram schematically showing an illumination device according to Example 9 of the present invention.

The illumination appliances of FIG. 18 are variable light color illumination appliances 36 including light emitting sections 23 of which a light color can be arbitrarily changed. Each illumination appliance 36 is in the form of a desk lamp or the like which can be provided at an arbitrary position. Therefore, such an illumination appliance which is not large is available for use at a home, for example. In FIG. 18, for example, one illumination appliance 36 is provided at a position corresponding to each of the effective visual field, guide visual field, and auxiliary visual field shown in FIG. 5A.

The illumination appliances 36 do not include power cords, but rather include rechargeable batteries. No signal lines are connected to the illumination appliances 36. Instead, signals are transmitted from an illumination control section 8 in a wireless manner (e.g., infrared light). It is needless to say that power lines and signal lines may be provided.

Taking the illumination impression into account, the light emitting section 23 of an illumination appliance 36 is hidden from an appreciator to obtain a further improvement in realism. To this end, the variable light color illumination appliances 36 may be positioned behind the image/sound output section 10 or room furniture. Alternatively, a light shielding plate 37 may be provided in front of a variable light color illumination appliance 36. The light shielding plate 37 may be a diffusion and transmission plate such as an opal acrylic plate.

The variable light color illumination appliances 36 having the above-described characteristics are separately controlled in accordance with the illumination control method of the present invention for improving realism. Therefore, an appreciator can enjoy watching an image having a high level of realism at home, for example.

Further, FIGS. 19(*a*) through (*c*) show an specific example of a light emitting section 23. The structure of the light emitting section 23 in the shape of a lamp shown in FIGS. 19(*a*) through (*c*) is an alternative of a light bulb, for example. The light emitting section 23 includes an Edison base 42. A diffusion plate 41 is provided on the base 42. A red light emitting section 38, a green light emitting section 39, and a blue light emitting section 40 are provided inside the diffusion plate 41. Each of the light emitting sections 38 through 40 receives a control signal from the illumination control section, and the intensity level of emitted light is adjusted in accordance with the received control signal. Colored light beams from the light emitting sections 38 through 40 are mixed by the diffusion plate 41 and emitted into the room.

The red light emitting section 38, the green light emitting section 39, and the blue light emitting section 40 may have a structure in a form analogous to that of a light emitting element, which is used at the present time, as shown in FIG. 19(*a*). Alternatively, each of the light emitting sections 38 through 40 may have a structure in a form analogous to that of an alternative-type fluorescent lamp in the form of a light emitting tube as shown in FIG. 19(*b*).

The light emitting sections 38 through 40 do not necessarily need to have the same size and shape as each other. The sizes and shapes of the light emitting sections 38 through 40 may be modified to obtain the small lamps. For example, in general, the light emission efficiency of a green fluorescent material is satisfactory, while the light emission efficiency of a blue fluorescent material is poor. As shown in FIG. 19(*a*) (base not shown), the blue light emitting section 40 may be larger than the other light emitting sections 38 and 39. Therefore, the light emitting sections 38 through 40 are efficiently accommodated inside the diffusion plate 41.

Note that the base included in the light emitting section 23 is not limited to the shape of the alternative type light bulb, but may be in any form.

EXAMPLE 10

Figure 20:
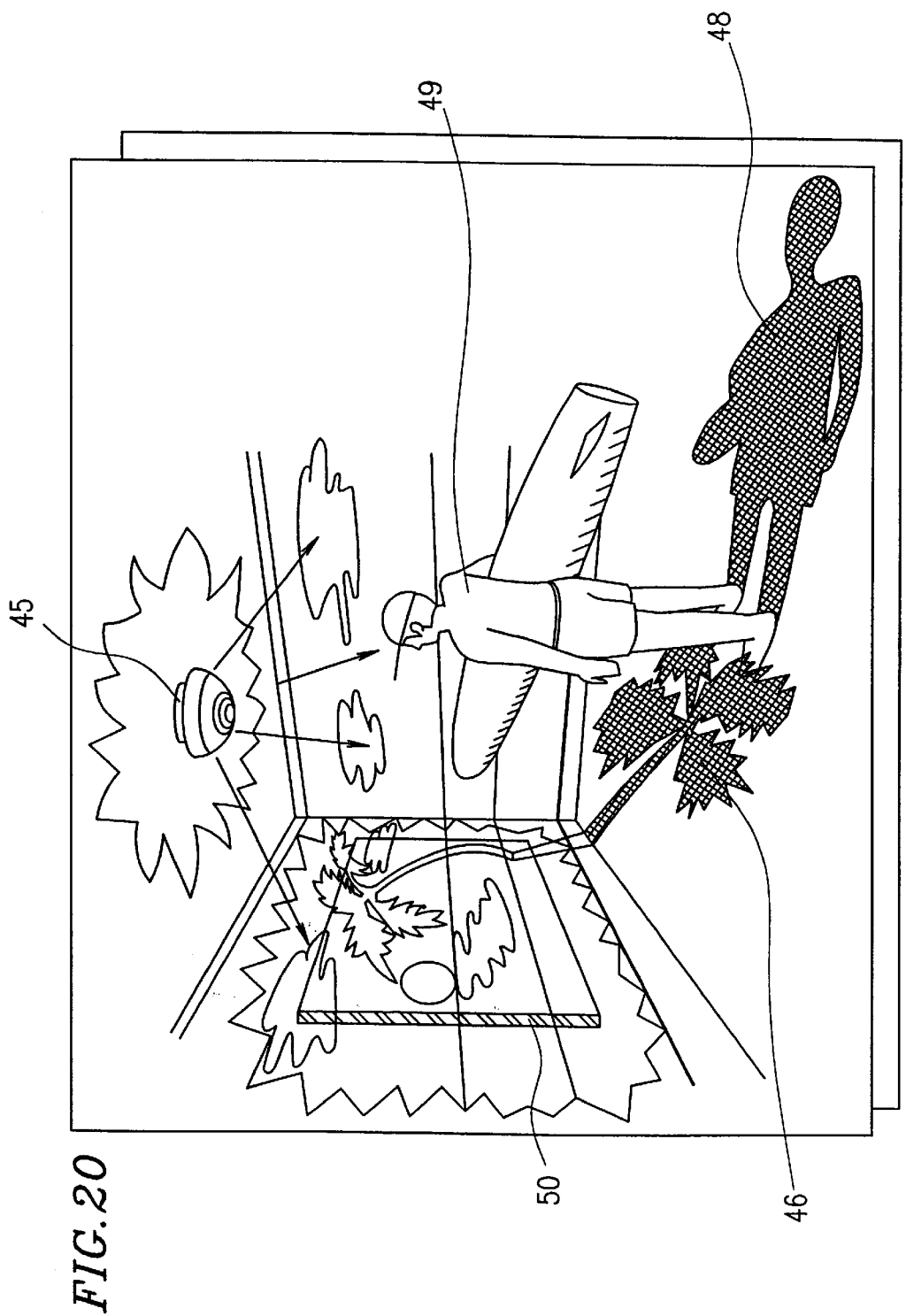
FIG. 20 is a diagram schematically showing an illumination device according to Example 10 of the present invention.

An illumination device according to Example 10 of the present invention will be described with reference to FIG. 20.

An illumination appliance 45 (illumination device) according to Example 10 is provided on a ceiling. The illumination appliance 45 includes a plurality of light emitting sections having a high level of directivity. Each light emitting section can arbitrarily change the color of the emitted light. Since the directivity of each light emitting section is high, the light emitting section can perform variations in light as if projecting images onto wall sides from the ceiling (i.e., in the directions indicated by arrows in FIG. 20). The light emitting sections may be in an arbitrary form, such as a projector or a configuration including a light emitting element such as LED. At the present time, an LED has a low level of output. Therefore, a very large number of LEDs are required for such an illumination appliance 45. Future technical innovation is expected to improve the output level of LEDs to a large extent. An LED is very likely to be applied as such a light emitting element.

When the illumination appliance 45 is controlled in accordance with the illumination control technique of the present invention for improving realism, an appreciator 49 can feel illusion as if he/she exists in a virtual image space. An inventors' experiment has found that shade as well as light is also an important factor for enhancing the realism of an image. In FIG. 20, shadows 46 and 48 are generated so that there is continuity between the shadow 46 in the virtual image space and the shadow 48 in the appreciation space, but there is no contradiction in the illumination impression to the virtual image space due to the shadow 48 of the appreciator 49. Such a direction enables the appreciator 49 to feel a high level of realism as if he/she wants to do surfing on a southern sea in an image displayed on the image/sound output section (the image display device, a wall-hung TV in the example of FIG. 20) 50.

EXAMPLE 11

Figure 21:
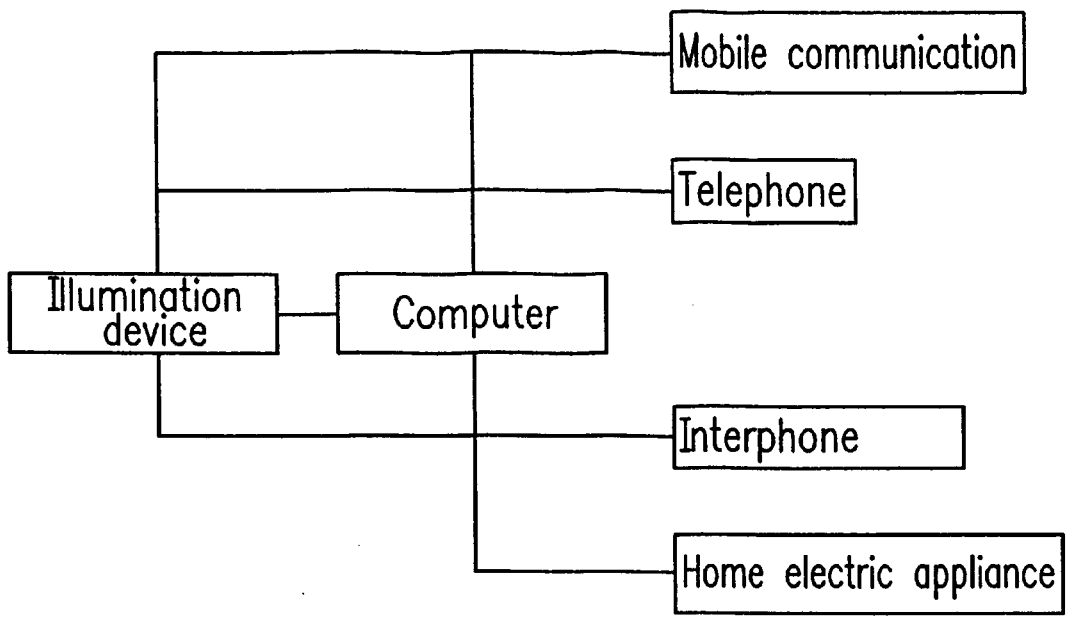
FIG. 21 is a diagram schematically showing a configuration of an illumination device of the present invention in which the illumination device is controlled in association with a telephone, an interphone, a mobile communication device, or a home electric appliance.

The illumination device of the present invention may be controlled in association with a telephone, an interphone, or a mobile communication device or a home electric appliance as shown in FIG. 21. In this case, a signal for controlling the illumination device is transmitted directly or via a computer from the telephone, the interphone, the mobile communication device, or the home electric appliance to the illumination device. The illumination device is controlled in accordance with the transmitted signal and illumination is therefore changed. For example, when there is an incoming call on a telephone or a guest attempts to contact via the interphone, the situation can be made noticed by changing illumination light.

FIGS. 22(*a*) and (*b*) schematically show a configuration of the present invention using a data line connecting wire circuits or wireless circuits.

In the configuration of FIG. 22(*a*), image and sound data or image/sound/illumination data is transmitted via the data line from the Internet or a mobile communication device to a computer. The transmitted data is reproduced by an image/sound/illumination reproduction device. The illumination data is output from an illumination output section (illumination appliance) through an illumination control section. When the data transmitted from the Internet or the mobile communication device is image and sound data, a computer receives the data and thereafter analyzes the image and sound data through a processing board or software provided within the computer. The computer may generate illumination data based on the results. Alternatively, the image/sound/illumination data may be stored in a data recording device and may be reproduced as required.

FIG. 22(*b*) schematically shows a configuration of the present invention in which required data is provided to a computer (e.g., a notebook computer) via a data line connecting wire circuits or wireless circuits from the Internet or a mobile communication device, or via a storage medium such as CD-ROM or DVD-ROM. In particular, in the configuration of FIG. 22(*b*), an illumination appliance including an illumination control section or an illumination output section is incorporated into a computer. Therefore, the configuration of FIG. 22(*b*) provides a luminous intensity distribution of illumination indicated by concentric ellipses in FIG. 22(*b*).

EXAMPLE 12

Figure 23:
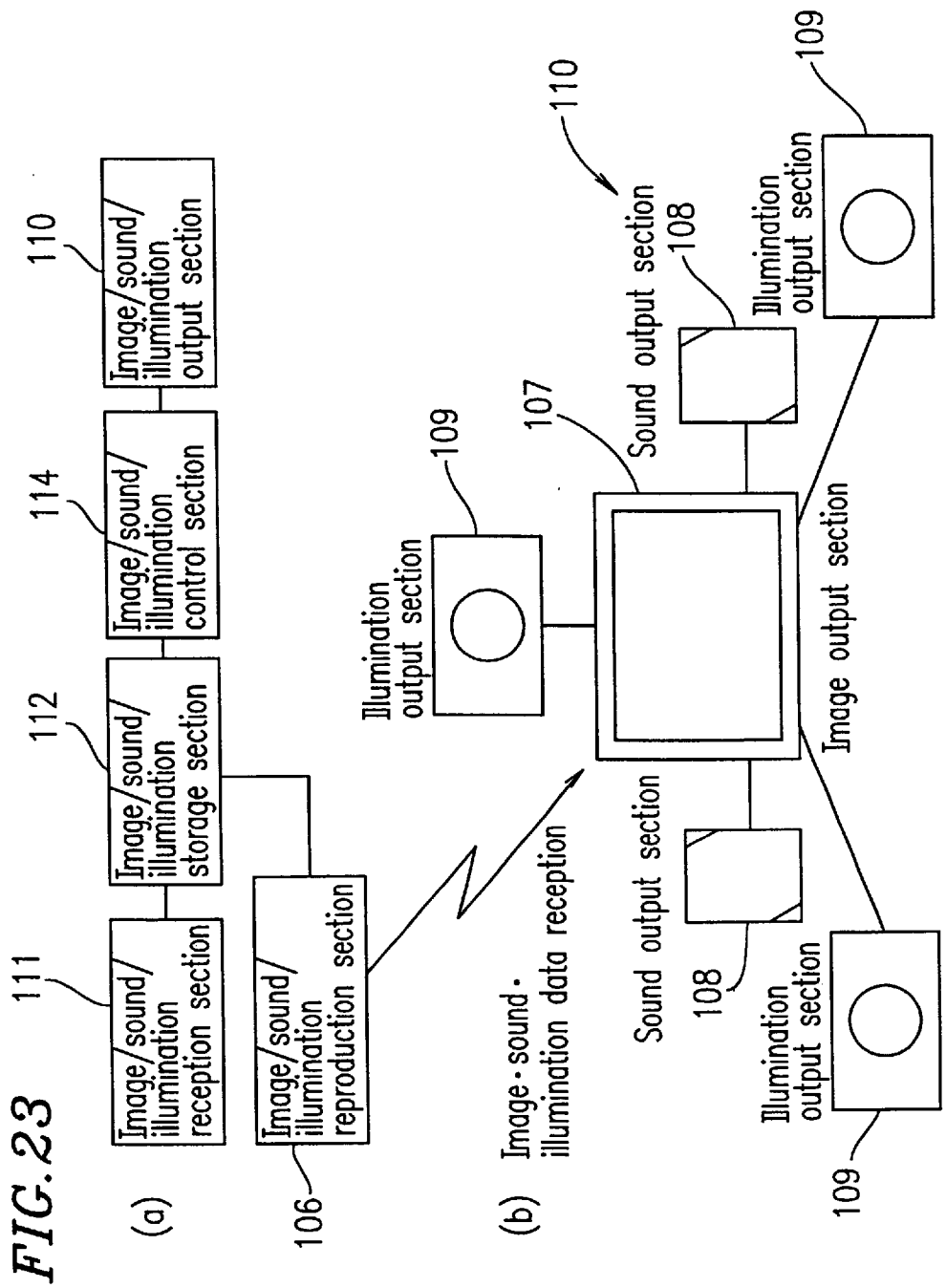
FIGS. 23(*a*) and (*b*) are diagrams used for explaining an illumination device according to Example 12 of the present invention.

FIG. 23(*a*) shows a block diagram of a configuration of an illumination device according to Example 12 of the present invention. The illumination device of Example 12 includes an image/sound/illumination reception section 111, an image/sound/illumination reproduction section 106, an image/sound/illumination storage section 112, an image/sound/illumination control section 114, and an image/sound/illumination output section 110. FIG. 23(*b*) schematically shows a configuration of the image/sound/illumination output section 110 in the illumination device configured based on the above-described block diagram.

The image/sound/illumination control section 114 receives an image signal, a sound signal, and an illumination signal, and outputs the sound signal and the illumination signal in synchronization with the display timing of the image signal. An illumination output section 109 in the image/sound/illumination output section 110 includes at least one lamp and a on-off circuit, and receives the illumination signal and, based on the signal, can freely change the luminous intensity, luminous intensity distribution, and color temperature of illumination light.

The image signal represents at least the color signal and luminance signal of each pixel in each image. The formats of the signals and the orders of the signals may be in any form.

The image signal, the sound signal, and the illumination signal, which are received by the image/sound/illumination reception section 111 or which are reproduced and supplied by the image/sound/illumination reproduction section 106, are first stored in the image/sound/illumination storage section 112 or are not stored, and are then input to the image/sound/illumination control section 114. The image/sound/illumination control section 114 transmits the image signal, the sound signal, and the illumination signal respectively to an image output section 107, a sound output section 108, and an illumination output section 109, in synchronization with the display timing of the image. Therefore, an appreciator appreciating the image in a room enjoys watching the image displayed on the image output section 107 due to the synchronized image, sound, and illumination output from the image output section (e.g., a television) 107, the sound output section 108, and the illumination output section (illumination appliance) 109, thereby feeling a high level of realism.

Note that the illumination device of the present invention does not necessarily need to include both the image/sound/illumination reception section 111 and the image/sound/illumination reproduction section 106 since when an image/sound/illumination signal is input to the image/sound/illumination control section 114, an image and illumination light for enhancing the realism of the image can be controlled. It is needless to say that at least one of the image/sound/illumination reception section 111 and the image/sound/illumination reproduction section 106 may be used.

Further, it is needless to say that when no sound is required, the components in FIGS. 23(*a*) and (*b*) for processing sounds are not required.

Further, the image/sound/illumination reception section 111, the image/sound/illumination reproduction section 106, the image/sound/illumination storage section 112, the image/sound/illumination control section 114, and the image/sound/illumination output section 110 may be separated from one another. Alternatively, two or more components may be integrated into one component. For example, the image/sound/illumination reception section 111 and the image/sound/illumination reproduction section 106 may be integrated into an image/sound/illumination reception/reproduction section.

The image/sound/illumination control section 114 may include a plurality of circuits instead of a single circuit, and may control a plurality of output sections. Further, more preferably, the illumination output section 109 of the image/sound/illumination output section 110 may be hidden from an appreciator.

Figure 24:
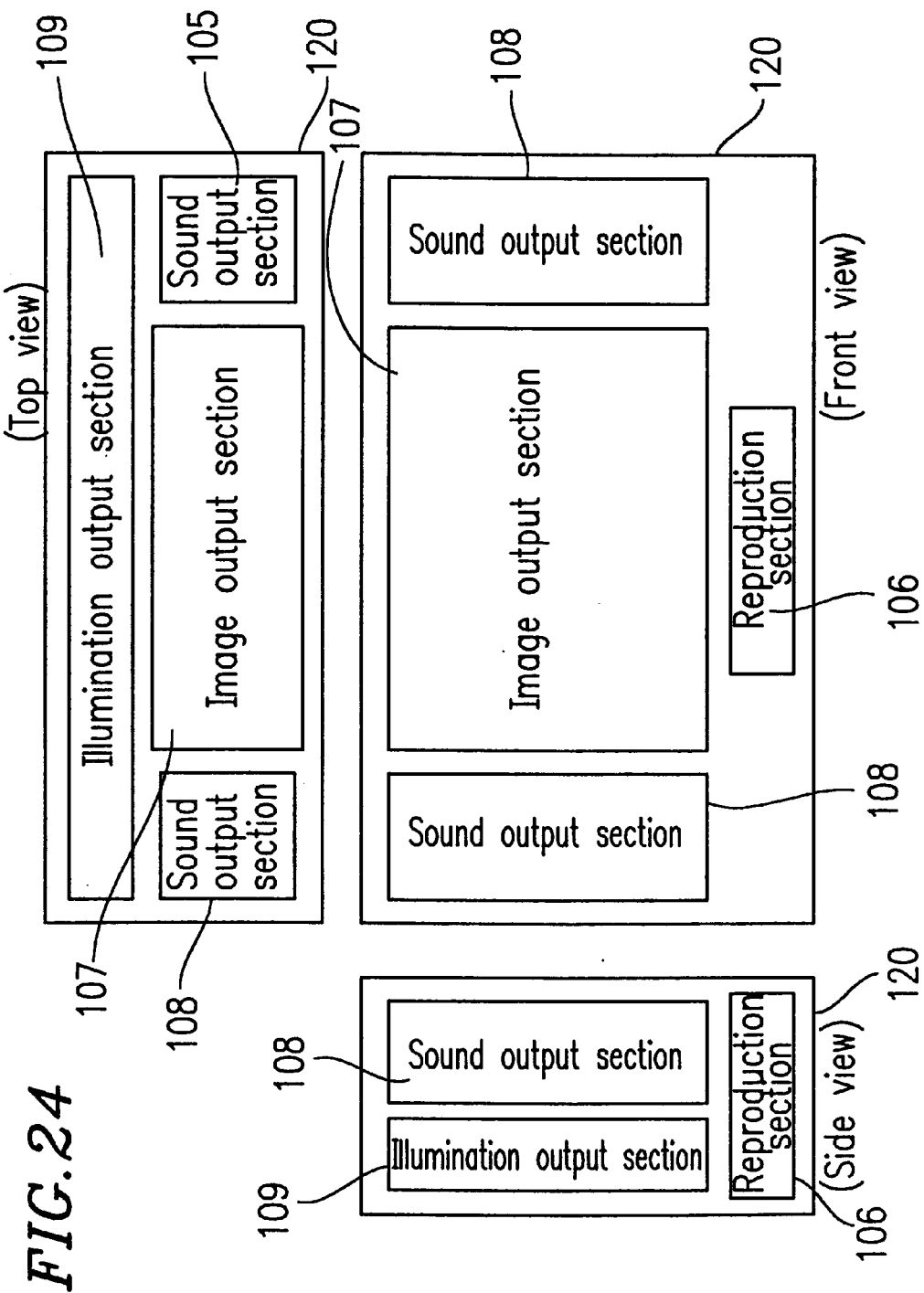
FIG. 24 is a diagram schematically showing an integrated-type illumination device of the present invention.

FIG. 24 schematically shows an illumination device 120 into which the above-described image/sound/illumination reception section, image/sound/illumination reproduction section, image/sound/illumination storage section, image/sound/illumination control section, and image/sound/illumination output section are all integrated. Note that FIG. 24 shows a front view, side view, and top view of the illumination device 120, schematically indicating the positions of the image output section 107, the sound output section 108, and the illumination output section 109 included in the image/sound/illumination output section, and further the position of the reproduction section 106.

The illumination device 120 into which each part is thus integrated is widely used in existing products such as a combination TV and VCR. Such an integrated-type illumination device 120 is useful since a wiring task is not required. Note that the integrated-type illumination device 120 has a configuration obtained by integrating the illumination output section 109 into the conventional configuration. It is possible to provide the improved realism of an image. When the illumination output section 109 is provided behind the image output section 107 or the sound output section 108 with respect to an appreciator, the illumination output section 109 is not seen by the appreciator. In this case, illumination light can be output to the background or periphery of an image.

FIGS. 25(a) and (b) schematically show a configuration in which the output of the image output section is used as the output of the illumination light. FIG. 25(a) is a side view of the configuration, in which the image output section 107, a light guide section 121, and an image control section 122 are successively provided. An input image signal is converted into RGB outputs by the image control section 122, and is displayed on the image output section 107.

The proportion of light coming from an image which reaches the eyes of an appreciator is only several percents of the total RGB output, where the value depends on the device used as the image output section 107. Therefore, in the configuration of FIG. 25, light of the RGB output which is not actually used for image display is efficiently taken and used for illumination to the periphery of an image. Specifically, part of the RGB output is guided to the periphery of an image by the light guide section 121 and is used as light 123 to irradiate the periphery of the image output section 107.

Figure 26:
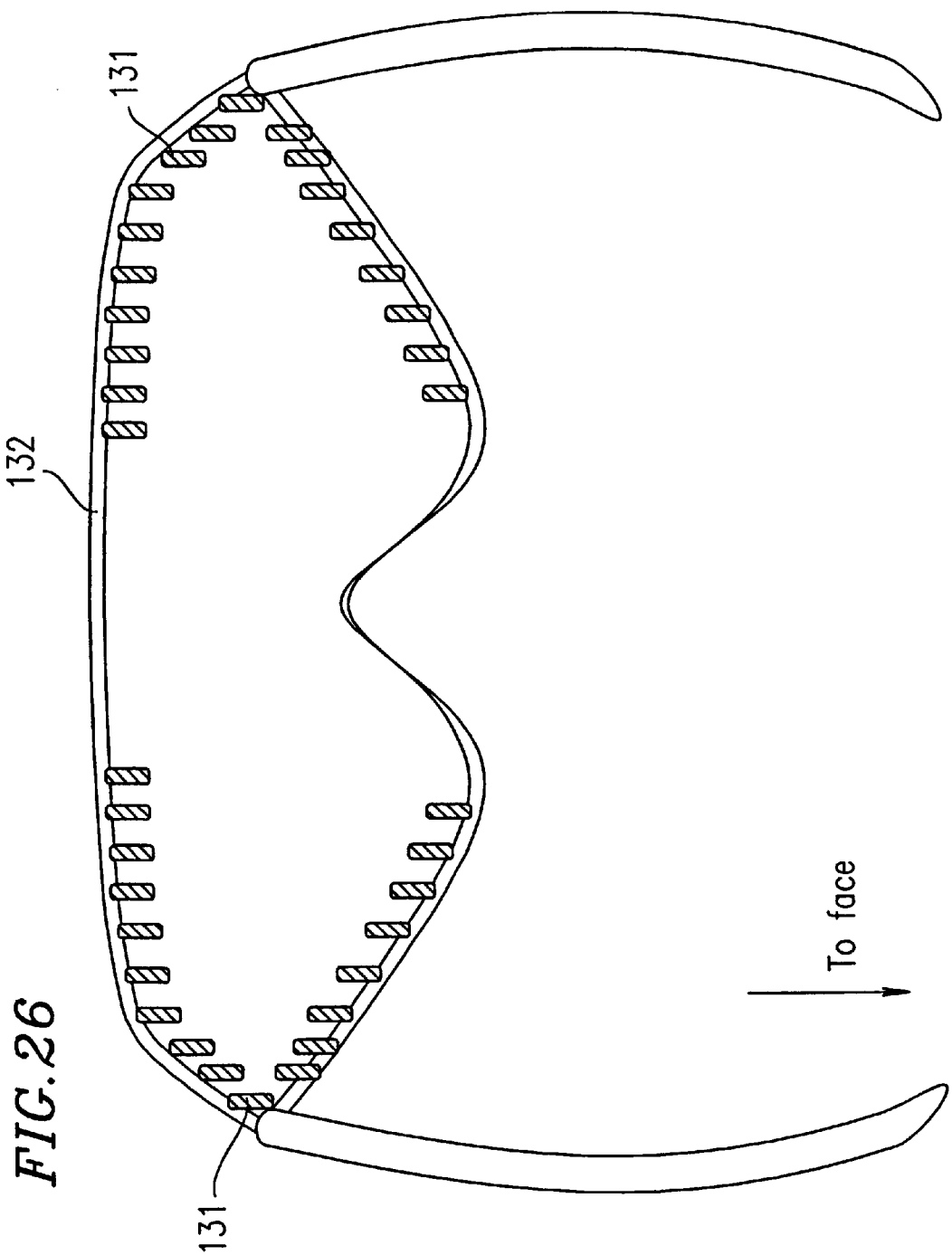
FIG. 26 is a diagram schematically showing a configuration of an illumination device of the present invention in which light sources are provided on the right and left ends and the upper and lower sides of a goggle-type image output section.

FIG. 26 schematically shows another integrated-type configuration example in which light sources are provided on the right and left ends and the upper and lower sides of a goggle-type image output section 132. For example, an LED light source may be used as a light source 131. In the configuration in which the light sources are incorporated into the goggle-type image output section 132, illumination is not required in an appreciation room. Therefore, a low light output can lead to an achievement of the above-described effects.

Note that another small-sized light source such as a cold cathode fluorescent lamp may be used as the light source 131 in addition to the above-described LED light source.

Further, FIGS. 27(a) and (b) schematically show the side view and front view of a configuration in which a sound output section (speaker) 108 and an illumination output section (light source) 109 are integrated. The illumination output section 109 is provided behind the sound output section 108 with respect to an appreciator. As schematically shown in FIG. 27(b), the illumination output section 109 is hidden from the appreciator by the sound output section 108. In this situation, only light 143 emitted from the illumination output section 109 is seen, thereby improving realism.

EXAMPLE 13

Figure 28:
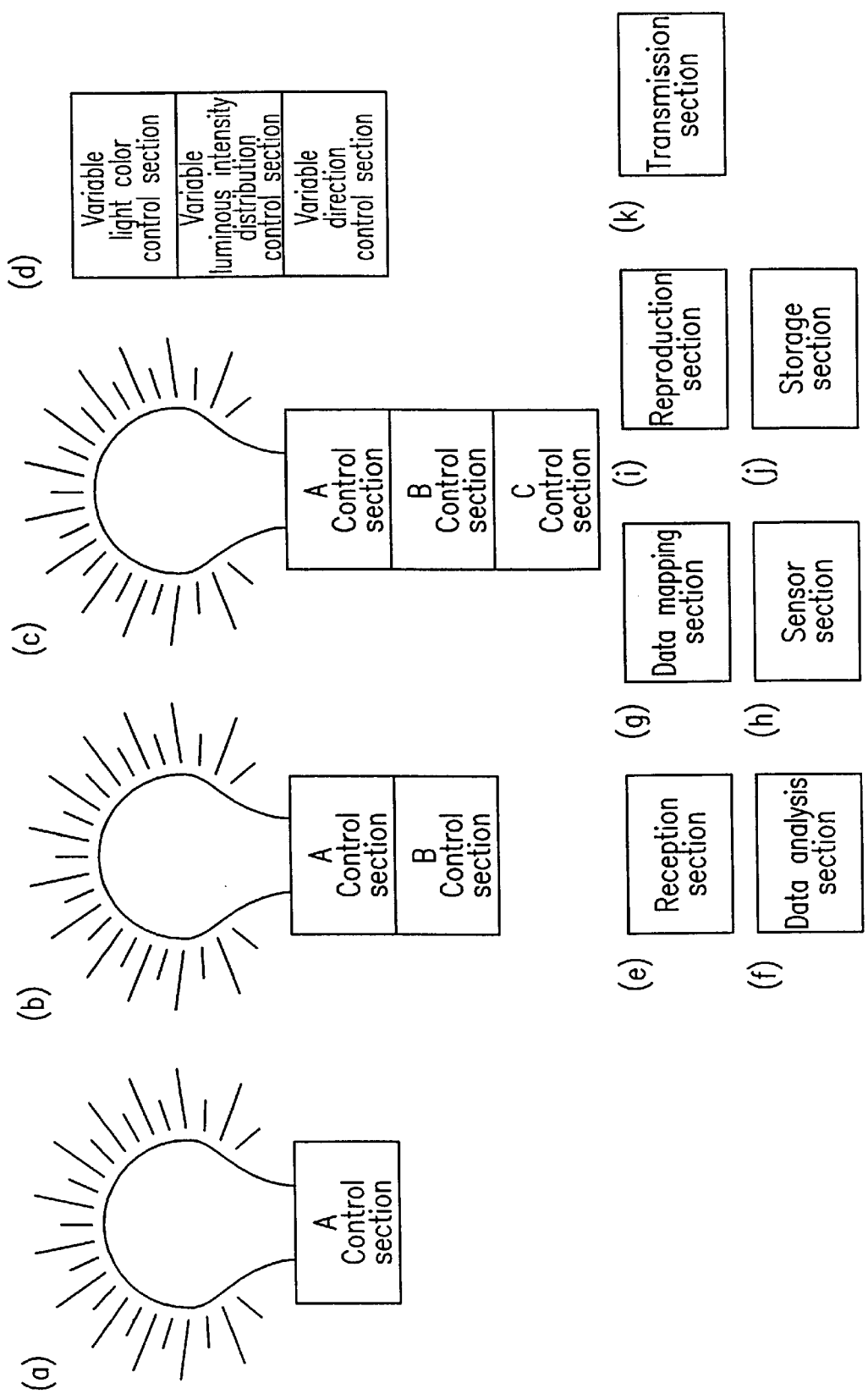
FIGS. 28(*a*) through (*k*) are diagrams used for explaining a light source included in an illumination device according to Example 13 of the present invention.

A light source or illumination appliance included in an illumination device of the present invention includes one of or a combination of two or more of a variable light color control section, a variable luminous intensity distribution control section, and a variable direction control section as shown in FIG. 28(d), in order to control the state of light used for illumination.

FIG. 28(a) schematically shows a configuration of a light source including any one (referred to as "A Control section") of the above-described three control sections. FIG. 28(b) schematically shows a configuration of a light source including any two (referred to as "A Control section" and "B Control section") of the above-described three control sections. FIG. 28(c) schematically shows a configuration of a light source including all three (referred to as "A Control section", "B Control section", and "C Control section") of the above-described three control sections. The "A Control section", the "B Control section", and the "C Control section" each correspond to any one of the variable light color control section, the variable luminous intensity distribution control section, and the variable direction control section shown in FIG. 28(d).

Further, FIGS. 28(e) through (k) show separate functions which can be added to the light source. A reception section of FIG. 28(e) receives an illumination signal, an image signal, and/or a sound signal. A data analysis section of FIG. 28(f) analyzes the received image signal and/or sound signal and generates a predetermined illumination signal. A data mapping section of FIG. 28(g) maps the received image signal and/or sound signal to an illumination signal previously stored, and selects a predetermined illumination signal. A sensor section of FIG. 28(h) measures various output values useful for illumination control. A reproduction section of FIG. 28(i) reproduces the illumination signal, the image signal, and/or the sound signal. A storage section of FIG. 28(j) stores the illumination signal, the image signal, and/or the sound signal. A transmission section of FIG. 28(k) transmits the illumination signal, the image signal, and/or the sound signal to another device positioned a distance away from the transmission section (e.g., each output section positioned a distance away from transmission section).

When one or more of the above-described sections are appropriately incorporated into a light source, the functions thereof are added to the light source.

Figure 29:
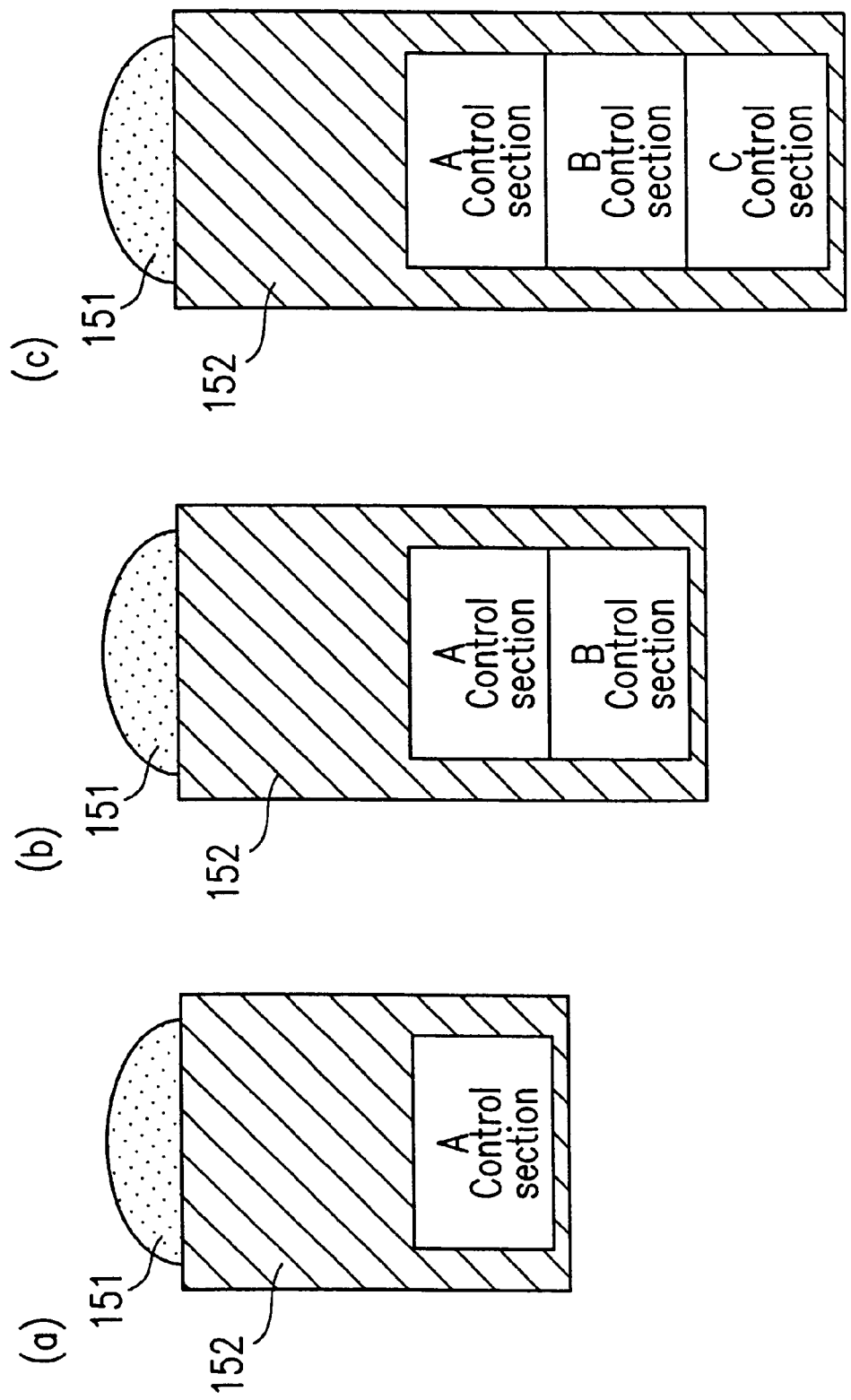
FIGS. 29(*a*) through (*c*) are diagrams used for explaining an illumination appliance included in the illumination device according to Example 13 of the present invention.

Note that when the above-described light source is used as an illumination appliance as shown in FIGS. 29(a) through (c), for example, the above-described sections may be accommodated in an appropriate housing. In this case, the light emitting section and control section of the light source may be accommodated in separate housings 151 and 152 as shown in FIGS. 29(a) through (a), or alternatively in an integrated housing.

EXAMPLE 14

In Example 14, a configuration of an illumination device will be described, in which illumination is controlled in association with images displayed on an image display device (image/sound output section), such as a television, as well as in association with the feeling or mood of an appreciator appreciating the images.

Figure 30:
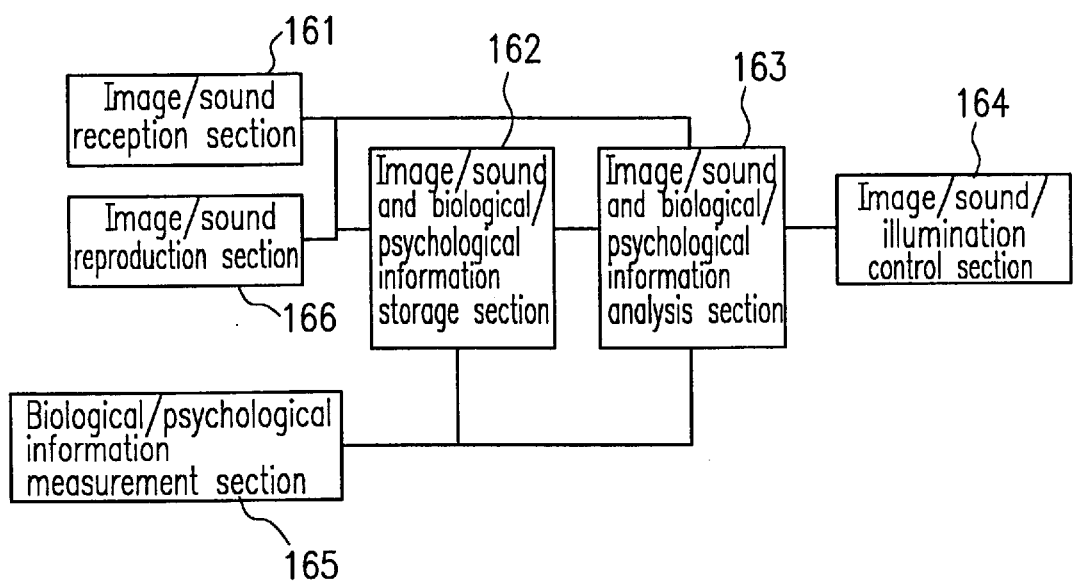
FIG. 30 is a diagram used for explaining a configuration of an illumination device according to Example 14 of the present invention.

FIG. 30 is a block diagram schematically showing a configuration of the illumination device of Example 14. Specifically, the illumination device includes an image/sound reception section 161, an image/sound reproduction section 166, a measurement section 165 for obtaining biological and psychological information on the appreciator (hereinafter also referred to as a biological/psychological information section), a storage section 162 for storing the image and sound information and the biological and psychological information(hereinafter also referred to as an image/sound and biological/psychological information storage section), an analysis section 163 for analyzing the image and sound information and the biological and psychological information (hereinafter also referred to as an image/sound and biological/psychological information analysis section), and an image/sound/illumination control section 164.

The functions of the image/sound reception section 161 and the image/sound reproduction section 166 each are the same as those of the corresponding components described in the above-described Examples. A description is therefore omitted for those components.

An image signal and a sound signal supplied from the image/sound reception section 161 or the image/sound reproduction section 166, and an information signal supplied from the measurement section 165 for obtaining biological and psychological information are first recorded in the storage section 162 for storing the image and sound information and the biological and psychological information, or are not recorded, and are then transmitted to the analysis section 163 for analyzing the image and sound information and the biological and psychological information. In the analysis section 163 for analyzing the image and sound information and the biological and psychological information, part or all of the received signal is analyzed to calculate illumination conditions under which the realism of an image is enhanced and to generate an illumination signal required for control of the illumination appliance.

Figure 31C:
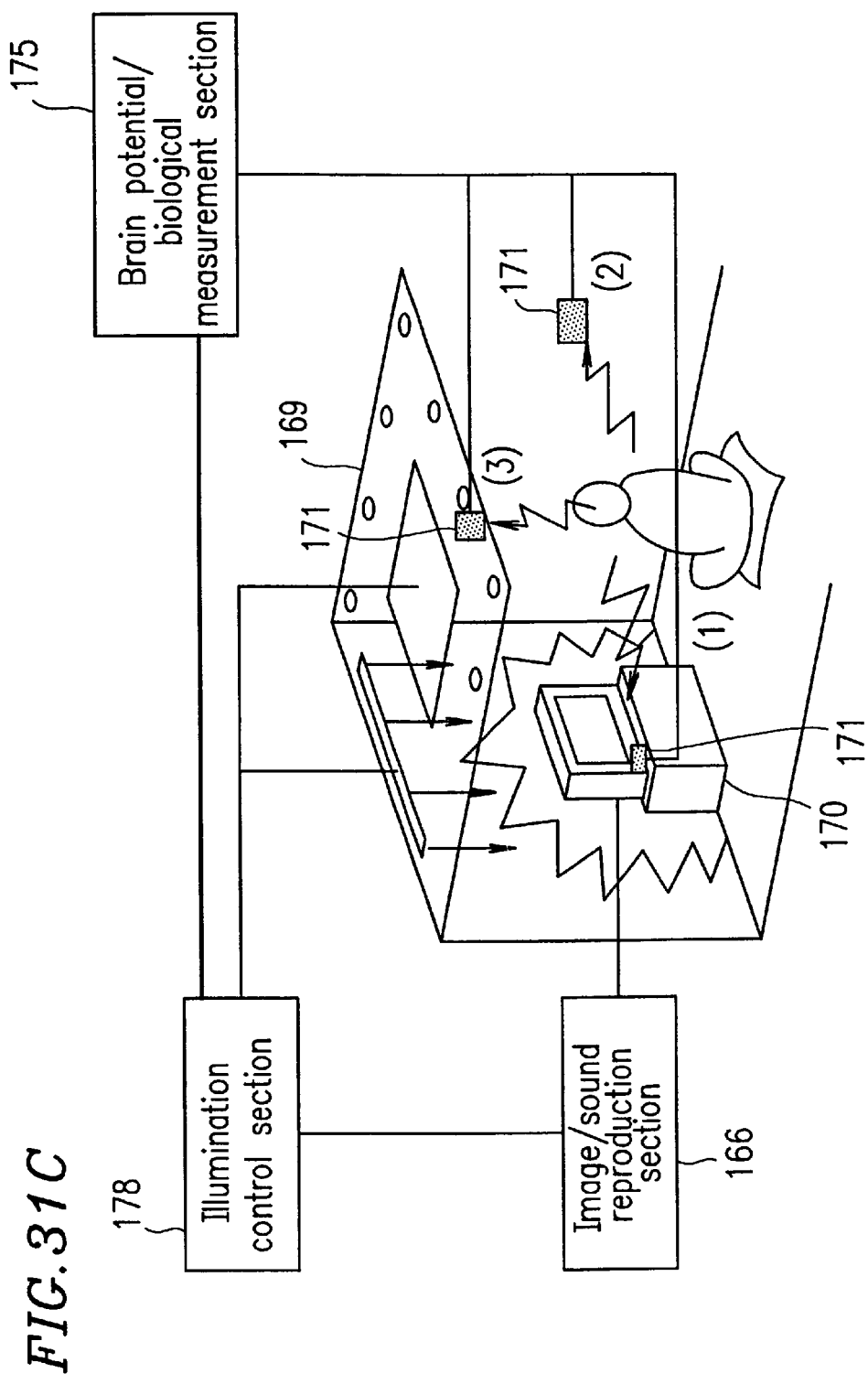
FIG. 31C is a diagram used for explaining still another configuration of the illumination device of FIG. 30 in which brain potential and biological information are measured.

An image signal, a sound signal, and an illumination signal are input to the image/sound/illumination control section 164 which in turn transmits the image signal and the sound signal to an image/sound output section 170 in synchronization with the display timing of images, and the illumination signal to an illumination output section 169 via an illumination control section 178 (see FIGS. 31A through 31C). Therefore, an appreciator appreciating an image in a room enjoys watching the image displayed on the image output section 10 due to the synchronized image, sound, and illumination output from the image output section (e.g., a television) 170 and the illumination output section (illumination appliance) 169, feeling a high level of realism.

The measurement section 165 for measuring biological and psychological information on an appreciator may be a measurement section 175 for measuring the brain potential and various biorhythms (hereinafter also referred to as a brain potential/biological measurement section)as shown in FIGS. 31A, 31B, and 31C. By such measurement, the feelings of the appreciator can be monitored. Specifically, FIG. 31A shows a configuration in which required measurements of the appreciator are performed by the measurement section 175 using wires. FIG. 31B shows a configuration in which required measurements of the appreciator are performed by the measurement section 175 without wires. Further, FIG. 31C shows a configuration in which the brain potential and various biorhythms of the appreciator are measured in a wireless manner; reception sections 171 for receiving the measured data are provided at the image/sound output section 170 (case (1)), at an appropriate position in an appreciation room (case (2)), at the illumination output section (illumination appliance) 169 (case (3)), or the like; and the measurement section 175 collects the required measured data. Note that the position of the reception section 171 is not limited to the positions indicated by (1) through (3) in FIG. 31C, but the reception section 171 may be provided at an arbitrary position.

All types of brain potentials, such as the incidence of data obtained by analyzing wavelength (e.g., $\alpha$ wave, $\beta$ wave, $\gamma$ wave, $\theta$ wave, and the like), brain wave data as it is directly measured, or an event-related potential called a $\lambda$ wave, may be target brain potentials to be measured. All types of biorhythms such, as heart rate, a blood pressure value, respiration rate, a myogenic potential value, ocular movement, or a circadian rhythm may be target biorhythms to be measured. As a method or device for measuring such targets, any known technique in a related technical field can be used.

Figure 32:
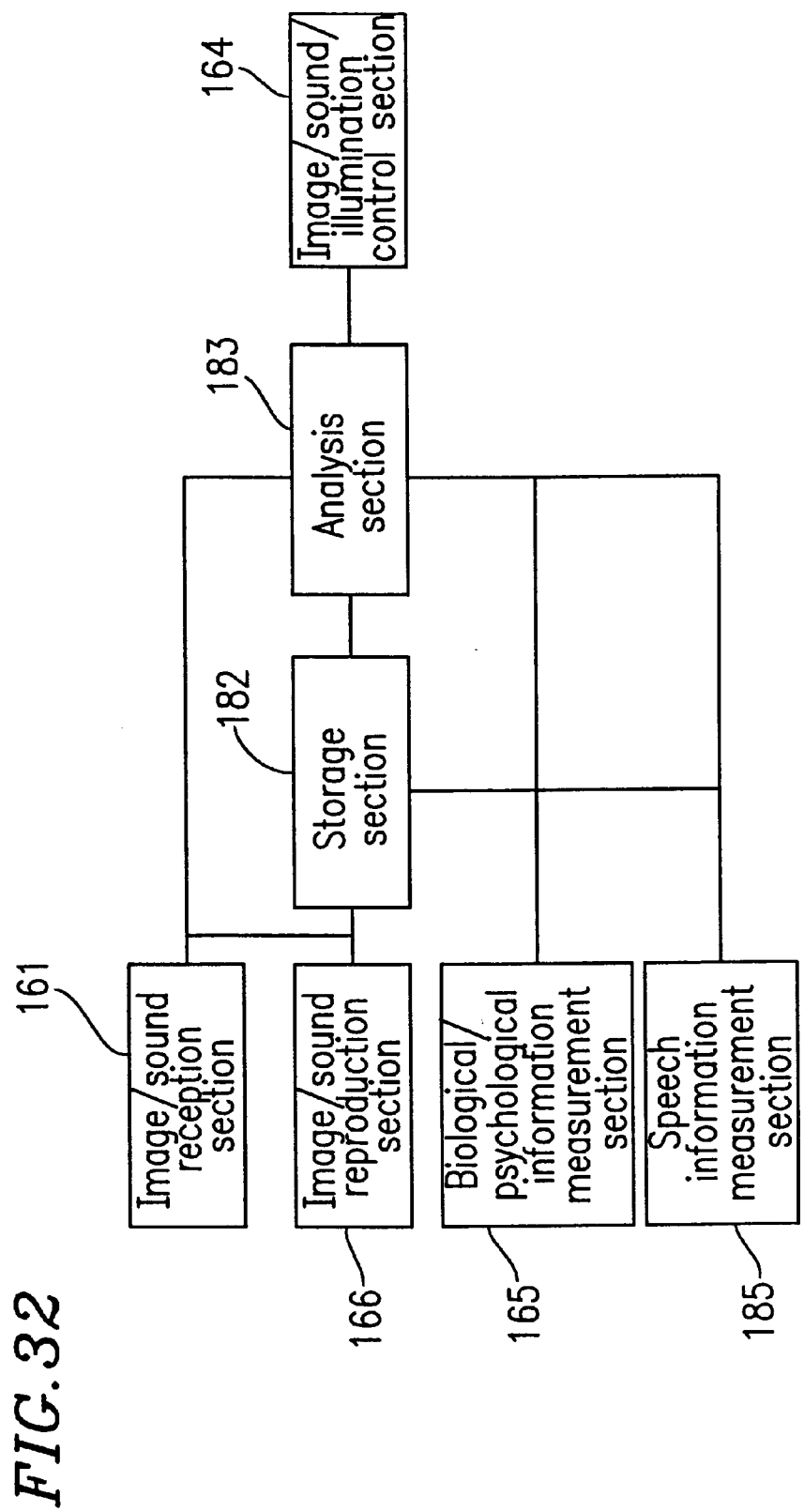
FIG. 32 is a diagram used for explaining a configuration of the illumination device of FIG. 30 in which illumination can also be controlled in association with speech information.

Further, FIG. 32 schematically shows a block diagram of a configuration of an illumination device in which illumination can be controlled in accordance with additional information on speech. Specifically, the illumination device of FIG. 32 includes a measurement section 185 for measuring speech information in addition to the configuration shown in FIG. 30. Therefore, in the configuration of FIG. 30, the storage section 162 for storing the image and sound information and the biological and psychological information and the analysis section 163 for analyzing the image and sound information and the biological and psychological information are respectively adapted into a storage section 182 and the analysis section 183 which can process the speech information measured by the speech measurement section. Note that the function and feature of each component including the storage section 182 and the analysis section 183 included in the configuration of FIG. 32 is substantially the same as the corresponding component in the configuration of FIG. 30. A description of each component of FIG. 32 is therefore omitted.

The speech information indicates language spoken by an appreciator. Therefore, illumination is often controlled only in accordance with the speech information, irrespective of an image signal or a sound signal. In the configuration, for example, illumination is controlled in accordance with recognized speech information in the switching function where an illumination control method is selected in accordance with an appreciator's preference as described above.

Note that in the illumination device of Example 14, when an image signal is input, the image and illumination light for enhancing the realism of the image can be generated. Therefore, both the image/sound reception section and the image/sound reproduction section do not necessarily need to be included. At least one of the image/sound reception section and the image/sound reproduction section may be used.

Further, it is needless to say that when no sound is required, each of the image/sound reception section, the image/sound reproduction section, and the like of the above-described configuration does not necessarily need to have a function to process sound.

Further, each component included in the configuration shown in the figures may be separated from one another. Alternatively, two or more components may be integrated into one component. For example, the image/sound reception section and the image/sound reproduction section may be integrated into an image/sound reception/reproduction section.

The illumination control section may include a plurality of circuits and may control a plurality of illumination output sections. Further, more preferably, the illumination output sections may be hidden from an appreciator so that he/she cannot see the illumination output sections.

EXAMPLE 15

Figure 33:
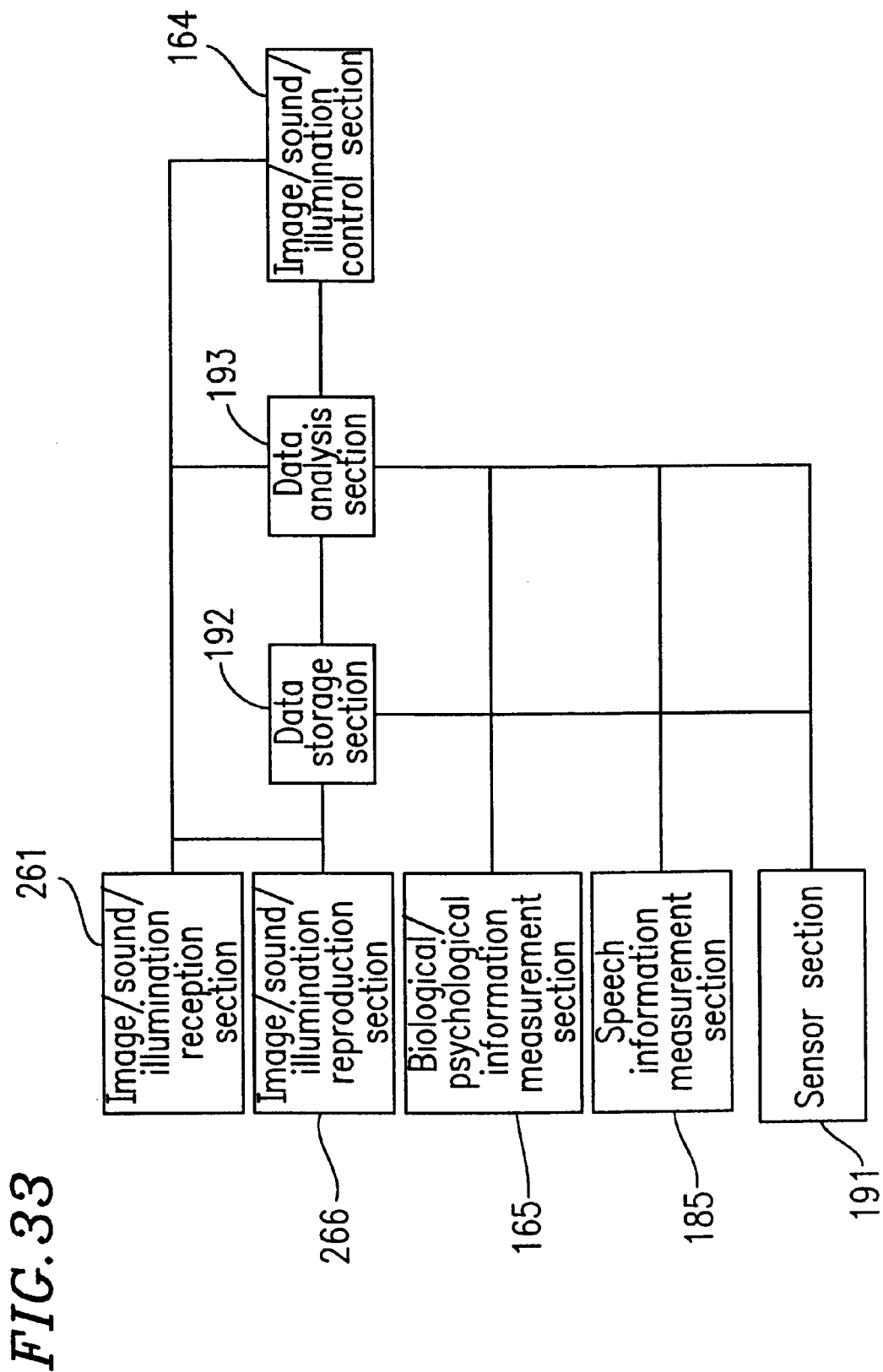
FIG. 33 is a diagram used for explaining a configuration of an illumination device according to Example 15 of the present invention.

FIG. 33 is a block diagram schematically showing a configuration of an illumination device according to Example 15 of the present invention. Specifically, the illumination device includes an image/sound/illumination reception section 261, an image/sound/illumination reproduction section 266, a measurement section 165 for obtaining biological and psychological information on an appreciator, a measurement section 185 for obtaining speech information, a sensor section 191, a data storage section 192, a data analysis section 193, and an image/sound/illumination control section 164.

The functions of the image/sound/illumination reception section 261 and the image/sound/illumination reproduction section 266 are substantially the same as the functions of the image/sound reception section 161 and the image/sound reproduction section 166 of Example 14, respectively, except that the image/sound/illumination reception section 261 and the image/sound/illumination reproduction section 266 are adapted to be further capable of receiving and reproducing an illumination signal. The sensor section 191 is capable of measuring an arbitrary information signal which may be required for generation of the illumination signal. The measurement section 165 for obtaining biological and psychological information on an appreciator and the measurement section 185 for obtaining speech information are the same as the functions of the corresponding components of Example 14, and therefore a description thereof is omitted.

In the configuration of FIG. 33, any one or some of the image/sound/illumination reception section 261, the image/sound/illumination reproduction section 266, the measurement section 165 for obtaining biological and psychological information on an appreciator, the measurement section 185 for obtaining speech information, and the sensor section 191 transmit data which is in turn first stored in the data storage section 192, or is not stored, and then transmitted to the data analysis section 193. The data analysis section 193 analyzes part or all of the received data to calculate illumination conditions under which the realism of an image is enhanced and to generate an illumination signal required for control of the illumination appliance. Alternatively, instead of generating an illumination signal as a result of the analysis by the analysis section 193, the illumination signal received or generated by the reception section 261 or the reproduction section 266 may be used as it is.

An image signal, a sound signal, and an illumination signal are input to the image/sound/illumination control section 164 which in turn controls the illumination device with the same technique as described in each of the Examples.

Figure 34:
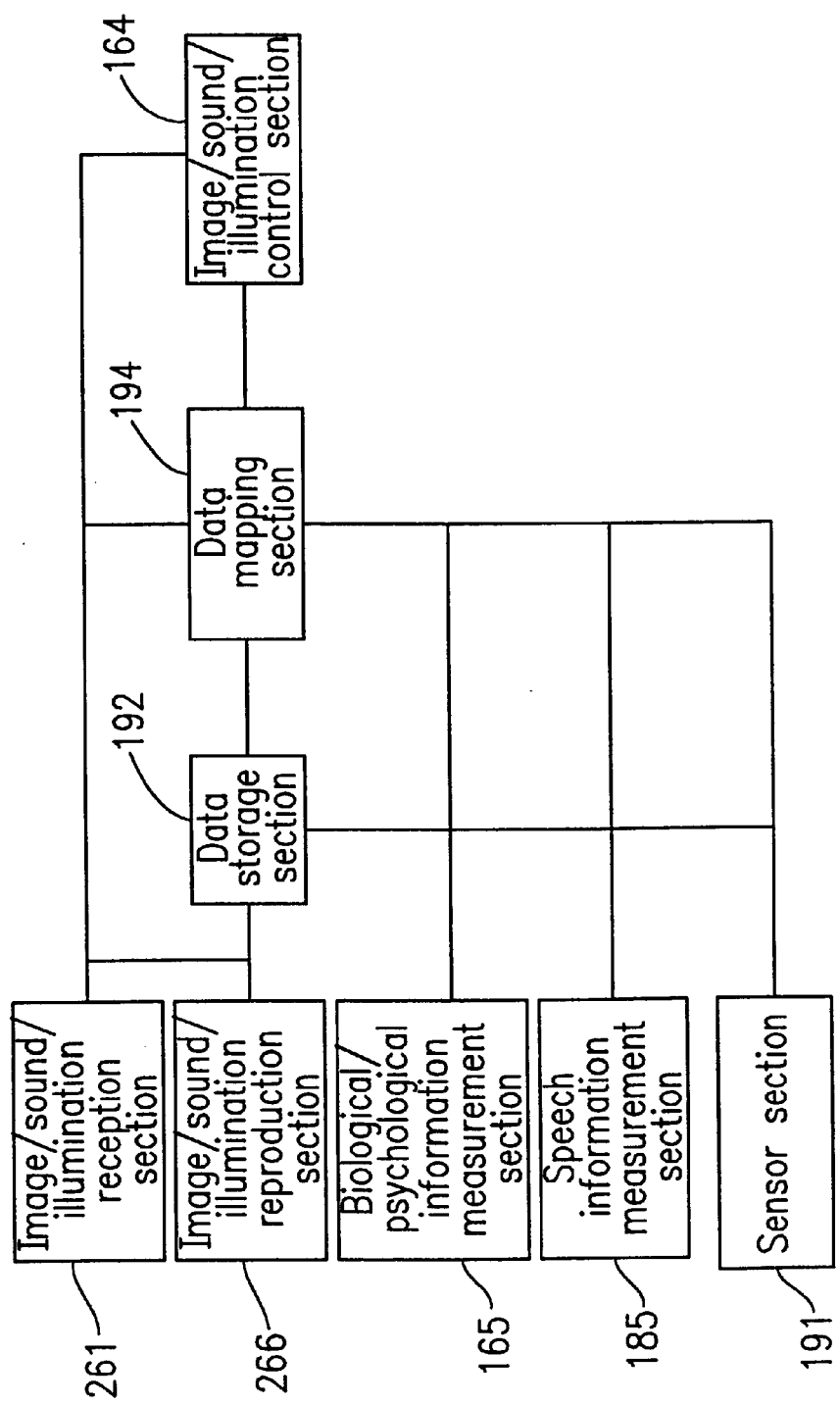
FIG. 34 is a diagram used for explaining another configuration of an illumination device according to Example 15 of the present invention.

FIG. 34 shows a configuration in which the data analysis section 193 of the configuration in FIG. 33 is replaced with a data mapping section 194. The data mapping section 194 maps each received data type to an illumination signal previously stored in order to select a predetermined illumination signal.

With such a configuration, the improvement in realism as described above can be obtained by performing illumination control in accordance with the illumination control method of the present invention.

Note that in the illumination device of Example 15, when an image signal is input, the image and illumination light for improving the realism of the image can be generated. Therefore, both the image/sound reception section and the image/sound reproduction section do not necessarily need to be included. At least one of the image/sound reception section and the image/sound reproduction section may be used.

Further, it is needless to say that when no sound is required, each of the image/sound reception section, the image/sound reproduction section, and the like of the above-described configuration does not necessarily need to have a function to process a sound.

Further, each component included in the configuration shown in FIGS. 33 and 34 may be separated from one another. Alternatively, two or more components may be integrated into one component. For example, the image/sound reception section and the image/sound reproduction section may be integrated into an image/sound reception/reproduction section.

The illumination control section may include a plurality of circuits and may control a plurality of illumination output sections. Further, more preferably, the illumination output sections may be hidden from an appreciator so that he/she cannot see the illumination output sections.

INDUSTRIAL APPLICABILITY

As described above, according to the present invention, an illumination device is provided in which a high level of realism is obtained by controlling illumination in association with images on an image display device.

What is claimed is:

1. An illumination control method comprising the step of: controlling illumination of an appreciation space in association with an image displayed on an image display device in such a manner as to enhance a realism of the image displayed on a screen of the image display device, wherein an appreciator appreciating the image is in the appreciation space.

2. An illumination control method according to claim 1, wherein in the illumination control step, at least one of a level, a light color, a luminous intensity distribution, and a direction of light output from one or more light sources provided in the appreciation space is controlled so that an illumination impression to the appreciation space is made substantially coincident with an illumination impression of a virtual image space imaginarily created from the image displayed on the image display device.

3. An illumination control method according to claim 1, wherein in the illumination control step, one or more light sources provided in the appreciation space is controlled so that at least one parameter of a level, a light color, a luminous intensity distribution, and a direction of illumination to the appreciation space is made substantially coincident with a corresponding parameter of a virtual image space imaginarily created from the image displayed on the image display device.

4. An illumination control method according to claim 3, wherein an illuminance of the appreciation space is controlled so as to substantially be coincident with an illuminance of an illumination impression of the virtual image space so that a level of the illumination to the appreciation space is made substantially coincident with a level of illumination to the virtual image space.

5. An illumination control method according to claim 3, wherein the one or more light sources provided in the appreciation space are controlled so that $0<L'<1.25\cdot L$ is satisfied where L (cd/m$^2$) is the luminance of a pixel having the highest luminance of all pixels in the image displayed on the image display device, and L' (cd/m$^2$) is a luminance of a peripheral visual field of the image display device.

6. An illumination control method according to claim 3, wherein the one or more light sources provided in the appreciation space are controlled so that $0<L'<1.25\cdot L$ is satisfied where L (cd/m$^2$) is the luminance of a pixel having the highest luminance of all pixels in a background excluding a main target of the image displayed on the image display device, and L' (cd/m$^2$) is a luminance of a peripheral visual field of the image display device.

7. An illumination control method according to claim 3, wherein a chromaticity of illumination of the appreciation space is controlled so as to substantially be coincident with a chromaticity of illumination of the virtual image space so that a light color of illumination to the appreciation space is made substantially coincident with a light color of illumination of the virtual image space.

8. An illumination control method according to claim 3, wherein a light color of illumination to the appreciation space is controlled so as to have substantially the same category as that of a color of a part of the image displayed on the image display device, and therefore a light color of illumination to the appreciation space is substantially coincident with a light color of illumination to the virtual image space.

9. An illumination control method according to claim 3, wherein chromaticities of the one or more light sources are controlled in association with the image so that: a hue of a chromaticity of a peripheral visual field of the image display device is substantially the same on a chromaticity diagram as a hue of an average chromaticity of all pixels of the image displayed on the image display device; a color saturation of the chromaticity of the peripheral visual field of the image display device is less than or equal to, on a chromaticity diagram, a color saturation of an average chromaticity of all pixels of the image displayed on the image display device; and therefore a light color of illumination to the appreciation space is substantially coincident with a light color of illumination to the virtual image space.

10. An illumination control method according to claim 3, wherein chromaticities of the one or more light sources are controlled in association with the image so that: a hue of a chromaticity of a peripheral visual field of the image display device is substantially the same on a chromaticity diagram as a hue of an average chromaticity of pixels of a background excluding a main target of the image displayed on the image display device; a color saturation of the chromaticity of the peripheral visual field of the image display device is less than or equal to, on a chromaticity diagram, a color saturation of an average chromaticity of the pixels of the background excluding the main target of the image displayed on the image display device; and therefore a light color of illumination to the appreciation space is substantially coincident with a light color of illumination to the virtual image space.

11. An illumination control method according to claim 3, wherein chromaticities of the one or more light sources are controlled in association with the image so that a hue of a chromaticity of a peripheral visual field of the image display device is substantially opposite on a chromaticity diagram to a hue of an average chromaticity of all pixels of the image displayed on the image display device, and therefore a light color of illumination to the appreciation is space is substantially coincident with a light color of illumination to the virtual image space.

12. An illumination control method according to claim 3, wherein chromaticities of the one or more light sources are controlled in association with the image so that a hue of a chromaticity of a peripheral visual field of the image display device is substantially opposite on a chromaticity diagram to a hue of an average chromaticity of pixels of a background excluding a main target of the image displayed on the image display device, and therefore a light color of illumination to the appreciation space is substantially coincident with a light color of illumination to the virtual image space.

13. An illumination control method according to claim 3, wherein outputs and light colors of the one or more light sources provided in the appreciation space are controlled in accordance with a luminance distribution state of the image displayed on the image display device so that a light color, a level distribution, and a direction of illumination to the appreciation space are made substantially coincident with a light color, a level distribution, and a direction of illumination to the virtual image space.

14. An illumination control method according to claim 3, wherein a light source of the virtual image space is detected, a distribution and a direction of light in the virtual image space are predicted based on a luminance, a light color, and a position of the detected light source, outputs and light colors of the one or more light sources provided in the appreciation space are controlled to realize a light color distribution and a luminance distribution obtained by extrapolating the predicted results into the appreciation space so that a direction and a distribution of illumination to the appreciation space are made substantially coincident with a direction and a distribution of illumination to the virtual image space.

15. An illumination control method according to claim 3, wherein the one or more light sources are provided at a rear or periphery of the image display device.

16. An illumination control method according to claim 3, wherein when the peripheral visual field of the image display device is divided into a plurality of visual field categories based on a visual function of a human, the categories including an effective visual field section, a guide visual field section, and an auxiliary visual field section, and at least one of the one or more light sources is assigned to each of the plurality of visual field categories.

17. An illumination control method according to claim 3, wherein a light source of the one or more light sources illuminating an effective visual field section is a multi-function light source.

18. An illumination control method according to claim 17, wherein a brightness of the multi-function light source illuminating the effective visual field section is greater than a brightness of a light source illuminating other visual fields.

19. An illumination control method according to claim 3, wherein a light source of the one or more light sources for illuminating a guide visual field section is provided at high density, and on-off operation of the light source is finely controlled.

20. An illumination control method according to claim 3, wherein the image displayed on the image display device is substantially evenly divided into 3 portions including an upper portion, a middle portion, and a lower portion, information on each of the upper portion, the middle portion, and the lower portion is reflected in at least one of the effective visual field section, a guide visual field section, and an auxiliary visual field section so that a level, a light color, a distribution, and a direction of illumination to the appreciation space are made substantially coincident with a level, a light color, a distribution, and a direction of illumination to the virtual image space.

21. An illumination control method according to claim 3, wherein: a light color and a luminance level of a light source of the one or more light sources for illuminating a guide visual field section is individually adjusted; the light source is attached to a periphery or vicinity of the image display device; the light color and the luminance level of the light source is controlled to be coincident with a light color and a luminance level of a pixel in a peripheral edge portion of the image displayed on the image display device so that a level, a light color, a distribution, and a direction of illumination to the appreciation space are made substantially coincident with a level, a light color, a distribution, and a direction of illumination to the virtual image space.

22. An illumination control method according to claim 1, wherein a condition of the illumination is changed substantially in synchronization with the image displayed on the image display device so that a delay in the change of the condition of the illumination is less than or equal to one second with respect to a change in the image.

23. An illumination control method according to claim 22, wherein image data is stored in a storage medium so that the illumination is synchronized with the displaying of the image on the image display device at an arbitrary timing and therefore the condition of the illumination is changed substantially in synchronization with the image.

24. An illumination control method according to claim 1, wherein a predetermined relaxation-type illumination control method is applied to a dramatically changing image.

25. An illumination control method according to claim 24, wherein in the predetermined relaxation-type illumination control method, a variation frequency of the illumination is adjusted in such a manner so as not to fall in a frequency range causing a human to sense flicker.

26. An illumination control method according to claim 24, wherein in the predetermined relaxation-type illumination control method, the illumination is changed when a change in the image exceeds a predetermined threshold.

27. An illumination control method according to claim 24, wherein in the predetermined relaxation-type illumination control method, when the image is changed, the illumination is changed in accordance with an average value of a vicinity of the change over a predetermined period of time.

28. An illumination control method according to claim 1, wherein a predetermined adaptation adjusting means for preventing an appearance of a reduction in color saturation on the screen caused by the eyes of a human adapting a single light color dominating a significant portion of the image displayed on the image display device.

29. An illumination control method according to claim 1, wherein the illumination is controlled using a predetermined control method when a luminance level of the image displayed on the image display image is low and a chromaticity thereof is a low color saturation.

30. An illumination control method according to claim 1, wherein the illumination is controlled in association with a feeling of the appreciator appreciating the image display device in addition to the image displayed on the image display device.

31. An illumination control method according to claim 30, wherein a feeling of the appreciator is monitored by measuring a brain potential or various types of biorhythms of the appreciator.

32. An illumination control method according to claim 1, wherein the illumination is changed in association with a telephone or an interphone when a call is received by the telephone or interphone.

33. An illumination control method according to claim 1, wherein one or more light sources provided at a peripheral visual field is controlled to represent an object color displayed on the screen.

34. An illumination control method according to claim 1, wherein a control mode of the illumination control is selected in accordance with a preference of the appreciator.

35. An illumination control method according to claim 1, wherein data is transmitted in a form of chromaticity information.

36. An illumination control method according to claim 1, wherein data is transmitted in a device-dependent form so as to increase a data transmission rate.

37. An illumination control method according to claim 1, further comprising the step of controlling the illumination in accordance with speech information.

38. An illumination control method according to claim 1, comprising the steps of:
   storing an illumination control signal at a predetermined location; and
   realizing predetermined illumination control by reproducing the stored illumination control signal when the appreciator is appreciating the screen.

39. An illumination device comprising means for controlling illumination of an appreciation space in association with an image displayed on an image display device in such a manner as to enhance a realism of the image displayed on a screen of the image display device, wherein an appreciator appreciating the image is in the appreciation space.

40. An illumination device according to claim 39, comprising: a reproduction section for reproducing a predetermined signal; a data storage device; an illumination control section; an illumination output section; and an image/sound output section, wherein the image/sound output section functions as the image display device.

41. An illumination device according to claim 39, comprising: a reception section for receiving a predetermined signal; a reproduction section for reproducing the predetermined signal; an image/sound output section; an analysis section for analyzing the predetermined signal; an illumination control section; and an illumination output section, wherein the image/sound output section functions as the image display device.

42. An illumination device according to claim 39, comprising: a sensor section for measuring a predetermined information signal; an analysis section for analyzing a predetermined signal; an illumination control section; and an illumination output section.

43. An illumination device according to claim 39, comprising: a data reception line; a reproduction section for reproducing a predetermined signal; a data storage device; an illumination control section; an illumination output section; and an image/sound output section, wherein the image/sound output section functions as the image display device.

44. An illumination device according to claim 39, comprising: a reception section for receiving a predetermined signal; a reproduction section for reproducing the predetermined signal; an image/sound/illumination storage section; an image/sound/illumination control section; and an image/ sound/illumination output section, wherein the image/sound/illumination output section functions as the image display device.

45. An illumination device according to claim 44, wherein the reception section, the reproduction section, the image/sound/illumination storage section, the image/sound/illumination control section and the image/sound/illumination output section are integrated.

46. An illumination device according to claim 39, wherein part of a light for display of the image output from the image display device is used as illumination light.

47. An illumination device according to claim 39, wherein a light source is provided in a goggle type image display section.

48. An illumination device according to claim 39, wherein an illumination output section and a sound output section are integrated.

49. An illumination device according to claim 39, comprising a light source, the light source including:
   a light emitting section; and
   at least one of a variable light color control section for variably controlling a light color of light emitted from the light emitting section, a variable luminous intensity distribution control section for variably controlling a light luminous distribution thereof, and a variable direction control section for variably controlling a direction thereof.

50. An illumination device according to claim 39, comprising an illumination appliance,
   the illumination appliance including:
   a light source; and
   at least one of a reception section, a data analysis section, a data mapping section, a sensor section, a reproduction section, a storage section, and a transmission section,
   the light source including:
   a light emitting section; and
   at least one of a variable light color control section for variably controlling a light color of light emitted from the light emitting section, a variable luminous intensity distribution control section for variably controlling a light luminous distribution thereof, and a variable direction control section for variably controlling a direction thereof.

51. An illumination device according to claim 39, comprising at least one light source accommodated in a side of a body of the image display device.

52. An illumination device according to claim 39, comprising at least one light source accommodated in a frame of the image display device, the frame being positioned at a periphery of the screen of the image display device.

53. An illumination device according to claim 39, comprising at least one light source accommodated in the image display device, the at least one light source being removable.

54. An illumination device according to claim 39, wherein the illumination is controlled in association with a feeling of the appreciator appreciating the image display device in addition to the image displayed on the image display device.

55. An illumination device according to claim 39, wherein a light emitting section is provided at a position wherein the light emitting section is shielded from the appreciator appreciating the image displayed on the image display device.

56. An illumination device according to claim 39, further comprising means for measuring a brain potential or various types of biorhythms of the appreciator.

57. An illumination device according to claim 39, wherein the illumination is changed in association with a telephone or an interphone when a call is received by the telephone or interphone.

58. An illumination device according to claim 39, wherein one or more light sources provided at a peripheral visual field is controlled to represent an object color displayed on the screen.

59. An illumination device according to claim 39, further comprising a switching function wherein a control mode of illumination control is selected in accordance with a preference of the appreciator.

60. An illumination device according to claim 39, wherein data is transmitted in a form of chromaticity information.

61. An illumination device according to claim 39, wherein data is transmitted in a device-dependent form so as to increase a data transmission rate.

62. An illumination device according to claim 39, further comprising means for controlling the illumination in accordance with speech information.

63. An illumination device according to claim 39, comprising: means for storing an illumination control signal at a predetermined location; and means for realizing predetermined illumination control by reproducing the stored illumination control signal when the appreciator is appreciating the screen.

* * * * *